United States Patent
Wu et al.

(10) Patent No.: US 12,551,893 B2
(45) Date of Patent: Feb. 17, 2026

(54) GENETICALLY ENCODED ACTUATORS FOR ACOUSTIC MANIPULATION

(71) Applicant: California Institute of Technology, Pasadena, CA (US)

(72) Inventors: Di Wu, Pasadena, CA (US); Mikhail G. Shapiro, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 705 days.

(21) Appl. No.: 18/073,102

(22) Filed: Dec. 1, 2022

(65) Prior Publication Data

US 2023/0173489 A1 Jun. 8, 2023

Related U.S. Application Data

(60) Provisional application No. 63/285,332, filed on Dec. 2, 2021.

(51) Int. Cl.
*B01L 3/00* (2006.01)
*C12N 1/20* (2006.01)
(Continued)

(52) U.S. Cl.
CPC .......... *B01L 3/502761* (2013.01); *C12N 1/20* (2013.01); *C12N 5/0686* (2013.01);
(Continued)

(58) Field of Classification Search
CPC ..... B01L 2200/0652; B01L 2300/0654; B01L 2400/0436; B01L 2400/0439;
(Continued)

(56) References Cited

U.S. PATENT DOCUMENTS

| | | | |
|---|---|---|---|
| 2014/0288411 A1 | 9/2014 | Shapiro et al. | |
| 2014/0288421 A1 | 9/2014 | Shapiro et al. | |

(Continued)

FOREIGN PATENT DOCUMENTS

| | | | | |
|---|---|---|---|---|
| CN | 114146890 A | * | 3/2022 | ........... B06B 1/0622 |
| KR | 20180096793 | | 8/2018 | |

(Continued)

OTHER PUBLICATIONS

Augustsson et al., "Automated and temperature-controlled micro-PIV measurements enabling long- term-stable microchannel acoustophoresis characterization," Lab on a Chip 2011, 11, 4152-4164.

(Continued)

*Primary Examiner* — Jennifer Wecker
(74) *Attorney, Agent, or Firm* — Dickinson Wright PLLC

(57) ABSTRACT

Disclosed herein include methods, compositions, and kits suitable for use in sorting a population of cells. In some embodiments, the method comprises flowing a fluid sample comprising a population of cells through a microfluidic channel. The population of cells can be configured to express gas vesicles (GVs) in a context-dependent manner. The expression of GVs within a cell can increase the compressibility ($\beta$) and reduce the density ($\rho$) of said cell, thereby modulating the acoustic contrast ($\Phi$) of said cell relative to the fluid in the microfluidic channel. The method can comprise applying ultrasound to the microfluidic channel. Applying ultrasound can generate acoustic standing wave(s) in the microfluidic channel, thereby positioning pressure antinode(s) in the microfluidic channel.

20 Claims, 34 Drawing Sheets

(51) Int. Cl.
  *C12N 5/071* (2010.01)
  *C12N 15/70* (2006.01)
  *C12N 15/85* (2006.01)

(52) U.S. Cl.
  CPC .............. *C12N 15/70* (2013.01); *C12N 15/85* (2013.01); *B01L 2200/0652* (2013.01); *B01L 2300/0654* (2013.01); *B01L 2400/0436* (2013.01); *C12N 2800/10* (2013.01)

(58) Field of Classification Search
  CPC . B01L 3/50273; B01L 3/502761; C12N 1/20; C12N 15/70; C12N 15/85; C12N 2521/10; C12N 2800/10; C12N 5/0686; C12N 5/10; G01N 15/01; G01N 15/1459; G01N 15/149
  See application file for complete search history.

(56) References Cited

U.S. PATENT DOCUMENTS

| | | |
|---|---|---|
| 2017/0137774 A1 | 5/2017 | Lipkens et al. |
| 2018/0028693 A1 | 2/2018 | Lakshmanan et al. |
| 2018/0030501 A1 | 2/2018 | Bourdeau et al. |
| 2018/0038922 A1 | 2/2018 | Lu et al. |
| 2019/0175763 A1 | 6/2019 | Shapiro et al. |
| 2019/0314001 A1 | 10/2019 | Maresca et al. |
| 2020/0164095 A1 | 5/2020 | Lakshmanan et al. |
| 2020/0237346 A1 | 7/2020 | Sawyer et al. |
| 2021/0060185 A1 | 3/2021 | Lakshmanan et al. |
| 2023/0016245 A1 | 1/2023 | Duan et al. |
| 2023/0047753 A1 | 2/2023 | Szablowski et al. |
| 2023/0094152 A1 | 3/2023 | Shivaei et al. |
| 2023/0109152 A1 | 4/2023 | Jin et al. |

FOREIGN PATENT DOCUMENTS

| | | |
|---|---|---|
| WO | WO2017/121896 | 7/2017 |
| WO | WO2020/146379 | 7/2020 |

OTHER PUBLICATIONS

Badeau & Deforest, "Programming Stimuli-Responsive Behavior into Biomaterials," Annual Review of Biomedical Engineering 2019, 21, 241-265.
Baresch et al., "Observation of a Single-Beam Gradient Force Acoustical Trap for Elastic Particles: Acoustical Tweezers," Physical Review Letters 2016, 116(2), in 6 pages.
Barnkob et al., "Acoustic radiation- and streaming-induced microparticle velocities determined by microparticle image velocimetry in an ultrasound symmetry plane," Physical Review E 2012, 86(5), in 11 pages.
Barnkob et al., "Measuring the local pressure amplitude in microchannel acoustophoresis," Lab on a Chip 2010, 10, 563-570.
Bourdeau et al., "Acoustic reporter genes for noninvasive imaging of microorganisms in mammalian hosts," Nature 2018, 553, 86-90.
Bruus, "Acoustofluidics 7: The acoustic radiation force on small particles," Lab on a Chip 2012, 12, 1014-1021.
Cheng et al., "Fast three-dimensional micropatterning of PC12 cells in rapidly crosslinked hydrogel scaffolds using ultrasonic standing waves," Biofabrication 2019, 12, in 12 pages.
Cherin et al., "Acoustic Behavior of *Halobacterium salinarum* Gas Vesicles in the High-Frequency Range: Experiments and Modeling," Ultrasound in Medicine & Biology 2017, 43(5), 1016-1030.
Collins et al., "Two-dimensional single-cell patterning with one cell per well driven by surface acoustic waves," Nature Communications 2015, 6, 1-11.
Cushing et al., "Elastomeric negative acoustic contrast particles for affinity capture assays," Analytical Chemistry 2013, 85(4), 2208-2215.

Dayton et al., "Acoustic radiation force in vivo: A mechanism to assist targeting of microbubbles," Ultrasound in Medicine & Biology 1999, 25(8), 1195-1201.
Deisseroth, "Optogenetics," Nature Methods 2011, 8, 26-29.
Farhadi et al., "Recombinantly Expressed Gas Vesicles as Nanoscale Contrast Agents for Ultrasound and Hyperpolarized MRI," AIChE Journal 2018, 64(8), 2927-2933.
Farhadi et al., "Ultrasound imaging of gene expression in mammalian cells," Science 2019, 365(6460), 1469-1475.
Gilbert & Ellis, "Biological Engineered Living Materials: Growing Functional Materials with Genetically Programmable Properties," ACS Synthetic Biology 2019, 8(1), 1-15.
Gonzalez-Rodriguez et al., "Mechanical Criterion for the Rupture of a Cell Membrane under Compression," Biophysical Journal 2016, 111, 2711-2721.
Hurt et al., "Genomically mined acoustic reporter genes enable real-time in vivo monitoring of tumors and tumor-homing probiotics ," bioRxiv 2021, in 52 pages. https://doi.org/10.1101/2021.04.26.441537.
International Search Report and Written Opinion dated Mar. 31, 2023 in PCT Patent Application No. PCT/US2022/080743.
Johnson et al., "Elastomeric microparticles for acoustic mediated bioseparations," Journal of Nanobiotechnology 2013, 11(22), in 8 pages.
Johnson et al., "Settling velocities of fractal aggregates," Environmental Science & Technology 1996, 30(6), 1911-1918.
Kang et al., "High-resolution acoustophoretic 3D cell patterning to construct functional collateral cylindroids for ischemia therapy," Nature Communications 2018, 9, 1-13.
Kokhuis et al., "Intravital microscopy of localized stem cell delivery using microbubbles and acoustic radiation force," Biotechnology and Bioengineering 2015, 112(1), 220-227.
Lakshmanan et al., "Molecular Engineering of Acoustic Protein Nanostructures," ACS Nano 2016, 10(8), 7314-7322.
Lakshmanan et al., "Preparation of biogenic gas vesicle nanostructures for use as contrast agents for ultrasound and MRI," Nature Protocols 2017, 12, 2050-2080.
Lee et al., "Single beam acoustic trapping," Applied Physics Letters 2009, 95(7), in 3 pages.
Lenshof et al., "Acoustofluidics 8: Applications of acoustophoresis in continuous flow microsystems," Lab on a Chip 2012, 12, 1210-1223.
Li et al., "Microfluidic Colloidal Island Formation and Erasure Induced by Surface Acoustic Wave Radiation," Physical Review Letters 2008, 101(8), in 4 pages.
Lu et al., "Acoustically modulated magnetic resonance imaging of gas-filled protein nanostructures," Nature Materials 2018, 17, 456-463.
Lu et al., "Genetically Encodable Contrast Agents for Optical Coherence Tomography," ACS Nano 2020, 14(7), 7823-7831.
Ma et al., "Acoustic Holographic Cell Patterning in a Biocompatible Hydrogel," Advanced Materials 2019 , 32(4), in 6 pages.
Maresca et al., "Biomolecular Ultrasound and Sonogenetics," Annual Review of Chemical and Biomolecular Engineering 2018, 9, 229-252.
Maresca et al., "Nonlinear ultrasound imaging of nanoscale acoustic biomolecules," Applied Physics Letters 2017, 110, in 5 pages.
Marzo & Drinkwater, "Holographic acoustic tweezers," Proceedings of The National Academy of Sciences 2019 , 116(1), 84-89.
Marzo et al., "Holographic acoustic elements for manipulation of levitated objects," Nature Communications 2015, 6, in 7 pages.
Melde et al., "Acoustic Fabrication via the Assembly and Fusion of Particles," Advanced Materials 2018, 30(3), in 5 pages.
Melde et al., "Holograms for acoustics," Nature 2016, 537, 518-522.
Meng et al., "Microfluidics for extracellular vesicle separation and mimetic synthesis: Recent advances and future perspectives," Chemical Engineering Journal 2021, 404, in 8 pages.
Moroni et al., "Biofabrication strategies for 3D in vitro models and regenerative medicine," Nature Reviews Materials 2018, 3, 21-37.
Mura et al., "Stimuli-responsive nanocarriers for drug delivery," Nature Materials 2013, 12, 991-1003.

(56) References Cited

OTHER PUBLICATIONS

Nguyen et al., "Engineered Living Materials: Prospects and Challenges for Using Biological Systems to Direct the Assembly of Smart Materials," Advanced Materials 2018, 30(19), in 34 pages.
Ozcelik et al., "Acoustic tweezers for the life sciences," Nature Methods 2018, 15, 1021-1028.
Petersson et al., "Continuous separation of lipid particles from erythrocytes by means of laminar flow and acoustic standing wave forces," Lab on a Chip 2005, 5, 20-22.
Petersson et al., "Separation of lipids from blood utilizing ultrasonic standing waves in microfluidic channels," Analyst 2004, 129, 938-943.
Piraner et al., "Going Deeper: Biomolecular Tools for Acoustic and Magnetic Imaging and Control of Cellular Function," Biochemistry 2017, 56, 5202-5209.
Roca-Cusachs et al., "Quantifying forces in cell biology," Nature Cell Biology 2017, 19, 742-751.
Roh et al., "Biomanufacturing of Therapeutic Cells: State of the Art, Current Challenges, and Future Perspectives," Annual Review of Chemical and Biomolecular Engineering 2016, 7, 455-478.
Sadelain et al., "Therapeutic T cell engineering," Nature 2017, 545, 423-431.
Shapiro et al., "Biogenic gas nanostructures as ultrasonic molecular reporters," Nature Nanotechnology 2014, 9, 311-316.
Shapiro et al., "Genetically encoded reporters for hyperpolarized xenon magnetic resonance imaging," Nature Chemistry 2014, 6, 629-634.
Shields et al., "Elastomeric negative acoustic contrast particles for capture, acoustophoretic transport, and confinement of cells in microfluidic systems," Langmuir 2014, 30(14), 3923-3927.
Shields et al., "Fabrication and Operation of Acoustofluidic Devices Supporting Bulk Acoustic Standing Waves for Sheathless Focusing of Particles," Journal of Visualized Experiments 2016, 109, in 7 pages.
Sorensen, "The mobility of fractal aggregates: A review," Aerosol Science and Technology 2011, 45(7), 755-769.
Van Assche et al., "Gradient acoustic focusing of sub-micron particles for separation of bacteria from blood lysate," Scientific Reports 2020, 10, in 13 pages.
Walsby & Bleything, "The Dimensions of Cyanobacterial Gas Vesicles in Relation to Their Efficiency in Providing Buoyancy and Withstanding Pressure," Microbiology 1988, 134(10), 2635-2645.
Walsby, "Gas vesicles," Microbiological Reviews 1994, 58(1), 94-144.
Walsby, "The elastic compressibility of gas vesicles," Proceedings of the Royal Society of London. Series B. Biological Sciences 1982, 216(1204), 355-368.
Wu, "Acoustical tweezers," The Journal of the Acoustical Society of America 1991, 89(5), 2140-2143.
Wu et al., "Genetically encoded nanostructures enable acoustic manipulation of engineered cells," bioRxiv 2019, in 10 pages. https://www.biorxiv.org/content/10.1101/691105v1.full.pdf.
Wu et al., "Acoustofluidic separation of cells and particles," Microsystems & Nanoengineering 2019, 5, in 18 pages.
Wu, "Biomolecular Tools for Noninvasive Imaging and Manipulation of Engineered Cells," Dissertation (Ph.D.), California Institute of Technology, in 92 pages, published on Jan. 31, 2022 https://thesis.library.caltech.edu/14174/.

\* cited by examiner

Gas vesicle $\rho$ = Density    $\beta$ = Compressibility

SELECTIVE ACTUATION

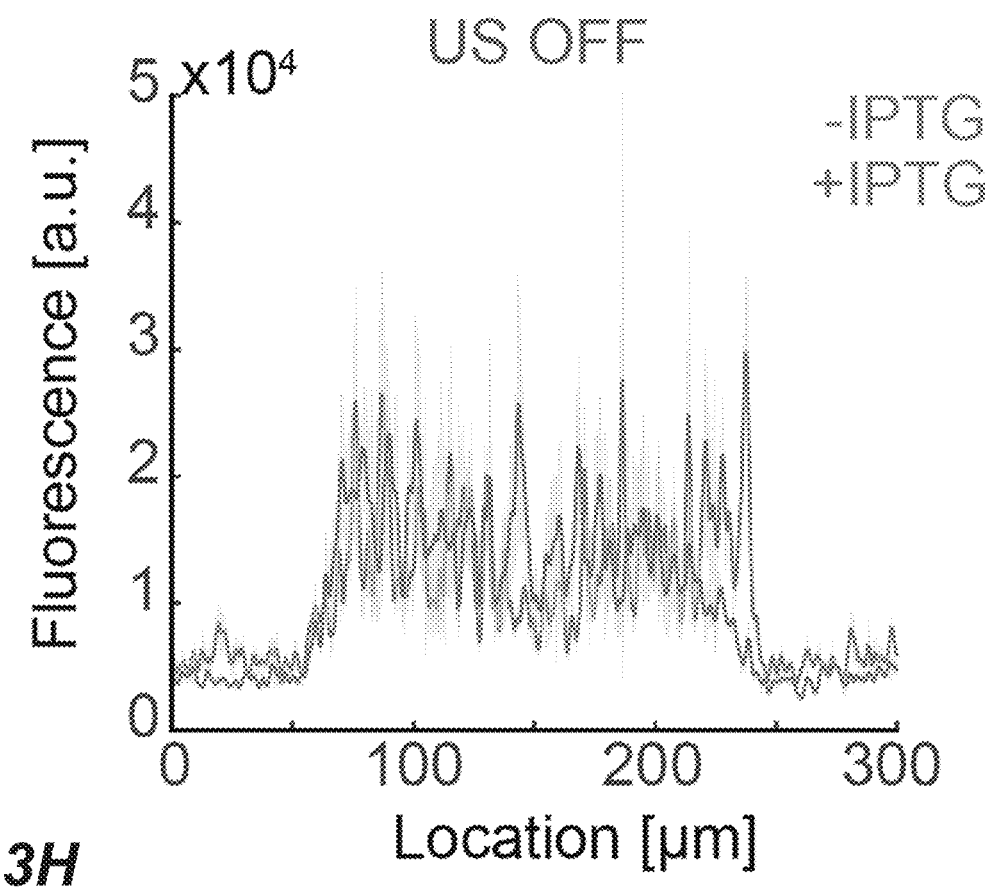
FIG. 3H
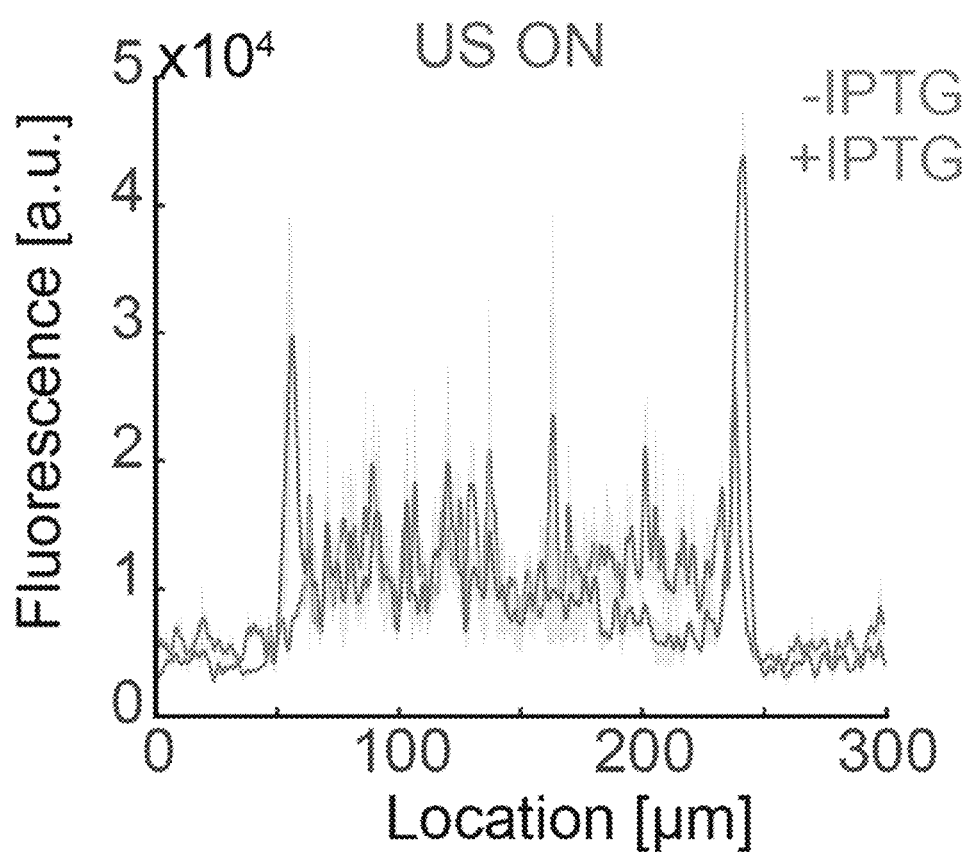

MAMMALIAN CELL
ACOUSTIC INVERSION $P_{us}$ : Positive acoustic pressure
$P_{col.}$ : GV collapse presure Intact GVs Collapsed GVs Polystyrene

GENETICALLY ENCODED ACTUATORS FOR ACOUSTIC MANIPULATION

RELATED APPLICATIONS

This application claims the benefit under 35 U.S.C. § 119(e) of U.S. Provisional Patent Application Ser. No. 63/285,332, filed Dec. 2, 2021, the content of this related application is incorporated herein by reference in its entirety for all purposes.

STATEMENT REGARDING FEDERALLY SPONSORED R&D

This invention was made with government support under Grant No. EB018975 awarded by the National Institutes of Health. The government has certain rights in the invention.

BACKGROUND

Field

The present disclosure relates generally to the field of acoustofluidic sorting.

Description of the Related Art

Currently, the most common method for genotype-based selection of cells uses fluorescent proteins in combination with fluorescence-activated cell sorting (FACS). However, FACS instruments are complex and expensive, often limiting their use to centralized facilities. To enable more widespread genetic engineering and preparation of therapeutic cells, there is a need for more efficient and lower cost methods for genotype-based cell selection.

SUMMARY

Disclosed herein include methods of sorting a population of cells. In some embodiments, the method comprises: flowing a fluid sample through a microfluidic channel, wherein the microfluidic channel comprises one or more flow stream(s) introduced in the microfluidic channel via one or more inlet channel(s) and exiting the microfluidic channel via two or more outlet channels. In some embodiments, the fluid sample comprises a population of cells, wherein the population the cells have been configured to express gas vesicles (GVs) in a context-dependent manner, wherein the expression of GVs within a cell increases the compressibility ($\beta$) and reduces the density ($\rho$) of said cell, thereby modulating the acoustic contrast ($\Phi$) of said cell relative to the fluid in the microfluidic channel. In some embodiments, the cellular expression of GVs above a threshold level of expression imparts a threshold negative acoustic contrast on said cell. In some embodiments, the population of cells comprises or is suspected of comprising: (i) a first subpopulation of cells having a nonnegative acoustic contrast or a negative acoustic contrast below the threshold negative acoustic contrast, and/or (ii) a second subpopulation of cells having a negative acoustic contrast at or above the threshold negative acoustic contrast. In some embodiments, the method comprises: applying ultrasound to the microfluidic channel, wherein applying ultrasound comprises generating acoustic standing wave(s) in the microfluidic channel, wherein the acoustic standing wave(s) position pressure antinode(s) in the microfluidic channel, and wherein the second subpopulation of cells is actuated towards flow stream(s) comprising the pressure antinode(s). In some embodiments, the method does not comprise buoyancy purification of the population of cells.

Disclosed herein include methods of sorting a population of cells. In some embodiments, the method comprises: flowing a fluid sample through a microfluidic channel, wherein the microfluidic channel comprises one or more flow stream(s) introduced in the microfluidic channel via one or more inlet channel(s) and exiting the microfluidic channel via two or more outlet channels. In some embodiments, the fluid sample comprises a population of cells, wherein the population of cells has been incubated with gas vesicles (GVs), wherein cells of the population of cells have varying capacity to uptake said GVs, and wherein population the cells is capable of uptaking GVs in a context-dependent manner. In some embodiments, the levels of GVs within a cell increases the compressibility ($\beta$) and reduces the density ($\rho$) of said cell, thereby modulating the acoustic contrast ($\Phi$) of said cell relative to the fluid in the microfluidic channel. In some embodiments, the uptake of GVs above a threshold level of uptake imparts a threshold negative acoustic contrast on said cell. In some embodiments, the population of cells comprises or is suspected of comprising: (i) a first subpopulation of cells having a nonnegative acoustic contrast or a negative acoustic contrast below the threshold negative acoustic contrast, and/or (ii) a second subpopulation of cells having a negative acoustic contrast at or above the threshold negative acoustic contrast. In some embodiments, the method comprises: applying ultrasound to the microfluidic channel, wherein applying ultrasound comprises generating acoustic standing wave(s) in the microfluidic channel, wherein the acoustic standing wave(s) position pressure antinode(s) in the microfluidic channel, and wherein the second subpopulation of cells is actuated towards flow stream(s) comprising the pressure antinode(s). In some embodiments, the method does not comprise buoyancy purification of the population of cells.

In some embodiments, the one or more inlet channel(s) comprise a center inlet channel and/or one or more side inlet channel(s). In some embodiments, the two or more outlet channels comprise a center outlet channel and/or one or more side outlet channel(s). In some embodiments, the one or more flow stream(s) comprise a center flow stream and/or one or more peripheral flow stream(s). In some embodiments, the one or more flow streams comprise: a center flow stream introduced in the microfluidic channel via a center inlet channel and exiting the microfluidic channel via a center outlet channel; and one or more peripheral flow stream(s) introduced in the microfluidic channel via one or more side inlet channel(s) and exiting the microfluidic channel via one or more side outlet channel(s). In some embodiments, the acoustic standing wave(s) position pressure node(s) in the microfluidic channel. In some embodiments, at least one of the two or more outlet channel(s) is configured to capture flow stream(s) wherein pressure antinode(s) and/or pressure node(s) are positioned.

In some embodiments, the method comprises: incubating the population of cells with GVs, wherein uptake of the GVs comprises one or more of endocytosis, pinocytosis, nanopinocytosis, micropinocytosis, phagocytosis, membrane fusion, clathrin-medicated internalization, caveolin-mediated internalization, receptor-dependent internalization, and receptor-independent internalization. In some embodiments, the cells are capable of degrading GVs post-uptake (e.g., via lysosomal degradation). In some embodiments, the actuation comprises acoustic radiation force-based actuation. In some embodiments, the acoustic standing wave(s) position pressure node(s) in the microfluidic channel. In some embodiments, the first subpopulation of cells is actuated towards the flow stream(s) comprising the pressure node(s). In some embodiments, the acoustic standing wave(s) position a pressure node in the central flow stream. In some embodiments, the first subpopulation of cells is actuated towards the center flow stream. In some embodiments, the acoustic standing wave(s) position pressure antinode(s) in the one or more peripheral flow stream(s). In some embodiments, the second subpopulation of cells is actuated towards the one or more peripheral flow stream(s). In some embodiments, the microfluidic channel comprises two peripheral flow streams, two side inlet channels, and two side outlet channels. In some embodiments, the fluid sample is introduced in the microfluidic channel via the center inlet channel. In some embodiments, the fluid sample is hydrodynamically focused to the center flow stream via sheath flow introduced in the microfluidic channel via the two side inlet channels. In some embodiments, the distal end of the microfluidic channel comprises a trifurcation separating the central flow stream and peripheral flow streams. In some embodiments, the acoustic standing wave(s) position pressure antinodes at or adjacent to the microfluidic channel walls. In some embodiments, cells of the second subpopulation are actuated towards the peripheral flow streams. In some embodiments, cells of the first subpopulation remain in the center flow stream and/or are actuated towards the pressure node positioned at the center flow stream.

In some embodiments, the method comprises: collecting a first sorted population of cells from the center outlet channel, wherein the first subpopulation of cells is actuated towards the center flow stream; and/or collecting a second sorted population of cells from the one or more side outlet channel(s), wherein the second subpopulation of cells is actuated towards the one or more peripheral flow stream(s). In some embodiments, the method comprises: collecting a first sorted population of cells from the one or more side outlet channel(s), wherein the first subpopulation of cells is actuated towards the one or more peripheral flow stream(s); and/or collecting a second sorted population of cells from the center outlet channel, wherein the second subpopulation of cells is actuated towards the center flow stream. In some embodiments, the method comprises counting the first sorted population of cells and/or the second sorted population of cells. In some embodiments, the first sorted population of cells: is at least about 1.2-fold enriched for cells of the first subpopulation of cells; comprises at least about 70% of cells of the first subpopulation of cells present in the fluid sample; and/or comprises less about 30% of cells of the second subpopulation of cells present in the fluid sample. In some embodiments, the second sorted population of cells: is at least about 1.2-fold enriched for cells of the second subpopulation of cells; comprises at least about 70% of cells of the second subpopulation of cells present in the fluid sample; and/or comprises less about 30% of cells of the first subpopulation of cells present in the fluid sample.

In some embodiments, the acoustic properties of a cell of the population of cells are dependent on the context-dependent uptake of GVs and/or context-dependent expression of GVs. In some embodiments, the uptake of GVs and/or expression of GVs is capable of inverting and magnifying the acoustic contrast of a cell. In some embodiments, the uptake of GVs and/or expression of GVs is capable of inverting and magnifying the acoustic contrast of a cell by at least about 2-fold. In some embodiments, the cell type and/or cell state of a cell determines the context-dependent uptake of GVs and/or context-dependent expression of GVs.

In some embodiments, the GVs are capable of amplifying the acoustic radiation force (ARF) experienced by the cells by at least about 2-fold and/or inverting their acoustic contrast upon uptake and/or expression. In some embodiments, the threshold negative acoustic contrast is at least about −0.001, −0.003, −0.007, −0.01, −0.02, −0.04, −0.06, −0.08, −0.10, −0.12, −0.14, −0.16, −0.18, or −0.20. In some embodiments, the cells have an acoustic contrast of about 0.0 to about 0.2 in the absence of GV uptake and/or GV expression (e.g., about 0.1). In some embodiments, the cells have an acoustic contrast of about −0.01 to about −2.0 upon GV uptake and/or GV expression (e.g., about −1.1).

In some embodiments, the width of the microfluidic channel is about half the wavelength of the acoustic standing wave. In some embodiments, applying ultrasound comprises generating an acoustic field (e.g., a half-wavelength standing acoustic field). In some embodiments, applying ultrasound comprises generating an acoustic field via a piezoelectric element coupled to the microfluidic channel. In some embodiments, applying ultrasound comprises continuous wave ultrasound. In some embodiments, the flowing comprises continuous flow. In some embodiments, the fluid in the microfluidic channel comprises: the fluid component of the fluid sample (e.g., the non-cell component of the fluid sample); water; sheath fluid; and/or one or more components configured to increase the density of the fluid in the microfluidic channel (e.g., iodixanol). In some embodiments, the microfluidic channel is situated within a microfluidic device, wherein the microfluidic device comprises a plurality of microfluidic channels, and wherein the method comprises flowing fluid sample(s) through said plurality of microfluidic channels in parallel.

The method can comprise: collapsing the GVs. In some embodiments, collapsing comprises applying ultrasound with a positive acoustic pressure exceeding the critical collapse pressure of the GVs. In some embodiments, the cell comprises: a eukaryotic cell (e.g., a yeast cell); and/or a prokaryotic cell (e.g., a bacterial cell, a gram-positive bacterial cell and/or a gram-negative bacterial cell). In some embodiments, the cell is the cell of a subject, such as, for example, a subject suffering from a disease or disorder (e.g., a blood disease, an immune disease, a cancer, an infectious disease, a genetic disease, a disorder caused by aberrant mtDNA, a metabolic disease, a disorder caused by aberrant cell cycle, a disorder caused by aberrant angiogenesis, a disorder cause by aberrant DNA damage repair, or any combination thereof). In some embodiments, the degree of uptake and/or expression of the GVs by a cell is associated with the presence and/or amount a unique cell type and/or a unique cell state of said cell.

In some embodiments, the first subpopulation of cells comprises cells having a genetic modification of interest and the second subpopulation of cells comprises cells not having a genetic modification of interest. In some embodiments, the second subpopulation of cells comprises cells having a genetic modification of interest and the first subpopulation of cells comprises cells not having a genetic modification of interest. In some embodiments, the genetic modification of interest comprises expression of a payload (e.g., a chimeric antigen receptor). In some embodiments, the genetic modification of interest comprises (i) a deletion of an endogenous nucleic acid sequence at a genomic locus of interest, (ii) a modification of an endogenous nucleic acid sequence at a genomic locus of interest, and/or (iii) an insertion of a nucleic acid at the genomic locus of interest. In some embodiments, the genetic modification of interest comprises editing out an undesirable mutation. In some embodiments, the cell type and/or cell state of a cell comprises the presence or absence of a genetic modification of interest. In some embodiments, the presence or absence of a genetic modification of interest determines the context-dependent uptake of GVs and/or context-dependent expression of GVs. In some embodiments, the method comprises introducing a gene modification vector into the population the cells. In some embodiments, the gene modification vector is configured to introduce the genetic modification of interest into said cells. In some embodiments, the gene modification vector is configured to express the GVs as a selection marker. In some embodiments, the gene modification vector is a viral vector, a plasmid, a transposable element (e.g., piggybac transposon, sleeping beauty transposon), a naked DNA vector, a lipid nanoparticle (LNP), or any combination thereof. In some embodiments, the viral vector is an AAV vector, a lentivirus vector, a retrovirus vector, an adenovirus vector, a herpesvirus vector, a herpes simplex virus vector, a cytomegalovirus vector, a vaccinia virus vector, a MVA vector, a baculovirus vector, a vesicular stomatitis virus vector, a human papillomavirus vector, an avipox virus vector, a Sindbis virus vector, a VEE vector, a Measles virus vector, an influenza virus vector, a hepatitis B virus vector, an integration-deficient lentivirus (IDLV) vector, or any combination thereof.

In some embodiments, each cell of the population of cells comprises: one or more context-dependent promoters operably connected to one or more gas vesicle (GV) polynucleotides comprising: one or more gas vesicle structural (GVS) gene(s) encoding one or more GVS protein(s); and/or one or more first promoters operably connected to one or more gas vesicle (GV) polynucleotides comprising: one or more gas vesicle assembly (GVA) gene(s) encoding one or more GVA protein(s), and wherein the one or more GVA protein(s) and the one or more GVS protein(s) are capable of forming gas vesicles (GVs) upon expression in a cell. In some embodiments, the activity of the context-dependent promoter and/or the degree of expression of the GVs is associated with the presence and/or amount a unique cell type and/or a unique cell state. In some embodiments, each cell of the population of cells comprises one or more first promoters operably connected to one or more gas vesicle (GV) polynucleotides comprising: one or more gas vesicle assembly (GVA) gene(s) encoding one or more GVA protein(s), and one or more gas vesicle structural (GVS) gene(s) encoding one or more GVS protein(s), wherein the one or more GVA protein(s) and the one or more GVS protein(s) are capable of forming gas vesicles (GVs) upon expression in a cell. In some embodiments, the expression of a payload protein is linked to the expression of a GVS protein via a tandem gene expression element (e.g., an internal ribosomal entry site (IRES), foot-and-mouth disease virus 2A peptide (F2A), equine rhinitis A virus 2A peptide (E2A), porcine teschovirus 2A peptide (P2A) or Thosea asigna virus 2A peptide (T2A), or any combination thereof). In some embodiments, the second subpopulation of cells comprises (i) cells of a unique cell type, (ii) cells of a unique cell state, and/or (iii) cells expressing a payload protein.

In some embodiments, each cell of the population of cells comprises: a context-dependent promoter operably linked to a transactivator polynucleotide comprising a transactivator gene, wherein the context-dependent promoter is capable of inducing transcription of the transactivator gene to generate a transactivator transcript, wherein the transactivator transcript is capable of being translated to generate a transactivator, wherein the activity of the context-dependent promoter and/or the degree of expression of the transactivator is associated with the presence and/or amount a unique cell type and/or a unique cell state, wherein, in the presence of the transactivator and a transactivator-binding compound, the first promoter is capable of inducing transcription of the one or more GV polynucleotides to generate GV transcript(s), and wherein the GV transcript(s) are capable of being translated to generate GVA protein(s) and/or GVS protein(s).

In some embodiments, the first promoter comprises one or more copies of a transactivator recognition sequence the transactivator is capable of binding to induce transcription, and wherein the transactivator is incapable of binding the transactivator recognition sequence in the absence of the transactivator-binding compound. In some embodiments, the one or more copies of a transactivator recognition sequence comprise one or more copies of a tet operator (TetO). In some embodiments, the one or more copies of a transactivator recognition sequence comprise one or more copies of a tet operator (TetO). In some embodiments, the first promoter comprises a tetracycline response element (TRE), and wherein the TRE comprises one or more copies of a tet operator (TetO). In some embodiments, the transactivator comprises reverse tetracycline-controlled transactivator (rtTA). In some embodiments, the transactivator comprises tetracycline-controlled transactivator (tTA). In some embodiments, the transactivator-binding compound comprises tetracycline, doxycycline or a derivative thereof. In some embodiments, the transactivator comprises a constitutive signal peptide for protein degradation (e.g., PEST).

In some embodiments, one or more GV polynucleotides and/or transactivator polynucleotide comprise: a 5'UTR and/or a 3'UTR; a tandem gene expression element selected from the group comprising an internal ribosomal entry site (IRES), foot-and-mouth disease virus 2A peptide (F2A), equine rhinitis A virus 2A peptide (E2A), porcine teschovirus 2A peptide (P2A) or Thosea asigna virus 2A peptide (T2A), or any combination thereof; and/or a transcript stabilization element (e.g., woodchuck hepatitis post-translational regulatory element (WPRE), bovine growth hormone polyadenylation (bGH-polyA) signal sequence, human growth hormone polyadenylation (hGH-polyA) signal sequence, or any combination thereof). In some embodiments, the one or more first promoters comprise: a minimal promoter (e.g., TATA, miniCMV, and/or miniPromo); a tissue-specific promoter and/or a lineage-specific promoter; and/or a ubiquitous promoter (e.g., a minEfla promoter, a cytomegalovirus (CMV) immediate early promoter, a CMV promoter, a viral simian virus 40 (SV40) (e.g., early or late), a Moloney murine leukemia virus (MoMLV) LTR promoter, a Rous sarcoma virus (RSV) LTR, an RSV promoter, a herpes simplex virus (HSV) (thymidine kinase) promoter, H5, P7.5, and P11 promoters from vaccinia virus, an elongation factor 1-alpha (EF1a) promoter, early growth response 1 (EGR1), ferritin H (FerH), ferritin L (FerL), Glyceraldehyde 3-phosphate dehydrogenase (GAPDH), eukaryotic translation initiation factor 4A1 (EIF4A1), heat shock 70 kDa protein 5 (HSPA5), heat shock protein 90 kDa beta, member 1 (HSP90B1), heat shock protein 70 kDa (HSP70), β-kinesin (β-KIN), the human ROSA 26 locus, a Ubiquitin C promoter (UBC), a phosphoglycerate kinase-1 (PGK) promoter, 3-phosphoglycerate kinase promoter, a cytomegalovirus enhancer, human β-actin (HBA) promoter, chicken β-actin (CBA) promoter, a CAG promoter, a CASI promoter, a CBH promoter, or any combination thereof).

In some embodiments, the GVA genes and/or GVS genes are derived from *Bacillus Megaterium*, *Anabaena flosaquae*, *Serratia* sp., *Bukholderia thailandensis*, *B. megate-*

*rium, Frankia* sp, *Haloferax mediaterranei, Halobacterium* sp, *Halorubrum vacuolatum, Microcystis aeruginosa, Methanosarcina barkeri, Streptomyces coelicolor,* and/or *Psychromonas ingrahamii.* In some embodiments, the one or more GV polynucleotides comprise: two or more GVS genes derived from different prokaryotic species; GVA genes and/or GVS genes from *Bacillus Megaterium, Anabaena flos-aquae, Serratia* sp., *Bukholderia thailandensis, B. megaterium, Frankia* sp, *Haloferax mediaterranei, Halobacterium* sp, *Microchaete diplosiphon, Nostoc* sp, *Halorubrum vacuolatum, Microcystis aeruginosa, Methanosarcina barkeri, Streptomyces coelicolor,* and/or *Psychromonas ingrahamii*; gvpB, gvpN gvpF, gvpG, gvpL gvpS, gvpK, gvpJ, and/or gvpU from *B. megaterium*; gvpA, gvpC, gvpN, gvpJ, gvpK, gvpF, gvpG, gvpV, and/or gvpW from *Anabaena flos-aquae*; gvpR, gvpN, gvpF, gvpG, gvpL, gvpS, gvpK, gvpJ, gvpT and/or gvpU from *B. megaterium* and gvpA from *Anabaena flos-aquae*; gvpA, and/or gvpC from *Anabaena flos-aquae*, and gvpN, gvpF, gvpG, gvpL, gvpS, gvpK, gvpJ, and/or gvpU from *B. megaterium*; and/or gvpA, gvpC and/or gvpN from *Anabaena flos-aquae*, and gvpF, gvpG, gvpL, gvpS, gvpK, gvpJ, and/or gvpU from *B. megaterium.* In some embodiments, the GVA genes and GVS genes have sequences codon optimized for expression in a eukaryotic cell. In some embodiments, the GVs comprise a GVS variant engineered to present a tag enabling clustering in the cell. In some embodiments, the GVs are hybrid GVs derived from two or more prokaryotic species. In some embodiments, the density and/or compressibility of the GVs is capable of being configured to tune the acoustophoretic phenotypic properties of cells expressing said GVs. In some embodiments, the GVs comprise a GvpC variant. In some embodiments, the GvpC variant comprises: a protease-sensing GvpC protein comprising at least one protease recognition site inserted within the central portion and/or attached to at least one of the N-terminus and the C-terminus of the Gvp; and/or a $Ca^{2+}$-sensing GvpC protein comprising a $Ca^{2+}$-binding domain and an interaction domain.

In some embodiments, the unique cell state comprises activation of one or more cellular activities of interest. In some embodiments, a unique cell type and/or a unique cell state is caused by hereditable, environmental, and/or idiopathic factors. In some embodiments, a unique cell type and/or a unique cell state is caused by and/or associated with the expression of one or more endogenous proteins whose expression is regulated by the endogenous context-dependent promoter. In some embodiments, the unique cell state and/or unique cell type is characterized by signaling of one or more endogenous signal transducer(s) (e.g., signal transducer(s) regulated by the endogenous context-dependent promoter). In some embodiments, the unique cell type and/or the cell in the unique cell state (i) causes and/or aggravates a disease or disorder and/or (ii) is associated with the pathology of a disease or disorder. In some embodiments, the unique cell state and/or unique cell type is characterized by aberrant signaling of one or more signal transducer(s). In some embodiments, the aberrant signaling involves: an overactive signal transducer; a constitutively active signal transducer over a period of time; an active signal transducer repressor and an active signal transducer; an inactive signal transducer activator and an active signal transducer; an inactive signal transducer; an underactive signal transducer; a constitutively inactive signal transducer over a period of time; an inactive signal transducer repressor and an inactive signal transducer; and/or an active signal transducer activator and an inactive signal transducer. In some embodiments, the aberrant signaling comprises an aberrant signal of at least one signal transduction pathway regulating cell survival, cell growth, cell proliferation, cell adhesion, cell migration, cell metabolism, cell morphology, cell differentiation, apoptosis, or any combination thereof. In some embodiments, the signal transduscer(s) is AKT, PI3K, MAPK, p44/42 MAP kinase, TYK2, p38 MAP kinase, PKC, PKA, SAPK, ELK, JNK, cJun, RAS, Raf, MEK 1/2, MEK 3/6, MEK 4/7, ZAP-70, LAT, SRC, LCK, ERK 1/2, Rsk 1, PYK2, SYK, PDK1, GSK3, FKHR, AFX, PLCγ, PLCγ, NF-kB, FAK, CREB, αIIIβ3, FcεRI, BAD, p70S6K, STAT1, STAT2, STAT3, STAT5, STAT6, or any combination thereof. In some embodiments, the disease or disorder is characterized by an aberrant signaling of the signal transducer.

In some embodiments, the unique cell state comprises: a physiological state (e.g., a cell cycle state, a differentiation state, a development state, a metabolic state, or a combination thereof); and/or a pathological state (e.g., a disease state, a human disease state, a diabetic state, an immune disorder state, a neurodegenerative disorder state, an oncogenic state, or a combination thereof). In some embodiments, the unique cell state and/or unique cell type is characterized by one or more of cell proliferation, stress pathways, oxidative stress, stress kinase activation, DNA damage, lipid metabolism, carbohydrate regulation, metabolic activation including Phase I and Phase II reactions, Cytochrome P-450 induction or inhibition, ammonia detoxification, mitochondrial function, peroxisome proliferation, organelle function, cell cycle state, morphology, apoptosis, DNA damage, metabolism, signal transduction, cell differentiation, cell-cell interaction and cell to non-cellular compartment. In some embodiments, the unique cell state and/or unique cell type is characterized by one or more of acute phase stress, cell adhesion, AH-response, anti-apoptosis and apoptosis, antimetabolism, anti-proliferation, arachidonic acid release, ATP depletion, cell cycle disruption, cell matrix disruption, cell migration, cell proliferation, cell regeneration, cell-cell communication, cholestasis, differentiation, DNA damage, DNA replication, early response genes, endoplasmic reticulum stress, estogenicity, fatty liver, fibrosis, general cell stress, glucose deprivation, growth arrest, heat shock, hepatotoxicity, hypercholesterolemia, hypoxia, immunotox, inflammation, invasion, ion transport, liver regeneration, cell migration, mitochondrial function, mitogenesis, multidrug resistance, nephrotoxicity, oxidative stress, peroxisome damage, recombination, ribotoxic stress, sclerosis, steatosis, teratogenesis, transformation, disrupted translation, transport, and tumor suppression. In some embodiments, the unique cell state and/or unique cell type is characterized by one or more of nutrient deprivation, hypoxia, oxidative stress, hyperproliferative signals, oncogenic stress, DNA damage, ribonucleotide depletion, replicative stress, and telomere attrition, promotion of cell cycle arrest, promotion of DNA-repair, promotion of apoptosis, promotion of genomic stability, promotion of senescence, and promotion of autophagy, regulation of cell metabolic reprogramming, regulation of tumor microenvironment signaling, inhibition of cell stemness, survival, and invasion.

In some embodiments, the cell comprises a eukaryotic cell (e.g., mammalian cell). In some embodiments, the mammalian cell and/or the cell type is: an antigen-presenting cell, a dendritic cell, a macrophage, a neural cell, a brain cell, an astrocyte, a microglial cell, and a neuron, a spleen cell, a lymphoid cell, a lung cell, a lung epithelial cell, a skin cell, a keratinocyte, an endothelial cell, an alveolar cell, an alveolar macrophage, an alveolar pneumocyte, a vascular endothelial cell, a mesenchymal cell, an epithelial cell, a colonic epithelial cell, a hematopoietic cell, a bone marrow cell, a Claudius cell, Hensen cell, Merkel cell, Muller cell, Paneth cell, Purkinje cell, Schwann cell, Sertoli cell, acidophil cell, acinar cell, adipoblast, adipocyte, brown or white alpha cell, amacrine cell, beta cell, capsular cell, cementocyte, chief cell, chondroblast, chondrocyte, chromaffin cell, chromophobic cell, corticotroph, delta cell, Langerhans cell, follicular dendritic cell, enterochromaffin cell, ependymocyte, epithelial cell, basal cell, squamous cell, endothelial cell, transitional cell, erythroblast, erythrocyte, fibroblast, fibrocyte, follicular cell, germ cell, gamete, ovum, spermatozoon, oocyte, primary oocyte, secondary oocyte, spermatid, spermatocyte, primary spermatocyte, secondary spermatocyte, germinal epithelium, giant cell, glial cell, astroblast, astrocyte, oligodendroblast, oligodendrocyte, glioblast, goblet cell, gonadotroph, granulosa cell, haemocytoblast, hair cell, hepatoblast, hepatocyte, hyalocyte, interstitial cell, juxtaglomerular cell, keratinocyte, keratocyte, lemmal cell, leukocyte, granulocyte, basophil, eosinophil, neutrophil, lymphoblast, B-lymphoblast, T-lymphoblast, lymphocyte, B-lymphocyte, T-lymphocyte, helper induced T-lymphocyte, Th1 T-lymphocyte, Th2 T-lymphocyte, natural killer cell, thymocyte, macrophage, Kupffer cell, alveolar macrophage, foam cell, histiocyte, luteal cell, lymphocytic stem cell, lymphoid cell, lymphoid stem cell, macroglial cell, mammotroph, mast cell, medulloblast, megakaryoblast, megakaryocyte, melanoblast, melanocyte, mesangial cell, mesothelial cell, metamyelocyte, monoblast, monocyte, mucous neck cell, myoblast, myocyte, muscle cell, cardiac muscle cell, skeletal muscle cell, smooth muscle cell, myelocyte, myeloid cell, myeloid stem cell, myoblast, myoepithelial cell, myofibrobast, neuroblast, neuroepithelial cell, neuron, odontoblast, osteoblast, osteoclast, osteocyte, oxyntic cell, parafollicular cell, paraluteal cell, peptic cell, pericyte, peripheral blood mononuclear cell, phaeochromocyte, phalangeal cell, pinealocyte, pituicyte, plasma cell, platelet, podocyte, proerythroblast, promonocyte, promyeloblast, promyelocyte, pronormoblast, reticulocyte, retinal pigment epithelial cell, retinoblast, small cell, somatotroph, stem cell, sustentacular cell, teloglial cell, a zymogenic cell, or any combination thereof. In some embodiments, the stem cell comprises an embryonic stem cell, an induced pluripotent stem cell (iPSC), a hematopoietic stem/progenitor cell (HSPC), or any combination thereof.

In some embodiments, the context-dependent promoter comprises a tissue-specific promoter and/or a lineage-specific promoter. In some embodiments, the tissue specific promoter is a liver-specific thyroxin binding globulin (TBG) promoter, an insulin promoter, a glucagon promoter, a somatostatin promoter, a pancreatic polypeptide (PPY) promoter, a synapsin-1 (Syn) promoter, a creatine kinase (MCK) promoter, a mammalian desmin (DES) promoter, a hSynapsin promoter, a α-myosin heavy chain (a-MHC) promoter, or a cardiac Troponin T (cTnT) promoter. In some embodiments, the tissue specific promoter is a neuronal activity-dependent promoter and/or a neuron-specific promoter (e.g., a synapsin-1 (Syn) promoter, a CaMKIIa promoter, a calcium/calmodulin-dependent protein kinase II a promoter, a tubulin alpha I promoter, a neuron-specific enolase promoter, a platelet-derived growth factor beta chain promoter, TRPV1 promoter, a $Na_v1.7$ promoter, a $Na_v1.8$ promoter, a $Na_v1.9$ promoter, or an Advillin promoter). In some embodiments, the tissue specific promoter is a muscle-specific promoter (e.g., a creatine kinase (MCK) promoter).

BRIEF DESCRIPTION OF THE DRAWINGS

FIG. 1A depicts a non-limiting exemplary transmission electron microscopy image of representative GVs from *Anabaena flos-aquae*. FIG. 1B depicts a non-limiting exemplary schematic drawing of a GV, showing its effective density (ρ) and compressibility (β) relative to that of the surrounding water. FIG. 1C depicts a non-limiting exemplary illustration of a GV experiencing acoustic radiation force due to applied ultrasound. FIG. 1D depicts a non-limiting exemplary illustration of a bacterium experiencing enhanced acoustic radiation force due to GVs inside the cell. FIG. 1E depicts a non-limiting exemplary illustration of a mammalian cell experiencing a unique acoustic radiation force due to the intracellular GVs. FIG. 1F depicts data related to estimated magnitude of the acoustic contrast factor, |@|, of GVs and several common materials used in acoustic manipulation. Materials to the left and right of the vertical dashed line exhibit positive and negative acoustic contrast in water, respectively. PBMCs, peripheral blood mononuclear cell. PDMS, polydimethylsiloxane.

FIG. 2A depicts a diagram of the acoustic standing wave setup. A piezoelectric element is coupled to an etched silicon channel whose width is half the acoustic wavelength to generate a standing wave along the x-direction. The channel depth is 47 µm. Particles suspended in an aqueous solution are imaged using an epifluorescence microscope. LED, light-emitting diode. PZT, lead zirconate titanate. FIG. 2B depicts a non-limiting exemplary illustration of the expected migration direction of GVs towards the pressure antinodes of an acoustic standing wave, due to their negative acoustic contrast. FIG. 2C depicts Fluorescence images of GVs inside the microfluidic channel before ultrasound (OFF) and 100 seconds after ultrasound has been turned on (ON). FIG. 2D depicts representative single particle trajectories of GVs before (blue) and during (green) ultrasound application. PA, pressure antinode. PN, pressure node. FIG. 2E depicts a non-limiting exemplary illustration of Brownian motion (left) and representative single-particle mean square displacement curve used to determine the diffusivity of the particle (right). FIG. 2F depicts a non-limiting exemplary illustration of particle acoustophoresis (left) and representative single-particle trajectory in the x direction during ultrasound application, used to determine the peak particle velocity (right). FIG. 2G depicts data related to peak acoustic radiation force of intact GVs (24.5±1.7 fN, n=140 particles), pressure-collapsed GVs (2.0±0.7 fN, n=98 particles), and 200-nm polystyrene particles (−0.6±0.4 fN, n=78 particles). Box-and-whisker plots show the 5-95 percentile, the 25-75 percentile and the median of the distribution. Mann-Whitney test (****: p<0.0001). FIG. 2H depicts data related to peak ARF of GV particles as a function of hydrodynamic radius, fitted to a fractal clustering model (force-mobility exponent=1.39±0.06; $R^2$=0.744). FIG. 2I depicts data related to predicted ARF on a single GV across a range of acoustic parameters.

FIGS. 3A-3H depict non-limiting exemplary schematics and data related to gas vesicle expression in bacteria inverting and magnifying their response to ARF. FIG. 3A depicts a non-limiting exemplary schematic drawing of genetically modified *E. coli* experiencing an enhanced ARF due to the expression of intracellular GVs as bacterial acoustic reporter genes, bARG1. FIG. 3B depicts a TEM image of *E. coli* containing intracellular GVs upon expression of arg1. FIG. 3C depicts fluorescence images of *E. coli* inside the microfluidic channel with either intact or collapsed intracellular GVs, either in the presence or absence of applied ultrasound. FIG. 3D depicts data related to acoustic contrast factor of *E. coli* with intact GVs (−1.0±0.2, n=93 cells) and collapsed GVs (0.10±0.02, n=99 cells). Mann-Whitney test (****: p<0.0001). FIG. 3E depicts a non-limiting exemplary schematic drawing of a bacterial genetic circuit where GV expression is controlled by the inducer Isopropyl β-d-1-thiogalactopyranoside (IPTG). LacR, Lac repressor; LacO, Lac operator. FIG. 3F depicts a non-limiting exemplary schematic drawing of selective acoustic actuation based on cellular genotype. FIG. 3G depicts fluorescence images of a heterogenous cell mixture containing induced (+IPTG) and non-induced (−IPTG) bARG1 *E. coli*, either in the presence or absence of applied ultrasound. FIG. 3H depicts data related to projected fluorescence signal from either the induced or non-induced *E. coli*, either in the presence or absence of applied ultrasound. Solid line and shaded region correspond to the mean and the standard error of the mean (n=3 technical replicates).

FIG. 4A depicts a diagram of the acoustic chamber setup for frequency-controlled spatial patterning. A transducer is aligned orthogonal to a glass reflector using a 3D-printed holder. The sound wave passes through a mylar membrane, is reflected by the glass reflector, and forms a standing wave near the reflector. The sample region containing acoustic *E. coli* is imaged using an epifluorescence microscope. FIG. 4B depicts sequential fluorescence images of acoustic *E. coli* in the presence of an acoustic standing wave at varying frequencies. Frequencies were changed every 50 seconds. FIG. 4C depicts a diagram of the acoustic chamber setup for image-guided trapping and positioning of acoustic *E. coli*. Imaging is performed along the axis of a focused 40 MHz transducer. FIG. 4D depicts sequential fluorescence images of the formation of a cluster of acoustic *E. coli* at the ultrasound focus. FIG. 4E depicts fluorescence images of a cluster of acoustic *E. coli* positioned at distinct locations in the x-y plane. The positioning is controlled by the translation of the transducer in the x-y plane using a micromanipulator and is guided by real-time fluorescence imaging of the bacteria. FIG. 4F depicts data related to overlaid positions of the cell cluster, color-coded by time, to form a spatiotemporal pattern writing out "CIT". FIG. 4G depicts a diagram of the process for acoustic biofabrication. A transducer and phase mask is aligned such that the acoustic hologram is formed inside the sample chamber containing acoustic *E. coli* suspended in low-melt agarose solution. The gelation of the agarose is triggered to immobilize the acoustically patterned *E. coli*. FIG. 4H depicts data related to simulated pressure amplitude generated by the acoustic hologram. FIG. 4I, Acoustically patterned *E. coli* embedded in agarose gel. FIG. 4J depicts an ultrasound image of acoustically patterned *E. coli*.

FIG. 5A depicts a non-limiting exemplary schematic drawing of mammalian cells experiencing an inversion of their acoustic contrast factor due to intracellular GVs. FIG. 5B depicts a non-limiting exemplary schematic drawing of genetically modified mammalian cells expressing intracellular GVs as mammalian acoustic reporter genes (mARG1). FIG. 5C depicts fluorescence images of mammalian cells inside the microfluidic channel with either intact mARG1 GVs, collapsed mARG1 GVs or mCherry, either in the presence or absence of applied ultrasound. FIG. 5D depicts data related to percentage of cells that have negative contrast factor with either intact mARG1 GVs (38±4%, n=17 technical replicates), collapse mARG1 GVs (0%, n=10 technical replicates), or mCherry (0%, n=11 technical replicates). Mann-Whitney test (**: p<0.0001). FIG. 5E depicts a non-limiting exemplary schematic drawing of GVs internalized in the lysosomal compartment of a mammalian cell. FIG. 5F depicts data related to fluorescence images of macrophages with internalized GVs inside the microfluidic channel either in the presence or absence of applied ultrasound. Cells that move to the walls (solid line) have negative contrast factor, while those that move to the center (dashed line) have positive acoustic contrast. FIG. 5G depicts images of fluorescence from either macrophages or GVs in the applied acoustic field. Circular ROIs indicate the location of the macrophage. FIG. 5H depicts data related to the fluorescence intensity of GVs at the location of the macrophages that have either negative (n=20 cells) or non-negative (n=24 cells) contrast factors. Mann-Whitney test (**: p<0.0001).

FIG. 6A depicts a non-limiting exemplary schematic drawing of mammalian cells expressing gas vesicles and a fluorescent protein via transiently transfected plasmids. The expression of the gas vesicle structural protein GvpA is linked to the expression of the fluorescent protein EBPF2 via the IRES sequence and driven by a constitutive promoter. The remaining genes necessary for gas vesicle production are driven by the same constitutive promoter and supplied concurrently on individual plasmids. FIG. 6B depicts a representative overlaid fluorescence and phase-contrast image of the engineered mammalian cells showing colocalized expression of EBFP2 and GVs. Red arrows point to clusters of intracellular GVs. FIG. 6C depicts a non-limiting exemplary schematic drawing of the acoustofluidic device with three inlet channels and three outlet channels. Pre-sorted cells are introduced through the center inlet channel and hydrodynamically focused to the center flow stream with the aid of the sheath flow introduced by the two side inlet channels. The half-wavelength standing acoustic field generated by the PZT moves cells with high GV expression towards the pressure antinodes positioned at the channel walls, whereas cells with no or little GV expression would remain in the center flow stream or further moved towards the pressure node positioned at the center flow stream, respectively. Separation of the flow streams at the trifurcation outlet allows for collection of the sorted cell population enriched for GV expression at the side outlets. FIG. 6D depicts a representative fluorescence distribution of the pre-sorted and sorted populations of cells as measured using fluorescent flow cytometry. BFP (+) cells are defined as cells with higher fluorescence intensity than wildtype cells. FIG. 6E depicts data related to the percentage of BFP (+) cells before and after acoustofluidic cell enrichment (n=5 trials). Paired t-test (***: p<0.001).

FIG. 7A depicts TEM images of intact and collapsed Ana GVs. Collapse occurs when the positive acoustic pressure exceeds the critical collapse pressure of the GV. FIG. 7B depicts data related to the acoustic collapse profile of AnaΔC GVs. The critical collapse pressure is determined to be the pressure at which 50% of the GVs have been collapsed. Data adapted from Lakshmanan, et al. (2016). FIG. 7C depicts a non-limiting exemplary illustration of the expected behavior of GVs inside a microfluidic channel with a half-wavelength standing wave. GVs in regions with acoustic pressures lower than their critical collapse pressure migrate towards regions of higher pressure due to ARF, while GVs in regions with pressure above their critical threshold collapse and therefore remain stationary. The boundary between laterally migrating and stationary GVs indicates a pressure corresponding to the GVs' critical collapse pressure. Pus indicates the temporal peak pressure. FIG. 7D depicts fluorescence images of GVs inside a microfluidic channel in the presence of an acoustic field driven with increasing voltage. FIG. 7E depicts data related to the maximum pressure in the acoustic device, as determined using videos of the corresponding conditions in (d) (n=3 technical replicates) and a standard calibration method using single particle tracking of polystyrene microbeads (PS). FIG. 7F depicts data related to the acoustic collapse pressure curves of AnaΔC and Mega GVs. Data adapted from Lakshmanan, et al. (2016) and Farhadi et al. (2018). FIG. 7G depicts fluorescence images of either AnaΔC or Mega GV solutions experiencing the same acoustic field, with the peak driving pressure of 1.2 MPa selected to be above the critical collapse pressure of AnaΔC GVs, but below that of Mega GVs.

FIG. 9A depicts a representative TEM image of a polystyrene particle (top) and quantification of the particle radius (bottom, 2.457±0.003 μm, mean±S.E.M., n=7). FIG. 9B depicts a fluorescence image and overlaid acoustophoretic trajectory of polystyrene particles inside the acoustofluidic channel. The white lines demarcate the edges of the channel. Arrows indicated direction of particle movement. FIG. 9C depicts a representative single-particle trajectory in the x-direction during ultrasound stimulation (top), and quantification of the peak particle velocity (bottom, 2.0±0.1 μm/s, mean±S.E.M., n=7). The acoustic energy was determined using the radius, the acoustic contrast factor and the position over time of polystyrene particles (Methods-Calibration of the acoustofluidic channel).

DETAILED DESCRIPTION

Figure 1A:
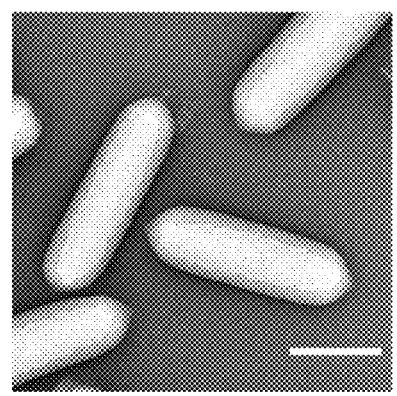
FIGS. 1A-1F depict non-limiting exemplary schematics and data related to gas vesicles as biomolecular transducers of acoustic radiation force.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein and made part of the disclosure herein.

All patents, published patent applications, other publications, and sequences from GenBank, and other databases referred to herein are incorporated by reference in their entirety with respect to the related technology.

Disclosed herein include methods of sorting a population of cells. In some embodiments, the method comprises: flowing a fluid sample through a microfluidic channel, wherein the microfluidic channel comprises one or more flow stream(s) introduced in the microfluidic channel via one or more inlet channel(s) and exiting the microfluidic channel via two or more outlet channels. In some embodiments, the fluid sample comprises a population of cells, wherein the population the cells have been configured to express gas vesicles (GVs) in a context-dependent manner, wherein the expression of GVs within a cell increases the compressibility ($\beta$) and reduces the density ($\rho$) of said cell, thereby modulating the acoustic contrast ($\Phi$) of said cell relative to the fluid in the microfluidic channel. In some embodiments, the cellular expression of GVs above a threshold level of expression imparts a threshold negative acoustic contrast on said cell. In some embodiments, the population of cells comprises or is suspected of comprising: (i) a first subpopulation of cells having a nonnegative acoustic contrast or a negative acoustic contrast below the threshold negative acoustic contrast, and/or (ii) a second subpopulation of cells having a negative acoustic contrast at or above the threshold negative acoustic contrast. In some embodiments, the method comprises: applying ultrasound to the microfluidic channel, wherein applying ultrasound comprises generating acoustic standing wave(s) in the microfluidic channel, wherein the acoustic standing wave(s) position pressure antinode(s) in the microfluidic channel, and wherein the second subpopulation of cells is actuated towards flow stream(s) comprising the pressure antinode(s). In some embodiments, the method does not comprise buoyancy purification of the population of cells.

Disclosed herein include methods of sorting a population of cells. In some embodiments, the method comprises: flowing a fluid sample through a microfluidic channel, wherein the microfluidic channel comprises one or more flow stream(s) introduced in the microfluidic channel via one or more inlet channel(s) and exiting the microfluidic channel via two or more outlet channels. In some embodiments, the fluid sample comprises a population of cells, wherein the population of cells has been incubated with gas vesicles (GVs), wherein cells of the population of cells have varying capacity to uptake said GVs, and wherein population the cells is capable of uptaking GVs in a context-dependent manner. In some embodiments, the levels of GVs within a cell increases the compressibility ($\beta$) and reduces the density ($\rho$) of said cell, thereby modulating the acoustic contrast ($\Phi$) of said cell relative to the fluid in the microfluidic channel. In some embodiments, the uptake of GVs above a threshold level of uptake imparts a threshold negative acoustic contrast on said cell. In some embodiments, the population of cells comprises or is suspected of comprising: (i) a first subpopulation of cells having a nonnegative acoustic contrast or a negative acoustic contrast below the threshold negative acoustic contrast, and/or (ii) a second subpopulation of cells having a negative acoustic contrast at or above the threshold negative acoustic contrast. In some embodiments, the method comprises: applying ultrasound to the microfluidic channel, wherein applying ultrasound comprises generating acoustic standing wave(s) in the microfluidic channel, wherein the acoustic standing wave(s) position pressure antinode(s) in the microfluidic channel, and wherein the second subpopulation of cells is actuated towards flow stream(s) comprising the pressure antinode(s). In some embodiments, the method does not comprise buoyancy purification of the population of cells.

Definitions

Unless defined otherwise, technical and scientific terms used herein have the same meaning as commonly understood by one of ordinary skill in the art to which the present disclosure belongs. See, e.g. Singleton et al., Dictionary of Microbiology and Molecular Biology 2nd ed., J. Wiley & Sons (New York, NY 1994); Sambrook et al., Molecular Cloning, A Laboratory Manual, Cold Spring Harbor Press (Cold Spring Harbor, NY 1989). For purposes of the present disclosure, the following terms are defined below.

As used herein, the terms "nucleic acid" and "polynucleotide" are interchangeable and can refer to any nucleic acid, whether composed of phosphodiester linkages or modified linkages such a phosphotriester, phosphoramidate, siloxane, carbonate, carboxymethylester, acetamidate, carbamate, thioether, bridged phosphoramidate, bridged methylene phosphonate, bridged phosphoramidate, bridged phosphoramidate, bridged methylene phosphonate, phosphorothioate, methylphosphonate, phosphorodithioate, bridged phosphorothioate or sultone linkages, and combinations of such linkages. The terms "nucleic acid" and "polynucleotide" also specifically include nucleic acids composed of bases other than the five biologically occurring bases (adenine, guanine, thymine, cytosine and uracil).

The term "vector" as used herein, can refer to a vehicle for carrying or transferring a nucleic acid. Non-limiting examples of vectors include plasmids and viruses (for example, AAV viruses).

The term "construct," as used herein, can refer to a recombinant nucleic acid that has been generated for the purpose of the expression of a specific nucleotide sequence(s), or that is to be used in the construction of other recombinant nucleotide sequences.

As used herein, the term "plasmid" can refer to a nucleic acid that can be used to replicate recombinant DNA sequences within a host organism. The sequence can be a double stranded DNA.

The term "element" can refer to a separate or distinct part of something, for example, a nucleic acid sequence with a separate function within a longer nucleic acid sequence. The term "regulatory element" and "expression control element" are used interchangeably herein and refer to nucleic acid molecules that can influence the expression of an operably linked coding sequence in a particular host organism. These terms are used broadly to and cover all elements that promote or regulate transcription, including promoters, core elements required for basic interaction of RNA polymerase and transcription factors, upstream elements, enhancers, and response elements (see, e.g., Lewin, "Genes V" (Oxford University Press, Oxford) pages 847-873). Exemplary regulatory elements in prokaryotes include promoters, operator sequences and a ribosome binding sites. Regulatory elements that are used in eukaryotic cells can include, without limitation, transcriptional and translational control sequences, such as promoters, enhancers, splicing signals, polyadenylation signals, terminators, protein degradation signals, internal ribosome-entry element (IRES), 2A sequences, and the like, that provide for and/or regulate expression of a coding sequence and/or production of an encoded polypeptide in a host cell.

As used herein, the term "enhancer" refers to a type of regulatory element that can increase the efficiency of transcription, regardless of the distance or orientation of the enhancer relative to the start site of transcription.

The term "construct," as used herein, can refer to a recombinant nucleic acid that has been generated for the purpose of the expression of a specific nucleotide sequence(s), or that is to be used in the construction of other recombinant nucleotide sequences.

As used herein, the term "variant" can refer to a polynucleotide or polypeptide having a sequence substantially similar to a reference polynucleotide or polypeptide. In the case of a polynucleotide, a variant can have deletions, substitutions, additions of one or more nucleotides at the 5' end, 3' end, and/or one or more internal sites in comparison to the reference polynucleotide. Similarities and/or differences in sequences between a variant and the reference polynucleotide can be detected using conventional techniques known in the art, for example polymerase chain reaction (PCR) and hybridization techniques. Variant polynucleotides also include synthetically derived polynucleotides, such as those generated, for example, by using site-directed mutagenesis. Generally, a variant of a polynucleotide, including, but not limited to, a DNA, can have at least about 50%, about 55%, about 60%, about 65%, about 70%, about 75%, about 80%, about 85%, about 90%, about 91%, about 92%, about 93%, about 94%, about 95%, about 96%, about 97%, about 98%, about 99% or more sequence identity to the reference polynucleotide as determined by sequence alignment programs known by skilled artisans. In the case of a polypeptide, a variant can have deletions, substitutions, additions of one or more amino acids in comparison to the reference polypeptide. Similarities and/or differences in sequences between a variant and the reference polypeptide can be detected using conventional techniques known in the art, for example Western blot. Generally, a variant of a polypeptide, can have at least about 60%, about 65%, about 70%, about 75%, about 80%, about 85%, about 90%, about 91%, about 92%, about 93%, about 94%, about 95%, about 96%, about 97%, about 98%, about 99% or more sequence identity to the reference polypeptide as determined by sequence alignment programs known by skilled artisans.

As used herein, a "subject" refers to an animal that is the object of treatment, observation or experiment. "Animal" includes cold- and warm-blooded vertebrates and invertebrates such as fish, shellfish, reptiles, and in particular, mammals. "Mammal," as used herein, refers to an individual belonging to the class Mammalia and includes, but not limited to, humans, domestic and farm animals, zoo animals, sports and pet animals. Non-limiting examples of mammals include mice; rats; rabbits; guinea pigs; dogs, cats; sheep; goats; cows; horses; primates, such as monkeys, chimpanzees and apes, and, in particular, humans. In some embodiments, the mammal is a human. However, in some embodiments, the mammal is not a human. In some embodiments, the subject is a rodent (e.g., rat or mouse). In some embodiments, the subject is a primate (e.g., human or monkey).

Genetically Encoded Actuators for Acoustic Inversion, Manipulation and Patterning of Engineered Cells The ability to selectively manipulate and control the spatial arrangement of genetically defined cells is critical for the fields of living materials, biomedicine and synthetic biology. Ultrasound has the ability to manipulate a variety of objects remotely and en masse with high spatial and temporal precision via acoustic radiation force (ARF). However, this capability is currently disconnected from intracellular genetic programs. Here, it is shown that gas vesicles (GVs)—a unique class of genetically encoded gas-filled protein nanostructures—can serve as genetically encodable actuators for ARF, enabling the selective acoustic inversion and manipulation of engineered cells. Due to their differential density and compressibility relative to water, GVs are effectively moved with acoustic standing waves despite their nanometer dimensions. When expressed inside genetically engineered cells, GVs amplify the ARF experienced by the cells by a factor of ten and invert their acoustic contrast, allowing the cells to be selectively manipulated with sound waves based on their genotype. This enables dynamic patterning, focal trapping, translation, holographic bioprinting, and microfluidic sorting of specific cells with acoustic fields. In addition, the unique material properties of purified GVs enable new modes of acoustic interaction, including force inactivation, multiplexed manipulation, and endosomal labeling. Unlike fluorescent proteins, which have no intrinsic ability to serve as actuators for cellular manipulation, GVs provide a direct link between gene expression and mechanical actuation, creating a new paradigm for molecular and cellular control in a broad range of contexts.

There are provided, in some embodiments, methods of sorting a population of cells. In some embodiments, the method comprises: flowing a fluid sample through a microfluidic channel, wherein the microfluidic channel comprises one or more (e.g., 1, 2, 3, 4, 5, 6, 7, 8, 9, 10, 11, 12, 13, 14, 15, 16, 17, 18, 19, 20, 25, 30, or a number or a range between any two of the values) flow stream(s) introduced in the microfluidic channel via one or more (e.g., 1, 2, 3, 4, 5, 6, 7, 8, 9, 10, 11, 12, 13, 14, 15, 16, 17, 18, 19, 20, 25, 30, or a number or a range between any two of the values) inlet channel(s) and exiting the microfluidic channel via two or more (e.g., 2, 3, 4, 5, 6, 7, 8, 9, 10, 11, 12, 13, 14, 15, 16, 17, 18, 19, 20, 25, 30, or a number or a range between any two of the values) outlet channels. In some embodiments, the fluid sample comprises a population of cells, wherein the population the cells have been configured to express gas vesicles (GVs) in a context-dependent manner, wherein the expression of GVs within a cell increases the compressibility ($\beta$) and reduces the density ($\rho$) of said cell, thereby modulating the acoustic contrast ($\Phi$) of said cell relative to the fluid in the microfluidic channel. In some embodiments, the cellular expression of GVs above a threshold level of expression imparts a threshold negative acoustic contrast on said cell. In some embodiments, the population of cells comprises or is suspected of comprising: (i) a first subpopulation of cells having a nonnegative acoustic contrast or a negative acoustic contrast below the threshold negative acoustic contrast, and/or (ii) a second subpopulation of cells having a negative acoustic contrast at or above the threshold negative acoustic contrast. In some embodiments, the method comprises: applying ultrasound to the microfluidic channel, wherein applying ultrasound comprises generating acoustic standing wave(s) in the microfluidic channel, wherein the acoustic standing wave(s) position pressure antinode(s) in the microfluidic channel, and wherein the second subpopulation of cells is actuated towards flow stream(s) comprising the pressure antinode(s). In some embodiments, the method does not comprise buoyancy purification of the population of cells.

There are provided, in some embodiments, methods of sorting a population of cells. In some embodiments, the method comprises: flowing a fluid sample through a microfluidic channel, wherein the microfluidic channel comprises one or more (e.g., 1, 2, 3, 4, 5, 6, 7, 8, 9, 10, 11, 12, 13, 14, 15, 16, 17, 18, 19, 20, 25, 30, or a number or a range between any two of the values) flow stream(s) introduced in the microfluidic channel via one or more (e.g., 1, 2, 3, 4, 5, 6, 7, 8, 9, 10, 11, 12, 13, 14, 15, 16, 17, 18, 19, 20, 25, 30, or a number or a range between any two of the values) inlet channel(s) and exiting the microfluidic channel via two or more (e.g., 1, 2, 3, 4, 5, 6, 7, 8, 9, 10, 11, 12, 13, 14, 15, 16, 17, 18, 19, 20, 25, 30, or a number or a range between any two of the values) outlet channels. In some embodiments, the fluid sample comprises a population of cells, wherein the population of cells has been incubated with gas vesicles (GVs), wherein cells of the population of cells have varying capacity to uptake said GVs, and wherein population the cells is capable of uptaking GVs in a context-dependent manner. In some embodiments, the levels of GVs within a cell increases the compressibility ($\beta$) and reduces the density ($\rho$) of said cell, thereby modulating the acoustic contrast ($\Phi$) of said cell relative to the fluid in the microfluidic channel. In some embodiments, the uptake of GVs above a threshold level of uptake imparts a threshold negative acoustic contrast on said cell. In some embodiments, the population of cells comprises or is suspected of comprising: (i) a first subpopulation of cells having a nonnegative acoustic contrast or a negative acoustic contrast below the threshold negative acoustic contrast, and/or (ii) a second subpopulation of cells having a negative acoustic contrast at or above the threshold negative acoustic contrast. In some embodiments, the method comprises: applying ultrasound to the microfluidic channel, wherein applying ultrasound comprises generating acoustic standing wave(s) in the microfluidic channel, wherein the acoustic standing wave(s) position pressure antinode(s) in the microfluidic channel, and wherein the second subpopulation of cells is actuated towards flow stream(s) comprising the pressure antinode(s). In some embodiments, the method does not comprise buoyancy purification of the population of cells.

Some embodiments of the systems and methods described herein may include one or more microfluidic components, for example, one or more microfluidic channels. "Microfluidic," as used herein, refers to a device, apparatus or system including at least one fluid channel having a cross-sectional dimension of less than 1 mm, and a ratio of length to largest cross-sectional dimension of at least 3:1. A "microfluidic channel," as used herein, is a channel meeting these criteria. The "cross-sectional dimension" of the channel is measured perpendicular to the direction of fluid flow within the channel. Thus, some or all of the fluid channels in microfluidic embodiments of the disclosed methods may have maximum cross-sectional dimensions less than 2 mm, and in some embodiments, less than 1 mm. In one set of embodiments, all fluid channels containing embodiments of the disclosed methods are microfluidic or have a largest cross sectional dimension of no more than 2 mm or 1 mm. A "channel," as used herein, means a feature on or in an article (substrate) that at least partially directs flow of a fluid. The channel can have any cross-sectional shape (circular, oval, triangular, irregular, square or rectangular, or the like) and can be covered or uncovered. In embodiments where it is completely covered, at least one portion of the channel can have a cross-section that is completely enclosed, or the entire channel may be completely enclosed along its entire length with the exception of its inlet(s) and/or outlet(s). A channel may also have an aspect ratio (length to average cross sectional dimension) of at least 2:1, more typically at least 3:1, 5:1, 10:1, 15:1, 20:1, or more. An open channel generally will include characteristics that facilitate control over fluid transport, e.g., structural characteristics (an elongated indentation) and/or physical or chemical characteristics (hydrophobicity vs. hydrophilicity) or other characteristics that can exert a force (e.g., a containing force) on a fluid. The fluid within the channel may partially or completely fill the channel. In some embodiments where an open channel is used, the fluid may be held within the channel, for example, using surface tension (i.e., a concave or convex meniscus). The channel may be of any size, for example, having a largest dimension perpendicular to fluid flow of less than about 5 mm or 2 mm, or less than about 1 mm, or less than about 500 microns, less than about 200 microns, less than about 100 microns, less than about 60 microns, less than about 50 microns, less than about 40 microns, less than about 30 microns, less than about 25 microns, less than about 10 microns, less than about 3 microns, less than about 1 micron, less than about 300 nm, less than about 100 nm, less than about 30 nm, or less than about 10 nm. In some embodiments the dimensions of the channel may be chosen such that fluid is able to freely flow through the article or substrate. The dimensions of the channel may also be chosen, for example, to allow a certain volumetric or linear flowrate of fluid in the microfluidic channel. Of course, the number of channels and the shape of the channels can be varied by any method known to those of ordinary skill in the art. In some embodiments, more than one channel or capillary may be used. For example, two or more channels may be used, where they are positioned inside each other, positioned adjacent to each other, positioned to intersect with each other, etc.

The one or more inlet channel(s) can comprise a center inlet channel and/or one or more side inlet channel(s). The two or more outlet channels can comprise a center outlet channel and/or one or more side outlet channel(s). The one or more flow stream(s) can comprise a center flow stream and/or one or more peripheral flow stream(s). In some embodiments, a flow stream may have an average cross-sectional dimension smaller than about 90% of an average cross-sectional dimension of the channel, and in some embodiments, smaller than about 80%, about 70%, about 60%, about 50%, about 40%, or about 30% of the average cross-sectional dimension of the channel. In other embodiments, the flow stream may have an average cross-sectional dimension smaller than about 20%, about 10%, about 5%, about 3%, about 1%, about 0.5%, about 0.3%, about 0.1%, about 0.05%, about 0.03%, or about 0.01% of the average cross-sectional dimension of the channel. The flow stream, in some embodiments, may be produced on the microscale, e.g., using a microfluidic channel. For instance, the flow stream may have an average cross-sectional dimension of less than about 1 mm, less than about 500 microns, less than about 300 microns, or less than about 100 microns. In some embodiments, the flow stream may have an average diameter of less than about 60 microns, less than about 50 microns, less than about 40 microns, less than about 30 microns, less than about 25 microns, less than about 10 microns, less than about 5 microns, less than about 3 microns, or less than about 1 micron.

In some embodiments, the one or more flow streams comprise: a center flow stream introduced in the microfluidic channel via a center inlet channel and exiting the microfluidic channel via a center outlet channel; and one or more (e.g., 1, 2, 3, 4, 5, 6, 7, 8, 9, 10, 11, 12, 13, 14, 15, 16, 17, 18, 19, 20, 25, 30, or a number or a range between any two of the values) peripheral flow stream(s) introduced in the microfluidic channel via one or more side inlet channel(s) and exiting the microfluidic channel via one or more (e.g., 1, 2, 3, 4, 5, 6, 7, 8, 9, 10, 11, 12, 13, 14, 15, 16, 17, 18, 19, 20, 25, 30, or a number or a range between any two of the values) side outlet channel(s). In some embodiments, the acoustic standing wave(s) position pressure node(s) in the microfluidic channel. At least one of the two or more outlet channel(s) can be configured to capture flow stream(s) wherein pressure antinode(s) and/or pressure node(s) are positioned.

In some embodiments, the method comprises: incubating the population of cells with GVs, wherein uptake of the GVs comprises one or more of endocytosis, pinocytosis, nanopinocytosis, micropinocytosis, phagocytosis, membrane fusion, clathrin-medicated internalization, caveolin-mediated internalization, receptor-dependent internalization, and receptor-independent internalization. The cells can be capable of degrading GVs post-uptake (e.g., via lysosomal degradation). The actuation can comprise acoustic radiation force-based actuation. In some embodiments, the acoustic standing wave(s) position pressure node(s) in the microfluidic channel. The first subpopulation of cells can be actuated towards the flow stream(s) comprising the pressure node(s). In some embodiments, the acoustic standing wave(s) position a pressure node in the central flow stream. The first subpopulation of cells can be actuated towards the center flow stream. In some embodiments, the acoustic standing wave(s) position pressure antinode(s) in the one or more peripheral flow stream(s). The second subpopulation of cells can be actuated towards the one or more peripheral flow stream(s). The microfluidic channel can comprise two peripheral flow streams, two side inlet channels, and two side outlet channels. The fluid sample can be introduced in the microfluidic channel via the center inlet channel. The fluid sample can be hydrodynamically focused to the center flow stream via sheath flow introduced in the microfluidic channel via the two side inlet channels. The distal end of the microfluidic channel can comprise a trifurcation separating the central flow stream and peripheral flow streams. In some embodiments, the acoustic standing wave(s) position pressure antinodes at or adjacent to the microfluidic channel walls. Cells of the second subpopulation can be actuated towards the peripheral flow streams. In some embodiments, cells of the first subpopulation remain in the center flow stream and/or are actuated towards the pressure node positioned at the center flow stream. In some embodiments, an additional fluid or fluids are directed in such a way as to surround or "sheath" the fluid being produced by the channel, reducing a cross-sectional dimension of the fluidic stream. The disclosed methods, in some embodiments, thus involves control over the average cross-sectional dimensions of the fluidic stream by control of the flowrate of a sheathing fluid, and/or control of the ratios of the flowrate of the fluidic stream relative to the sheathing fluid In some embodiments, the method comprises: collecting a first sorted population of cells from the center outlet channel, wherein the first subpopulation of cells is actuated towards the center flow stream; and/or collecting a second sorted population of cells from the one or more side outlet channel(s), wherein the second subpopulation of cells is actuated towards the one or more peripheral flow stream(s). In some embodiments, the method comprises: collecting a first sorted population of cells from the one or more side outlet channel(s), wherein the first subpopulation of cells is actuated towards the one or more peripheral flow stream(s); and/or collecting a second sorted population of cells from the center outlet channel, wherein the second subpopulation of cells is actuated towards the center flow stream. The method can comprise counting the first sorted population of cells and/or the second sorted population of cells. In some embodiments, the first sorted population of cells: is at least about 1.2-fold (e.g., 1.2-fold, 1.3-fold, 1.4-fold, 1.5-fold, 1.6-fold, 1.7-fold, 1.8-fold, 1.8-fold, 1.9-fold, 2-fold, 3-fold, 4-fold, 5-fold, 6-fold, 7-fold, 8-fold, 9-fold, 10-fold, 20-fold, 30-fold, 40-fold, 50-fold, 60-fold, 70-fold, 80-fold, 90-fold, 100-fold, or a number or a range between any of these values) enriched for cells of the first subpopulation of cells; comprises at least about 70% (e.g., 70%, 71%, 72%, 73%, 74%, 75%, 76%, 77%, 78%, 79%, 80%, 81%, 82%, 83%, 84%, 85%, 86%, 87%, 88%, 89%, 90%, or a number or a range between any two of these values) of cells of the first subpopulation of cells present in the fluid sample; and/or comprises less about 30% (e.g., 0%, 0.000000001%, 0.00000001%, 0.0000001%, 0.000001%, 0.00001%, 0.0001%, 0.001%, 0.01%, 0.1%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, or a number or a range between any two of these values) of cells of the second subpopulation of cells present in the fluid sample. In some embodiments, the second sorted population of cells: is at least about 1.2-fold (e.g., 1.2-fold, 1.3-fold, 1.4-fold, 1.5-fold, 1.6-fold, 1.7-fold, 1.8-fold, 1.8-fold, 1.9-fold, 2-fold, 3-fold, 4-fold, 5-fold, 6-fold, 7-fold, 8-fold, 9-fold, 10-fold, 20-fold, 30-fold, 40-fold, 50-fold, 60-fold, 70-fold, 80-fold, 90-fold, 100-fold, or a number or a range between any of these values) enriched for cells of the second subpopulation of cells; comprises at least about 70% (e.g., 70%, 71%, 72%, 73%, 74%, 75%, 76%, 77%, 78%, 79%, 80%, 81%, 82%, 83%, 84%, 85%, 86%, 87%, 88%, 89%, 90%, or a number or a range between any two of these values) of cells of the second subpopulation of cells present in the fluid sample; and/or comprises less about 30% (e.g., 0%, 0.000000001%, 0.00000001%, 0.0000001%, 0.000001%, 0.00001%, 0.0001%, 0.001%, 0.01%, 0.1%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, or a number or a range between any two of these values) of cells of the first subpopulation of cells present in the fluid sample.

The acoustic properties of a cell of the population of cells can be dependent on the context-dependent uptake of GVs and/or context-dependent expression of GVs. The uptake of GVs and/or expression of GVs can be capable of inverting and magnifying the acoustic contrast of a cell. The uptake of GVs and/or expression of GVs can be capable of inverting and magnifying the acoustic contrast of a cell by at least about 1.2-fold (e.g., 1.2-fold, 1.3-fold, 1.4-fold, 1.5-fold, 1.6-fold, 1.7-fold, 1.8-fold, 1.8-fold, 1.9-fold, 2-fold, 3-fold, 4-fold, 5-fold, 6-fold, 7-fold, 8-fold, 9-fold, 10-fold, 20-fold, 30-fold, 40-fold, 50-fold, 60-fold, 70-fold, 80-fold, 90-fold, 100-fold, or a number or a range between any of these values). In some embodiments, the cell type and/or cell state of a cell determines the context-dependent uptake of GVs and/or context-dependent expression of GVs. The GVs can be capable of amplifying the acoustic radiation force (ARF) experienced by the cells by at least about 1.2-fold (e.g., 1.2-fold, 1.3-fold, 1.4-fold, 1.5-fold, 1.6-fold, 1.7-fold, 1.8-fold, 1.8-fold, 1.9-fold, 2-fold, 3-fold, 4-fold, 5-fold, 6-fold, 7-fold, 8-fold, 9-fold, 10-fold, 20-fold, 30-fold, 40-fold, 50-fold, 60-fold, 70-fold, 80-fold, 90-fold, 100-fold, or a number or a range between any of these values) and/or inverting their acoustic contrast upon uptake and/or expression.

The threshold negative acoustic contrast can be, or be about, −0.001, −0.003, −0.007, −0.01, −0.02, −0.03, −0.04, −0.05, −0.06, −0.08, −0.10, −0.12, −0.14, −0.16, −0.18, −0.20, −0.30, −0.40, −0.50, −0.60, −0.70, or a number or a range between any of these values. The threshold negative acoustic contrast can be at least, or at most, −0.001, −0.003, −0.007, −0.01, −0.02, −0.03, −0.04, −0.05, −0.06, −0.08, −0.10, −0.12, −0.14, −0.16, −0.18, −0.20, −0.30, −0.40, −0.50, −0.60, −0.70, or a number or a range between any of these values. In the methods provided herein, a cell having a negative acoustic contrast below the threshold negative acoustic contrast refers to a cell that has negative acoustic contrast of smaller magnitude than the threshold negative acoustic contrast. For example, if the threshold negative acoustic contrast is −0.01, then a cell having an acoustic contrast of −0.009 has an acoustic contrast below the threshold negative acoustic contrast. In the methods provided herein, a cell having a negative acoustic contrast above the threshold negative acoustic contrast refers to a cell that has negative acoustic contrast of greater magnitude than the threshold negative acoustic contrast. For example, if the threshold negative acoustic contrast is −0.01, then a cell having an acoustic contrast of −0.011 has an acoustic contrast above the threshold negative acoustic contrast.

In some embodiments, the cells have an acoustic contrast of about 0.0, 0.0001, 0.0003, 0.0006, 0.0009, 0.001, 0.004, 0.007, 0.01, 0.02, 0.03, 0.04, 0.05, 0.1, 0.15, 0.2, 0.25. 0.3, or a number or a range between any of these values, in the absence of GV uptake and/or GV expression (e.g., about 0.1). In some embodiments, the cells have an acoustic contrast of about −0.0001, −0.001, −0.003, −0.007, −0.01, −0.02, −0.04, −0.06, −0.08, −0.10, −0.12, −0.14, −0.16, −0.18, −0.20, −0.30, −0.40, −0.50, −0.60, −0.70, or a number or a range between any of these values, upon GV uptake and/or GV expression (e.g., about −1.1).

The width of the microfluidic channel can be about half the wavelength of the acoustic standing wave. Applying ultrasound can comprise generating an acoustic field (e.g., a half-wavelength standing acoustic field). Applying ultrasound can comprise generating an acoustic field via a piezoelectric element coupled to the microfluidic channel. Applying ultrasound can comprise continuous wave ultrasound. The flowing can comprise continuous flow. In some embodiments, the fluid in the microfluidic channel comprises: the fluid component of the fluid sample (e.g., the non-cell component of the fluid sample); water; sheath fluid; and/or one or more components configured to increase the density of the fluid in the microfluidic channel (e.g., iodixanol). As used herein, the term "fluid" generally refers to a substance that tends to flow and to conform to the outline of its container, i.e., a liquid, a gas, a viscoelastic fluid, etc. Typically, fluids are materials that are unable to withstand a static shear stress, and when a shear stress is applied, the fluid experiences a continuing and permanent distortion. The microfluidic channel can be situated within a microfluidic device, wherein the microfluidic device comprises a plurality of microfluidic channels, and wherein the method comprises flowing fluid sample(s) through said plurality of microfluidic channels in parallel.

Applying ultrasound can comprise about 1 MHz to about 10 MHz sweep (e.g., 3.75±0.1 MHz) and can comprise a user selecting a single center frequency from among these values. In some such embodiments, a time-varying frequency sweep around that center value is used (e.g., sweeping between 3.65 MHz-3.85 MHz can have better performance than using 3.75 MHz in some embodiments). Applying ultrasound can comprise about 0.1 ms to about 10 ms sweep repetition time (e.g., 1 ms). Applying ultrasound can comprise about 5 V to about 100 V peak-to-peak (e.g., 38V).

For example, acoustic waves may be applied to a channel, such as a microfluidic channel, in a direction of fluid flow within the channel, in a direction opposite of fluid flow within the channel, or in another direction (e.g., perpendicular to fluid flow within the channel). In other embodiments, the acoustic waves may be applied at any suitable angle relative to the channel, for example, about 0°, about 5°, about 10°, about 20°, about 30°, about 40°, about 50°, about 60°, about 70°, about 80°, about 90°, about 100°, about 110°, about 120°, about 130°, about 140°, about 150°, about 160°, about 170°, about 175°, about 180° etc.). In addition to this angle, there may be a change in angle caused by refraction in some embodiments.

For any wave, points at which the amplitude is at a maximum (whether positive or negative) are called antinodes, and points where the amplitude is zero are called nodes. A standing wave can contain "nodes" or regions with low or no amplitude in oscillation (e.g., of pressure), and "antinodes" where maximum changes in oscillation (e.g., of pressure) occur. In some embodiments, in a standing wave, the nodes and/or antinodes are substantially stationary (e.g., within +/−100 µm) in the channel. In some embodiments, the spacing of the nodes and/or antinodes of the standing acoustic wave may be controlled by the frequency of the acoustic wave, with the frequency being related to the wavelength by f=c/λ, where f is the frequency, c is the speed of sound in a particular medium, and A is the wavelength. In some embodiments, the frequency of the acoustic standing wave may be from about 0.1 Hz to about 200,000,000 Hz, e.g., about 0.1 Hz to about 1000 Hz, about 500 Hz to about 20,000 Hz, about 5,000 Hz to about 100,000 Hz, about 50,000 Hz to about 1,000,000 Hz, about 100,000 Hz to about 10,000,000 Hz, about 500,000 Hz to about 10,000,000 Hz, about 500,000 Hz to about 5,000,000 Hz, about 750,000 Hz to about 3,000,000 Hz, about 5,000,000 Hz to about 50,000,000 Hz, about 10,000,000 Hz to about 100,000,000 Hz, or about 20,000,000 Hz to about 200,000,000 Hz, e.g. about 0.1 Hz, about 1 Hz, about 10 Hz, about 100 Hz, about 500 Hz, about 1,000 Hz, about 5,000 Hz, about 10,000 Hz, about 50,000 Hz, about 100,000 Hz, about 200,000 Hz, about 300,000 Hz, about 400,000 Hz, about 500,000 Hz, about 600,000 Hz, about 700,000 Hz, about 800,000 Hz, about 900,000 Hz, about 1,000,000 Hz, about 2,000,000 Hz, about 3,000,000 Hz, about 4,000,000 Hz, about 5,000,000 Hz, about 6,000,000 Hz, about 7,000,000 Hz, about 8,000,000 Hz, about 9,000,000 Hz, about 10,000,000 Hz, about 20,000,000 Hz, about 30,000,000 Hz, about 40,000,000 Hz, about 50,000,000 Hz, about 60,000,000 Hz, about 70,000,000 Hz, about 80,000,000 Hz, about 90,000,000 Hz, about 100,000,000 Hz, about 110,000,000 Hz, about 120,000,000 Hz, about 130,000,000 Hz, about 140,000,000 Hz, about 150,000,000 Hz, about 160,000,000 Hz, about 170,000,000 Hz, about 180,000,000 Hz, about 190,000,000 Hz, or about 200,000,000 Hz.

Applying ultrasound can employ various sources of acoustic energy. Useful sources of acoustic energy in the disclosed methods include, but are not limited to, transducers, e.g., an interdigital transducer (IDT), a piezoelectric element, e.g. a piezoelectric crystal, pulsed electromagnetic radiation, e.g., optical or microwave, or thermal elements, e.g., Peltier devices. Other sources of acoustic energy are known in the art. Such sources of acoustic energy are operatively coupled to, e.g., by being integrated with, the device, e.g., the microchannel. Alternatively, the sources of acoustic energy may be physically connected to the device, e.g., mechanically connected. Good contact can be assured by using an acoustic gel, if needed.

Piezoelectric elements may be positioned inside a channel (i.e., in contact with a fluid in the microfluidic channel), outside the channel (i.e., isolated from the fluid), or a combination thereof. In some embodiments, the piezoelectric element may be at the exit of a channel. For example, the piezoelectric element may be integrated with the channel or coupled or otherwise fastened to the channel. Examples of fastenings include, but are not limited to, complementary threading, form-fitting pairs, hooks and loops, latches, threads, screws, staples, clips, clamps, prongs, rings, brads, rubber bands, rivets, grommets, pins, ties, snaps, adhesives (e.g., glue), tapes, vacuum, seals, magnets, soldering, or a combination thereof. In some instances, piezoelectric material can be deposited on the chip. In some instances, the piezoelectric element can be built into the channel. Alternatively, or in addition, the piezoelectric element may be connected to a reservoir or channel or may be a component of a reservoir or channel, such as a wall. In some embodiments, the piezoelectric element may further include an aperture therethrough such that liquids can pass upon actuation of the piezoelectric element, or the device may include an aperture operatively coupled to the piezoelectric element.

The piezoelectric element can have various shapes and sizes. The piezoelectric element may have a shape or cross-section that is circular, triangular, square, rectangular, or partial shapes or combination of shapes thereof. The piezoelectric element can have a thickness from about 100 femtometers (fm) to about 100 millimeters (mm). The piezoelectric element can have a dimension (e.g., cross-section) of at least about 1 mm. The piezoelectric element can be formed of, for example, lead zirconate titanate, zinc oxide, barium titanate, potassium niobate, sodium tungstate, $Ba_2NaNb_5O_5$, and $Pb_2KNb_5O_{15}$. The piezoelectric element, for example, can be a piezo crystal. The piezoelectric element may contract when a voltage is applied and return to its original state when the voltage is unapplied. Alternatively, the piezoelectric element may expand when a voltage is applied and return to its original state when the voltage is unapplied. Alternatively, or in addition, application of a voltage to the piezoelectric element can cause mechanical stress, vibration, bending, deformation, compression, decompression, expansion, and/or a combination thereof in its structure, and vice versa (e.g., applying some form of mechanical stress or pressure on the piezoelectric element may produce a voltage). In some instances, the piezoelectric element may include a composite of both piezoelectric material and non-piezoelectric material. Interdigital transducers (IDTs) can be also patterned on top of piezoelectric element to generate an acoustic wave at a certain frequency, depending on the size and distance of the fingers on the IDTs. In some embodiments, a channel may include a plurality of piezoelectric elements working independently or cooperatively. For example, a first channel of a device can be coupled to at least 1, 2, 3, 4, 5, 6, 7, 8, 9, 10, 20, 30, 40, 50, 60, 70, 80, 90, 100, 200, 300, 400, or 500 piezoelectric elements. The frequency that drives the electric voltage applied to the piezoelectric element may be from about 5 to about 300 megahertz (MHz). e.g., about 5 MHz, about 6 MHz, about 7 MHz, about MHz, about 9 MHZ, about 10

MHz, about 20 MHz, about 30 MHz, about 40 MHz, about 50 MHZ, about 60 MHZ, about 70 MHZ, about 80 MHz, about 90 MHz, about 100 MHz, about 110 MHZ, about 120 MHz, about 130 MHz, about 140 MHz, about 150 MHz, about 160 MHz, about 170 MHz, about 180 MHz, about 190 MHz, about 200 MHz, about 210 MHz, about 220 MHZ, about 230 MHz, about 240 MHz, about 250 MHZ, about 260 MHz, about 270 MHz, about 280 MHZ, about 290 MHz, or about 300 MHz. Alternatively, the RF energy may have a frequency range of less than about 5 MHz or greater than about 300 MHz. As will be appreciated, the necessary voltage and/or the RF frequency driving the electric voltage may change with the properties of the piezoelectric element (e.g., efficiency). An interdigitated transducer typically comprises one, two, or more electrodes containing a plurality of "fingers" extending away from the electrode, wherein at least some of the fingers are interdigitated. The fingers may be of any length, and may independently have the same or different lengths. The fingers may be spaced on the transducer regularly or irregularly. In some embodiments, the fingers may be substantially parallel, although in other embodiments they need not be substantially parallel. For example, in one set of embodiments, the interdigitated transducer is a tapered interdigitated transducer. In some embodiments, the fingers in a tapered interdigitated transducer may be arranged such that the fingers are angled inwardly.

In some embodiments, buoyancy purification of the population of cells comprises centrifugation, optionally centrifugation-assisted floatation at 300 g. The method can comprise collapsing the GVs. Collapsing GVs can comprise applying ultrasound with a positive acoustic pressure exceeding the critical collapse pressure of the GVs. In some embodiments, the cell comprises: a eukaryotic cell (e.g., a yeast cell); and/or a prokaryotic cell (e.g., a bacterial cell, a gram-positive bacterial cell and/or a gram-negative bacterial cell). The cell can be the cell of a subject, such as, for example, a subject suffering from a disease or disorder (e.g., a blood disease, an immune disease, a cancer, an infectious disease, a genetic disease, a disorder caused by aberrant mtDNA, a metabolic disease, a disorder caused by aberrant cell cycle, a disorder caused by aberrant angiogenesis, a disorder cause by aberrant DNA damage repair, or any combination thereof). The degree of uptake and/or expression of the GVs by a cell can be associated with the presence and/or amount a unique cell type and/or a unique cell state of said cell.

The population of cells may contain more than two subpopulations of cells having different compressibilities or densities due to varying levels of GV expression and/or uptake. For example, the mixed population of cells may have at least three, four, five, six, seven, eight, nine, or ten subpopulations of cells of different compressibilities or densities (and therefore different acoustic contrasts) that may be separated into distinct flowing streams using the methods provided herein. In some embodiments, the mixed population of cells may have more than 10 subpopulations of cells of different compressibilities or densities. It should also be appreciated that these flowing streams may be collected in any number of outlet ports. For example a fluid sample containing a population of cells comprising 4 subpopulations of 4 different compressibilities or densities may be separated into four flow streams (referred to as flow stream 1, 2, 3, and 4) using the methods provided herein. In this example, the four flow streams may be collected in four separate outlet ports (referred to as outlet port 1, 2, 3 and 4, respectively). In some embodiments, the different compressibilities or densities of cells can be conferred by the expression of different GV types. For example, a first cell expressing a GV of a first type and a second cell expressing a GV of a second type can have different acoustic contrasts even if GV expression is the same level in both cells.

In some embodiments of the methods provided herein, a population of cells can be sorted at relatively high rates. For instance, at least about 10 cells per second may be sorted in some embodiments, and in other embodiments, at least about 20 cells per second, at least about 30 cells per second, at least about 100 cells per second, at least about 200 cells per second, at least about 300 cells per second, at least about 500 cells per second, at least about 750 cells per second, at least about 1,000 cells per second, at least about 1,500 cells per second, at least about 2,000 cells per second, at least about 3,000 cells per second, at least about 5,000 cells per second, at least about 7,500 cells per second, at least about 10,000 cells per second, at least about 15,000 cells per second, at least about 20,000 cells per second, at least about 30,000 cells per second, at least about 50,000 cells per second, at least about 75,000 cells per second, at least about 100,000 cells per second, at least about 150,000 cells per second, at least about 200,000 cells per second, at least about 300,000 cells per second, at least about 500,000 cells per second, at least about 750,000 cells per second, at least about 1,000,000 cells per second, at least about 1,500,000 cells per second, at least about 2,000,000 or more cells per second, or at least about 3,000,000 or more cells per second may be sorted.

The methods provided herein enable low abundance cells to be separated from a mixed cell population in a manner that maintains high cell integrity, viability and proliferation. Cell integrity can refer to membrane integrity, proliferative integrity, organelle integrity, nuclear integrity, genetic integrity, intracellular signaling integrity and/or cell functions. In some embodiments of the cells provided herein, besides the presence of GVs, the cells are not labelled, marked, stained, or otherwise identified by another means to aid their separation prior to or during their separation by the methods disclosed herein.

Provided herein are engineered gas-filled protein structures (GVPS), also referred to as "gas vesicles" (GVs). The phrases "gas vesicles protein structure" or "GV", "GVP", "GVPS" or "Gas Vesicles" as used herein shall be given their ordinary meaning, and shall also refer to a gas-filled protein structure intracellularly expressed by certain bacteria or archea as a mechanism to regulate cellular buoyancy in aqueous environments. GVs are described in Walsby, A. E. ((1994). Gas vesicles. Microbiology and Molecular Biology Reviews, 58 (1), 94-144) hereby incorporated by reference in its entirety. The term Gas Vesicle Structural (GVS) proteins as used herein indicates proteins forming part of a gas-filled protein structure intracellularly expressed by certain bacteria or archaea and can be used as a mechanism to regulate cellular buoyancy in aqueous environments. In particular, GVS shell comprises a GVS identified as gvpA or gvpB (herein also referred to as gvpA/B) and optionally also a GVS identified as gvpC. The compositions, methods and systems described herein can be used with compositions, methods and systems (e.g., gas vesicle compositions and ultrasonic methods) previously described in U.S. Patent Application Publication Nos. 2014/0288411, 2014/0288421, 2018/0030501, 2018/0038922, 2019/0175763, 2019/0314001, 2020/0164095, 2020/0237346, 2021/0060185, and International Patent Application Publication WO2020/146379; the content of each of these applications is incorporated herein by reference in its entirety.

The systems, methods, compositions, and kits provided herein can, in some embodiments, be employed in concert with the systems, methods, compositions, and kits comprising recombinant adeno-associated virus (rAAV) comprising an AAV acoustic targeting peptide exhibiting increased transduction at site(s) of focused ultrasound blood-brain barrier opening (FUS-BBBO), increased neuronal tropism, and diminished transduction of peripheral organs described in U.S. patent application Ser. No. 17/814,384, entitled, "VIRAL VECTORS FOR ENHANCED ULTRASOUND-MEDIATED DELIVERY TO THE BRAIN," filed Jul. 22, 2022, the content of which is incorporated herein by reference in its entirety.

GV production requires the co-expression of multiple GV proteins (Gvps), which in prokaryotes are expressed from polycistronic operons at specific ratios determined by the strength of their respective ribosome binding sites or other regulatory mechanisms. The systems, methods, compositions, and kits provided herein can, in some embodiments, be employed in concert with the systems, methods, compositions, and kits expression of multiple proteins from a single mRNA with a predetermined stoichiometry described in U.S. patent application Ser. No. 17/866,240, entitled "STOICHIOMETRIC EXPRESSION OF MESSENGER POLYCISTRONS", filed Jul. 15, 2022, the content of which is incorporated herein by reference in its entirety. The systems, methods, compositions, and kits provided herein can, in some embodiments, be employed in concert with the systems, methods, compositions, and kits described in U.S. patent application Ser. No. 17/936,286, entitled, "VIRAL DELIVERY OF GAS VESICLE GENES," filed Sep. 28, 2022, the content of which is incorporated herein by reference in its entirety.

The systems, methods, compositions, and kits provided herein can, in some embodiments, be employed in concert with the systems, methods, compositions, and kits described in U.S. patent application Ser. No. 17/937,975, entitled, "ULTRASONIC GENETICALLY ENCODED CALCIUM INDICATORS," filed Oct. 4, 2022, the content of which is incorporated herein by reference in its entirety.

In particular, a GV in the sense of the disclosure is a structure intracellularly expressed by bacteria or archaea forming a hollow structure wherein a gas is enclosed by a protein shell, which is a shell substantially made of protein (up at least 95% protein). In gas vesicles in the sense of the disclosure, the protein shell is formed by a plurality of proteins herein also indicated as Gvp proteins or Gvps, which are expressed by the bacteria or archaea and form in the bacteria or archaea cytoplasm a gas permeable and liquid impermeable protein shell configuration encircling gas. Accordingly, a protein shell of a GV is permeable to gas but not to surrounding liquid such as water. For example, GVs' protein shells exclude liquid water but permit gas to freely diffuse in and out from the surrounding media making them physically stable despite their usual nanometer size.

GV structures are typically nanostructures with widths and lengths of nanometer dimensions (in particular with widths of 45-250 nm and lengths of 100-800 nm) but can have lengths as large as the dimensions of a cell in which they are expressed, as will be understood by a skilled person. GVs and methods are described in Farhadi et al, Science, 2019, hereby incorporated by reference. In some embodiments, the gas vesicles protein structure have average dimensions of 1000 nm or less, such as 900 nm or less, including 800 nm or less, or 700 nm or less, or 600 nm or less, or 500 nm or less, or 400 nm or less, or 300 nm or less, or 250 nm or less, or 200 nm or less, or 150 nm or less, or 100 nm or less, or 75 nm or less, or 50 nm or less. For example, the average diameter of the gas vesicles may range from 10 nm to 1000 nm, such as 25 nm to 500 nm, including 50 nm to 250 nm, or 100 nm to 250 nm. By "average" is meant the arithmetic mean.

GVs in the sense of the disclosure have different shapes depending on their genetic origins. For example, GVs in the sense of the disclosure can be substantially spherical, ellipsoid, cylindrical, or have other shapes such as football shape or cylindrical with cone shaped end portions depending on the type of bacteria providing the gas vesicles.

The term Gas Vesicle Structural (GVS) proteins as used herein indicates proteins forming part of a gas-filled protein structure intracellularly expressed by certain bacteria or archaea and can be used as a mechanism to regulate cellular buoyancy in aqueous environments. In particular, GVS shell comprises a GVS identified as gvpA or gvpB (herein also referred to as Gvp A/B) and optionally also a GVS identified as gvpC. GvpA is a structural protein that assembles through repeated unites to make up the bulk of GVs. GvpC is a scaffold protein with 5 repeat units that assemble on the outer shell of GVs. GvpC can be engineered to tune the mechanical and acoustic properties of GVs as well as act as a handle for appending moieties on to. A gvpC protein is a hydrophilic protein of a GV shell, which includes repetitions of one repeat region flanked by an N-terminal region and a C terminal region. The term "repeat region" or "repeat" as used herein with reference to a protein can refer to the minimum sequence that is present within the protein in multiple repetitions along the protein sequence without any gaps. Accordingly, in a gvpC multiple repetitions of a same repeat is flanked by an N-terminal region and a C-terminal region. In a same gvpC, repetitions of a same repeat in the gvpC protein can have different lengths and different sequence identity one with respect to another.

The optional gvpC gene encodes for a gvpC protein which is a hydrophilic protein of a GV shell, including repetitions of one repeat region flanked by an N-terminal region and a C terminal region. The term "repeat region" or "repeat" as used herein with reference to a protein can refer to the minimum sequence that is present within the protein in multiple repetitions along the protein sequence without any gaps. Accordingly, in a gvpC multiple repetitions of a same repeat is flanked by an N-terminal region and a C-terminal region. In a same gvpC, repetitions of a same repeat in the gvpC protein can have different lengths and different sequence identity one with respect to another. In performing alignment steps sequence are identified as repeat when the sequence shows at least 3 or more of the characteristics described in U.S. application Ser. No. 15/663,635 published as US 2018/0030501 (incorporated herein by reference in its entirety) which also include additional features of gvpC proteins and the related identification.

The phrase "GV type" as used herein shall be given its ordinary meaning, and shall also refer to a gas vesicle having dimensions and shape resulting in distinctive mechanical, acoustic, surface and/or magnetic properties as will be understood by a skilled person upon reading of the present disclosure. In particular, a skilled person will understand that different shapes and dimensions will result in different properties in view of the indications in provided in U.S. application Ser. No. 15/613,104 and U.S. Ser. No. 15/663,600 and additional indications identifiable by a skilled person. In some embodiments, the nucleic acid compositions provided herein encode a combination of different GV types and/or variants thereof, with each expressed GV exhibiting a different acoustic collapse profile with progressively decreased midpoint collapse pressure values. In some embodiments, the percentage difference between the midpoint collapse pressure values of any given two expressed GVs types is at least twenty percent.

In some embodiments, GVs are capable of withstanding pressures of several kPa. but collapse irreversibly at a pressure at which the GV protein shell is deformed to the point where it flattens or breaks, allowing the gas inside the GV to dissolve irreversibly in surrounding media, herein also referred to as a critical collapse pressure, or selectable critical collapse pressure, as there are various points along a collapse pressure profile (e.g., peak acoustic pressure).

A collapse pressure profile (e.g., peak acoustic pressure) as used herein indicates a range of pressures over which collapse of a population of GVs of a certain type occurs. In particular, a collapse pressure profile in the sense of the disclosure comprise increasing acoustic collapse pressure values, starting from an initial collapse pressure value at which the GV signal/optical scattering by GVs starts to be erased to a complete collapse pressure value at which the GV signal/optical scattering by GVs is completely erased. The collapse pressure profile of a set type of GV is thus characterized by a mid-point pressure where 50% of the GVs of the set type have been collapsed (also known as the "midpoint collapse pressure"), an initial collapse pressure where 5% or lower of the GVs of the type have been collapsed, and a complete collapse pressure where at least 95% of the GVs of the type have been collapsed. In some embodiments herein described a selectable critical collapse pressure can be any of these collapse pressures within a collapse pressure profile, as well as any point between them. The critical collapse pressure profile of a GV is functional to the mechanical properties of the protein shell and the diameter of the shell structure. U.S. Patent Application Publication No. 2020/0164095 describes gas vesicles, protein variants and related compositions methods and systems for singleplexed and/or multiplexed ultrasonic methods (e.g., imaging of a target site in which a gas vesicle provides contrast for the imaging) which is modifiable by application of a selectable acoustic collapse pressure value of the gas vesicle, the content of which is hereby expressly incorporated by reference in its entirety.

The acoustic collapse pressure profile (e.g., peak acoustic pressure) of a given GV type can be determined by imaging GVs with imaging ultrasound energy after collapsing portions of the given GV type population with a collapsing ultrasound energy (e.g. ultrasound pulses) with increasing peak positive pressure amplitudes to obtain acoustic pressure data point of acoustic pressure values, the data points forming an acoustic collapse curve. The acoustic collapse pressure function f(p) can be derived from the acoustic collapse curve by fitting the data with a sigmoid function such as a Boltzmann sigmoid function. An acoustic collapse pressure profile in the sense of the disclosure can include a set of initial collapse pressure values, a midpoint collapse pressure value and a set of complete collapse pressure values. The initial collapse pressures are the acoustic collapse pressures at which 5% or less of the GV signal is erased. A midpoint collapse pressure is the acoustic collapse pressure at which 50% of the GV signal is erased. Complete collapse pressures are the acoustic collapse pressures at which 95% or more of the GV signal is erased. The pressure can be peak pressure. In some embodiments, the peak pressure is peak positive pressure. In some embodiments, the peak pressure is peak negative pressure.

U.S. Patent Application Publication No. 2018/0030501 describes hybrid gas vesicle gene cluster (GVGC) configured for expression in a prokaryotic host comprising gas vesicle assembly (GVA) genes native to a GVA prokaryotic species and capable of being expressed in a functional form in the prokaryotic host, as well as one or more gas vesicle structural (GVS) genes native to one or more GVS prokaryotic species, at least one of the one or more GVS prokaryotic species different from the GVA prokaryotic species, and related gas vesicle reporting (GVR) genetic circuits, genetic, vectors, engineered cells, and related compositions methods and systems to produce GVs, hybrid GVGC and/or image a target site, the content of which is hereby expressly incorporated by reference in its entirety. The term "Gas Vesicle Genes Cluster" or "GVGC" as described herein indicates a gene cluster encoding a set of GV proteins capable of providing a GV upon expression within a cell. In some embodiments, the nucleic acid compositions provided herein encode some or all elements of a GVGC. The term "gene cluster" as used herein means a group of two or more genes found within an organism's DNA that encode two or more polypeptides or proteins, which collectively share a generalized function or are genetically regulated together to produce a cellular structure and are often located within a few thousand base pairs of each other. The size of gene clusters can vary significantly, from a few genes to several hundred genes. Portions of the DNA sequence of each gene within a gene cluster are sometimes found to be similar or identical; however, the resulting protein of each gene is distinctive from the resulting protein of another gene within the cluster. Genes found in a gene cluster can be observed near one another on the same chromosome or native plasmid DNA, or on different, but homologous chromosomes. An example of a gene cluster is the Hox gene, which is made up of eight genes and is part of the Homeobox gene family. In the sense of the disclosure, gene clusters as described herein also comprise gas vesicle gene clusters, wherein the expressed proteins thereof together are able to form gas vesicles.

Engineered GVs and methods of tuning the acoustic properties thereof are provided in U.S. Patent Application Publication No. 2020/0164095, the content of which is incorporated herein by reference in its entirety. In some embodiments, the GVs can be engineered to modulate the GV mechanical, acoustic, surface and targeting properties in order to achieve enhanced harmonic responses and multiplexed imaging to be better distinguished from background tissues. In some embodiments herein described Gas vesicles protein structures can be provided by Gvp genes endogenously expressed in bacteria or archaea. Endogenous expression can refer to expression of Gvp proteins forming the protein shell of the GV in bacteria or archaea that naturally produce gas vesicles encoded (e.g. in their genome or native plasmid DNA). Gvp proteins expressed by bacteria or archaea typically include two primary structural proteins, here also indicated as GvpA and GvpC, and several putative minor components and chaperones as would be understood by a person skilled in the art. In some embodiments, heterologously expressed Gvp proteins to provide a GV type have independently at least 50% sequence identity, preferably at least 80%, more preferably at least 90%, most preferably at least 95% sequence identity compared to a reference sequence of corresponding Gvp protein using one of the alignment programs described using standard parameters. In some embodiments, multiplexed imaging methods are provided. The term "multiplex" can refer to the presence of two or more distinct GVPS types, each of which exhibits an acoustic collapse and/or buckling pressure profile distinct from one another. The two or more distinct GVPSs can be derived from different organisms or variants of GVPSs from the same or different organisms (e.g., archaea).

In some embodiments, the GVA genes and/or GVS genes are derived from *Bacillus Megaterium, Anabaena flos-aquae, Serratia* sp., *Bukholderia thailandensis, B. megaterium, Frankia* sp, *Haloferax mediaterranei, Halobacterium* sp, *Halorubrum vacuolatum, Microcystis aeruginosa, Methanosarcina barkeri, Streptomyces coelicolor*, and/or *Psychromonas ingrahamii*. In some embodiments, the one or more GV polynucleotides comprise: two or more GVS genes derived from different prokaryotic species; GVA genes and/or GVS genes from *Bacillus Megaterium, Anabaena flos-aquae, Serratia* sp., *Bukholderia thailandensis, B. megaterium, Frankia* sp, *Haloferax mediaterranei, Halobacterium* sp, *Microchaete diplosiphon, Nostoc* sp, *Halorubrum vacuolatum, Microcystis aeruginosa, Methanosarcina barkeri, Streptomyces coelicolor*, and/or *Psychromonas ingrahamii*; gvpB, gvpN gvpF, gvpG, gvpL gvpS, gvpK, gvpJ, and/or gvpU from *B. megaterium*; gvpA, gvpC, gvpN, gvpJ, gvpK, gvpF, gvpG, gvpV, and/or gvpW from *Anabaena flos-aquae*; gvpR, gvpN, gvpF, gvpG, gvpL, gvpS, gvpK, gvpJ, gvpT and/or gvpU from *B. megaterium* and gvpA from *Anabaena flos-aquae*; gvpA, and/or gvpC from *Anabaena flos-aquae*, and gvpN, gvpF, gvpG, gvpL, gvpS, gvpK, gvpJ, and/or gvpU from *B. megaterium*; and/or gvpA, gvpC and/or gvpN from *Anabaena flos-aquae*, and gvpF, gvpG, gvpL, gvpS, gvpK, gvpJ, and/or gvpU from *B. megaterium*. In some embodiments, the GVA genes and GVS genes have sequences codon optimized for expression in a eukaryotic cell. The GVs can comprise a GVS variant engineered to present a tag enabling clustering in the cell. The GVs can be hybrid GVs derived from two or more prokaryotic species. The density and/or compressibility of the GVs can be capable of being configured to tune the acoustophoretic phenotypic properties of cells expressing said GVs. The GVs can comprise a GvpC variant. In some embodiments, the GvpC variant comprises: a protease-sensing GvpC protein comprising at least one protease recognition site inserted within the central portion and/or attached to at least one of the N-terminus and the C-terminus of the Gvp; and/or a $Ca^{2+}$-sensing GvpC protein comprising a $Ca^{2+}$-binding domain and an interaction domain.

In some embodiments, the first subpopulation of cells comprises cells having a genetic modification of interest and the second subpopulation of cells comprises cells not having a genetic modification of interest. In some embodiments, the second subpopulation of cells comprises cells having a genetic modification of interest and the first subpopulation of cells comprises cells not having a genetic modification of interest. The genetic modification of interest can comprise expression of a payload (e.g., a chimeric antigen receptor). The genetic modification of interest can comprise (i) a deletion of an endogenous nucleic acid sequence at a genomic locus of interest, (ii) a modification of an endogenous nucleic acid sequence at a genomic locus of interest, and/or (iii) an insertion of a nucleic acid at the genomic locus of interest. The genetic modification of interest can comprise editing out an undesirable mutation. The cell type and/or cell state of a cell can comprise the presence or absence of a genetic modification of interest. In some embodiments, the presence or absence of a genetic modification of interest determines the context-dependent uptake of GVs and/or context-dependent expression of GVs. The method can comprise introducing a gene modification vector into the population the cells. The gene modification vector can be configured to introduce the genetic modification of interest into said cells. The gene modification vector can be configured to express the GVs as a selection marker. The gene modification vector can be a viral vector, a plasmid, a transposable element (e.g., piggybac transposon, sleeping beauty transposon), a naked DNA vector, a lipid nanoparticle (LNP), or any combination thereof. The viral vector can be an AAV vector, a lentivirus vector, a retrovirus vector, an adenovirus vector, a herpesvirus vector, a herpes simplex virus vector, a cytomegalovirus vector, a vaccinia virus vector, a MVA vector, a baculovirus vector, a vesicular stomatitis virus vector, a human papillomavirus vector, an avipox virus vector, a Sindbis virus vector, a VEE vector, a Measles virus vector, an influenza virus vector, a hepatitis B virus vector, an integration-deficient lentivirus (IDLV) vector, or any combination thereof.

In some embodiments, each cell of the population of cells comprises: one or more context-dependent promoters operably connected to one or more gas vesicle (GV) polynucleotides comprising: one or more gas vesicle structural (GVS) gene(s) encoding one or more GVS protein(s); and/or one or more first promoters operably connected to one or more gas vesicle (GV) polynucleotides comprising: one or more gas vesicle assembly (GVA) gene(s) encoding one or more GVA protein(s), and wherein the one or more GVA protein(s) and the one or more GVS protein(s) are capable of forming gas vesicles (GVs) upon expression in a cell. The activity of the context-dependent promoter and/or the degree of expression of the GVs can be associated with the presence and/or amount a unique cell type and/or a unique cell state. In some embodiments, each cell of the population of cells can comprise one or more first promoters operably connected to one or more gas vesicle (GV) polynucleotides comprising: one or more gas vesicle assembly (GVA) gene(s) encoding one or more GVA protein(s), and one or more gas vesicle structural (GVS) gene(s) encoding one or more GVS protein(s), wherein the one or more GVA protein(s) and the one or more GVS protein(s) are capable of forming gas vesicles (GVs) upon expression in a cell. The expression of a payload protein can be linked to the expression of a GVS protein via a tandem gene expression element (e.g., an internal ribosomal entry site (IRES), foot-and-mouth disease virus 2A peptide (F2A), equine rhinitis A virus 2A peptide (E2A), porcine teschovirus 2A peptide (P2A) or Thosea asigna virus 2A peptide (T2A), or any combination thereof). The second subpopulation of cells can comprise (i) cells of a unique cell type, (ii) cells of a unique cell state, and/or (iii) cells expressing a payload protein.

In some embodiments, each cell of the population of cells comprises: a context-dependent promoter operably linked to a transactivator polynucleotide comprising a transactivator gene, wherein the context-dependent promoter is capable of inducing transcription of the transactivator gene to generate a transactivator transcript, wherein the transactivator transcript is capable of being translated to generate a transactivator, wherein the activity of the context-dependent promoter and/or the degree of expression of the transactivator is associated with the presence and/or amount a unique cell type and/or a unique cell state, wherein, in the presence of the transactivator and a transactivator-binding compound, the first promoter is capable of inducing transcription of the one or more GV polynucleotides to generate GV transcript(s), and wherein the GV transcript(s) are capable of being translated to generate GVA protein(s) and/or GVS protein(s). The first promoter can comprise one or more copies of a transactivator recognition sequence the transactivator is capable of binding to induce transcription, and wherein the transactivator is incapable of binding the transactivator recognition sequence in the absence of the transactivator-binding compound. The one or more copies of a transactivator recognition sequence can comprise one or more copies of a tet operator (TetO). The one or more copies of a transactivator recognition sequence can comprise one or more copies of a tet operator (TetO). The first promoter can comprise a tetracycline response element (TRE), and the TRE can comprise one or more copies of a tet operator (TetO). The transactivator can comprise reverse tetracycline-controlled transactivator (rtTA). The transactivator can comprise tetracycline-controlled transactivator (tTA). The transactivator-binding compound can comprise tetracycline, doxycycline or a derivative thereof. The transactivator can comprise a constitutive signal peptide for protein degradation (e.g., PEST).

In some embodiments, one or more GV polynucleotides and/or transactivator polynucleotide comprise: a 5'UTR and/or a 3'UTR; a tandem gene expression element selected from the group comprising an internal ribosomal entry site (IRES), foot-and-mouth disease virus 2A peptide (F2A), equine rhinitis A virus 2A peptide (E2A), porcine teschovirus 2A peptide (P2A) or Thosea asigna virus 2A peptide (T2A), or any combination thereof; and/or a transcript stabilization element (e.g., woodchuck hepatitis post-translational regulatory element (WPRE), bovine growth hormone polyadenylation (bGH-polyA) signal sequence, human growth hormone polyadenylation (hGH-polyA) signal sequence, or any combination thereof). In some embodiments, the one or more first promoters comprise: a minimal promoter (e.g., TATA, miniCMV, and/or miniPromo); a tissue-specific promoter and/or a lineage-specific promoter; and/or a ubiquitous promoter (e.g., a minEfla promoter, a cytomegalovirus (CMV) immediate early promoter, a CMV promoter, a viral simian virus 40 (SV40) (e.g., early or late), a Moloney murine leukemia virus (MoMLV) LTR promoter, a Rous sarcoma virus (RSV) LTR, an RSV promoter, a herpes simplex virus (HSV) (thymidine kinase) promoter, H5, P7.5, and P11 promoters from vaccinia virus, an elongation factor 1-alpha (EF1a) promoter, early growth response 1 (EGR1), ferritin H (FerH), ferritin L (FerL), Glyceraldehyde 3-phosphate dehydrogenase (GAPDH), eukaryotic translation initiation factor 4A1 (EIF4A1), heat shock 70 kDa protein 5 (HSPA5), heat shock protein 90 kDa beta, member 1 (HSP90B1), heat shock protein 70 kDa (HSP70), β-kinesin (β-KIN), the human ROSA 26 locus, a Ubiquitin C promoter (UBC), a phosphoglycerate kinase-1 (PGK) promoter, 3-phosphoglycerate kinase promoter, a cytomegalovirus enhancer, human β-actin (HBA) promoter, chicken β-actin (CBA) promoter, a CAG promoter, a CASI promoter, a CBH promoter, or any combination thereof).

The unique cell state can comprise activation of one or more cellular activities of interest. A unique cell type and/or a unique cell state can be caused by hereditable, environmental, and/or idiopathic factors. A unique cell type and/or a unique cell state can be caused by and/or associated with the expression of one or more endogenous proteins whose expression is regulated by the endogenous context-dependent promoter. The unique cell state and/or unique cell type can be characterized by signaling of one or more endogenous signal transducer(s) (e.g., signal transducer(s) regulated by the endogenous context-dependent promoter). In some embodiments, the unique cell type and/or the cell in the unique cell state (i) causes and/or aggravates a disease or disorder and/or (ii) is associated with the pathology of a disease or disorder. The unique cell state and/or unique cell type can be characterized by aberrant signaling of one or more signal transducer(s). In some embodiments, the aberrant signaling involves: an overactive signal transducer; a constitutively active signal transducer over a period of time; an active signal transducer repressor and an active signal transducer; an inactive signal transducer activator and an active signal transducer; an inactive signal transducer; an underactive signal transducer; a constitutively inactive signal transducer over a period of time; an inactive signal transducer repressor and an inactive signal transducer; and/or an active signal transducer activator and an inactive signal transducer. The aberrant signaling can comprise an aberrant signal of at least one signal transduction pathway regulating cell survival, cell growth, cell proliferation, cell adhesion, cell migration, cell metabolism, cell morphology, cell differentiation, apoptosis, or any combination thereof. The signal transduscer(s) can be AKT, PI3K, MAPK, p44/42 MAP kinase, TYK2, p38 MAP kinase, PKC, PKA, SAPK, ELK, JNK, cJun, RAS, Raf, MEK 1/2, MEK 3/6, MEK 4/7, ZAP-70, LAT, SRC, LCK, ERK 1/2, Rsk 1, PYK2, SYK, PDK1, GSK3, FKHR, AFX, PLCγ, PLCγ, NF-kb, FAK, CREB, αIIIβ3, FcεRI, BAD, p70S6K, STAT1, STAT2, STAT3, STAT5, STAT6, or any combination thereof. The disease or disorder can be characterized by an aberrant signaling of the signal transducer.

In some embodiments, the unique cell state comprises: a physiological state (e.g., a cell cycle state, a differentiation state, a development state, a metabolic state, or a combination thereof); and/or a pathological state (e.g., a disease state, a human disease state, a diabetic state, an immune disorder state, a neurodegenerative disorder state, an oncogenic state, or a combination thereof). The unique cell state and/or unique cell type can be characterized by one or more of cell proliferation, stress pathways, oxidative stress, stress kinase activation, DNA damage, lipid metabolism, carbohydrate regulation, metabolic activation including Phase I and Phase II reactions, Cytochrome P-450 induction or inhibition, ammonia detoxification, mitochondrial function, peroxisome proliferation, organelle function, cell cycle state, morphology, apoptosis, DNA damage, metabolism, signal transduction, cell differentiation, cell-cell interaction and cell to non-cellular compartment. The unique cell state and/or unique cell type can be characterized by one or more of acute phase stress, cell adhesion, AH-response, anti-apoptosis and apoptosis, antimetabolism, anti-proliferation, arachidonic acid release, ATP depletion, cell cycle disruption, cell matrix disruption, cell migration, cell proliferation, cell regeneration, cell-cell communication, cholestasis, differentiation, DNA damage, DNA replication, early response genes, endoplasmic reticulum stress, estogenicity, fatty liver, fibrosis, general cell stress, glucose deprivation, growth arrest, heat shock, hepatotoxicity, hypercholesterolemia, hypoxia, immunotox, inflammation, invasion, ion transport, liver regeneration, cell migration, mitochondrial function, mitogenesis, multidrug resistance, nephrotoxicity, oxidative stress, peroxisome damage, recombination, ribotoxic stress, sclerosis, steatosis, teratogenesis, transformation, disrupted translation, transport, and tumor suppression. The unique cell state and/or unique cell type can be characterized by one or more of nutrient deprivation, hypoxia, oxidative stress, hyperproliferative signals, oncogenic stress, DNA damage, ribonucleotide depletion, replicative stress, and telomere attrition, promotion of cell cycle arrest, promotion of DNA-repair, promotion of apoptosis, promotion of genomic stability, promotion of senescence, and promotion of autophagy, regulation of cell metabolic reprogramming, regulation of tumor microenvironment signaling, inhibition of cell stemness, survival, and invasion.

A cell of the population of cells can comprise a eukaryotic cell (e.g., mammalian cell). In some embodiments, the mammalian cell and/or the cell type is: an antigen-presenting cell, a dendritic cell, a macrophage, a neural cell, a brain cell, an astrocyte, a microglial cell, and a neuron, a spleen cell, a lymphoid cell, a lung cell, a lung epithelial cell, a skin cell, a keratinocyte, an endothelial cell, an alveolar cell, an alveolar macrophage, an alveolar pneumocyte, a vascular endothelial cell, a mesenchymal cell, an epithelial cell, a colonic epithelial cell, a hematopoietic cell, a bone marrow cell, a Claudius cell, Hensen cell, Merkel cell, Muller cell, Paneth cell, Purkinje cell, Schwann cell, Sertoli cell, acidophil cell, acinar cell, adipoblast, adipocyte, brown or white alpha cell, amacrine cell, beta cell, capsular cell, cementocyte, chief cell, chondroblast, chondrocyte, chromaffin cell, chromophobic cell, corticotroph, delta cell, Langerhans cell, follicular dendritic cell, enterochromaffin cell, ependymocyte, epithelial cell, basal cell, squamous cell, endothelial cell, transitional cell, erythroblast, erythrocyte, fibroblast, fibrocyte, follicular cell, germ cell, gamete, ovum, spermatozoon, oocyte, primary oocyte, secondary oocyte, spermatid, spermatocyte, primary spermatocyte, secondary spermatocyte, germinal epithelium, giant cell, glial cell, astroblast, astrocyte, oligodendroblast, oligodendrocyte, glioblast, goblet cell, gonadotroph, granulosa cell, haemocytoblast, hair cell, hepatoblast, hepatocyte, hyalocyte, interstitial cell, juxtaglomerular cell, keratinocyte, keratocyte, lemmal cell, leukocyte, granulocyte, basophil, eosinophil, neutrophil, lymphoblast, B-lymphoblast, T-lymphoblast, lymphocyte, B-lymphocyte, T-lymphocyte, helper induced T-lymphocyte, Th1 T-lymphocyte, Th2 T-lymphocyte, natural killer cell, thymocyte, macrophage, Kupffer cell, alveolar macrophage, foam cell, histiocyte, luteal cell, lymphocytic stem cell, lymphoid cell, lymphoid stem cell, macroglial cell, mammotroph, mast cell, medulloblast, megakaryoblast, megakaryocyte, melanoblast, melanocyte, mesangial cell, mesothelial cell, metamyelocyte, monoblast, monocyte, mucous neck cell, myoblast, myocyte, muscle cell, cardiac muscle cell, skeletal muscle cell, smooth muscle cell, myelocyte, myeloid cell, myeloid stem cell, myoblast, myoepithelial cell, myofibrobast, neuroblast, neuroepithelial cell, neuron, odontoblast, osteoblast, osteoclast, osteocyte, oxyntic cell, parafollicular cell, paraluteal cell, peptic cell, pericyte, peripheral blood mononuclear cell, phaeochromocyte, phalangeal cell, pinealocyte, pituicyte, plasma cell, platelet, podocyte, proerythroblast, promonocyte, promyeloblast, promyelocyte, pronormoblast, reticulocyte, retinal pigment epithelial cell, retinoblast, small cell, somatotroph, stem cell, sustentacular cell, teloglial cell, a zymogenic cell, or any combination thereof. The stem cell can comprise an embryonic stem cell, an induced pluripotent stem cell (iPSC), a hematopoietic stem/progenitor cell (HSPC), or any combination thereof.

The context-dependent promoter can comprise a tissue-specific promoter and/or a lineage-specific promoter. The tissue specific promoter can be a liver-specific thyroxin binding globulin (TBG) promoter, an insulin promoter, a glucagon promoter, a somatostatin promoter, a pancreatic polypeptide (PPY) promoter, a synapsin-1 (Syn) promoter, a creatine kinase (MCK) promoter, a mammalian desmin (DES) promoter, a hSynapsin promoter, a α-myosin heavy chain (a-MHC) promoter, or a cardiac Troponin T (cTnT) promoter. The tissue specific promoter can be a neuronal activity-dependent promoter and/or a neuron-specific promoter (e.g., a synapsin-1 (Syn) promoter, a CaMKIIa promoter, a calcium/calmodulin-dependent protein kinase II a promoter, a tubulin alpha I promoter, a neuron-specific enolase promoter, a platelet-derived growth factor beta chain promoter, TRPV1 promoter, a $Na_v1.7$ promoter, a $Na_v1.8$ promoter, a $Na_v1.9$ promoter, or an Advillin promoter). The tissue specific promoter can be a muscle-specific promoter (e.g., a creatine kinase (MCK) promoter).

EXAMPLES

Some aspects of the embodiments discussed above are disclosed in further detail in the following examples, which are not in any way intended to limit the scope of the present disclosure.

Example 1

Genetically Encoded Actuators for Acoustic Inversion, Manipulation and Patterning of Engineered Cells The ability to remotely pattern, actuate and apply force to genetically specified cells would have many applications in biomedicine and synthetic biology, ranging from the fabrication of biological living materials and bioprocessing of engineered cells, to drug delivery and noninvasive control of cellular function. Ultrasound offers unique advantages in such contexts over optical, magnetic and printing-based approaches due to its functionality in opaque media, non-invasiveness, relatively high spatial precision on the μm scale, and rapid, reconfigurable field formation. Acoustic radiation force (ARF) allows ultrasound to manipulate materials whose density or compressibility differ from their surrounding medium. This capability can been used to manipulate, pattern and sort synthetic particles and cells, for example by using acoustic standing waves to create stable attractors for such objects or to separate them in microfluidic devices. However, due to the similarity of acoustic contrast factor among endogenous cellular materials, it is challenging to connect ARF-based actuation directly to intracellular gene expression. Doing so would require a genetically encodable agent capable of drastically altering the acoustic properties of a cell.

Figure 1B:
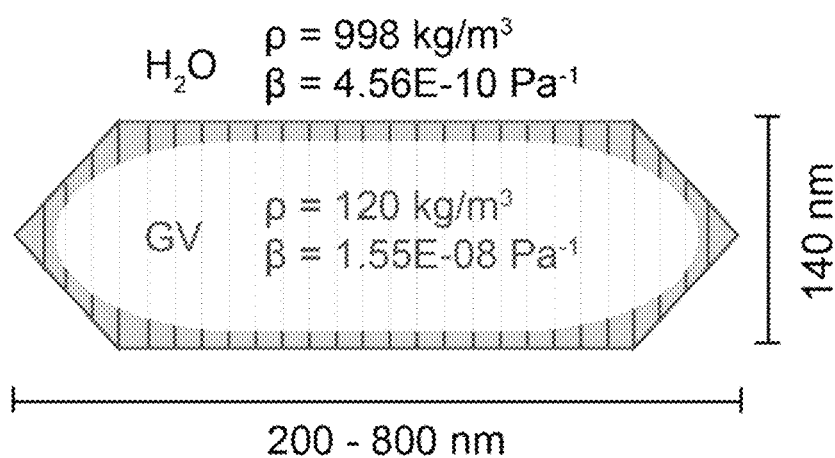

To address this need, it was hypothesized that gas vesicles (GVs)—a unique class of biologically assembled air-filled protein nanostructures—could experience strong ARF and enable the selective acoustic manipulation of GV-expressing cells. GVs are genetically encoded protein-shelled nanostructures with hydrodynamic diameters on the order of 250 nm (FIGS. 1A-1B) which evolved in aquatic photosynthetic microbes as a means to achieve buoyancy for improved access to sunlight. GVs comprise a physically stable hollow compartment enclosed by a 2 nm-thick protein shell that is permeable to gas but excludes liquid water. Based on their unique physical properties, GVs were recently developed as genetically encodable and engineerable contrast agents for non-invasive imaging. However, the ability of GVs to serve as actuators of ARF has not been tested.

Figure 1C:
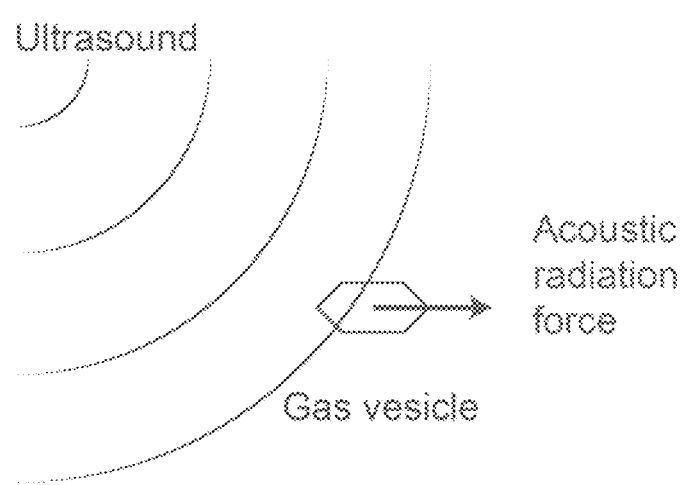
Figure 1D:
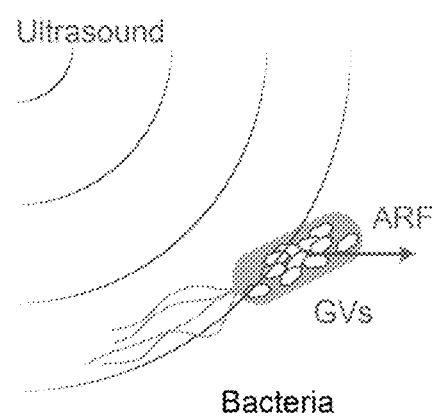
Figure 1E:
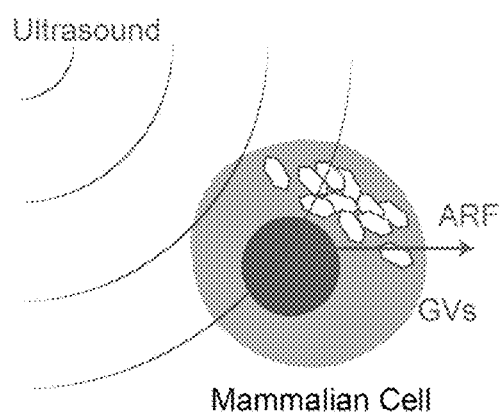

It was hypothesized that GVs' differential density and compressibility relative to aqueous media would allow these nanostructures to experience significant ARF (FIG. 1C), and that cells genetically engineered to express GVs would experience a drastically different radiation force due to changes in their acoustic properties (FIGS. 1D-1E). It was further hypothesized that the resulting forces would act in the opposite direction from other biomaterials, which are generally denser than water, allowing selective acoustic manipulation. This would connect mechanical actuation directly to the expression of a specific gene—a capability not provided by other genetic labels such as fluorescent proteins. In this study, these fundamental hypotheses were tested and the use of GVs was demonstrated in the selective acoustic trapping, translation, patterning, holographic bioprinting, and acoustofluidic sorting of genetically engineered cells. In addition, it is shown herein that the physical properties of purified GVs provide new capabilities for acoustic multiplexing, pressure measurement and endocytic cell labeling.

Gas Vesicles Experience Direct Acoustic Radiation Force

Figure 1F:
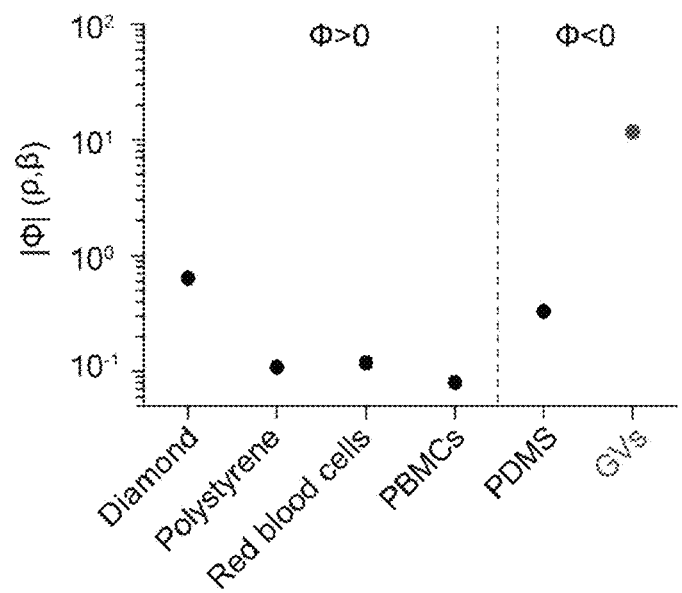

To estimate the expected ARF acting on GVs, they were modeled as spherical particles with an effective density of 120 kg/m$^3$ and compressibility of 1.55E-8 Pa$^{-1}$. Because both of these values are radically different from water (FIG. 1B), it was predicted that GVs would have a strongly negative acoustic contrast in aqueous media, with a contrast factor of −11.7 (FIG. 1F, Eq. 1 in Methods). While cells and most biological components exhibit positive acoustic contrast in aqueous solution, a few materials-such as microbubbles, polydimethylsiloxane (PDMS) elastomer microparticles and lipids-exhibit a negative contrast factor, allowing them to migrate up pressure gradients and efficiently separate from positive-contrast materials, as demonstrated in several important applications. It was hypothesized that GVs could be manipulated in a similar manner by responding directly to ARF at typical frequencies and energy densities of several MHz and ~10-100 J/m$^3$. Despite their nanometer dimensions, it was anticipated that GVs' exceptionally large contrast factor would allow them to overcome the challenges of sub-micron particle actuation caused by the volumetric scaling of ARF and the competing process of acoustic streaming.

Figure 2A:
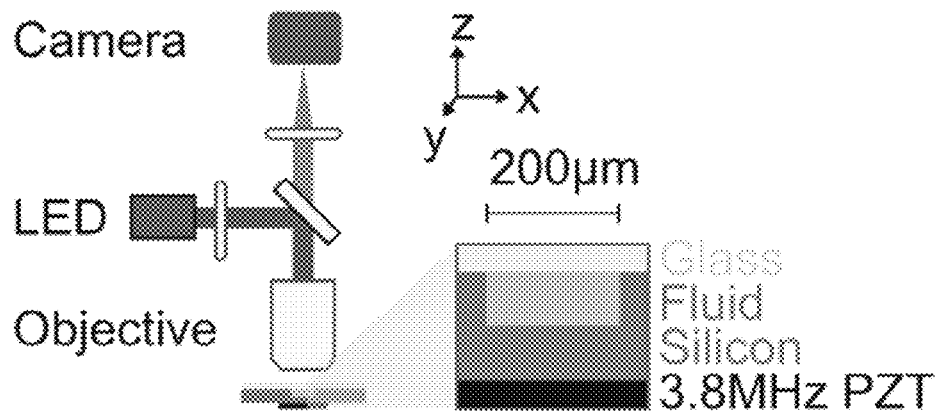
FIGS. 2A-2I depict non-limiting exemplary schematics and data related to gas vesicles experiencing direct acoustic radiation force.
Figure 2B:
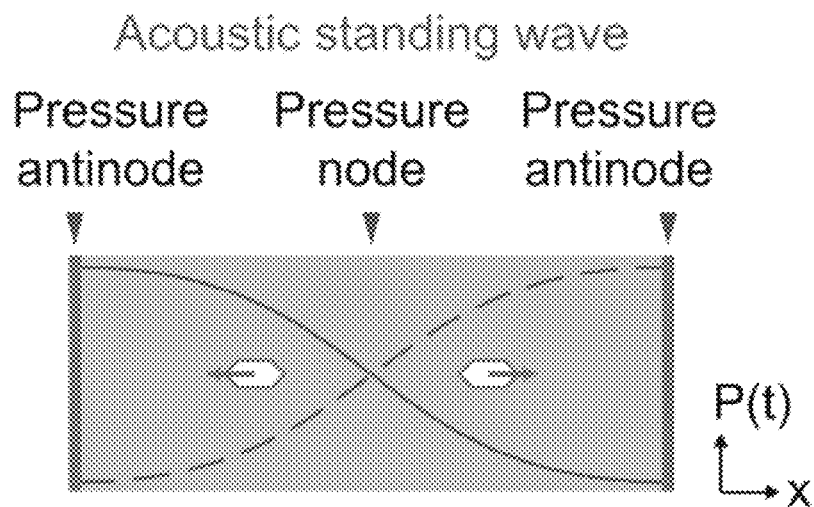
Figure 2C:
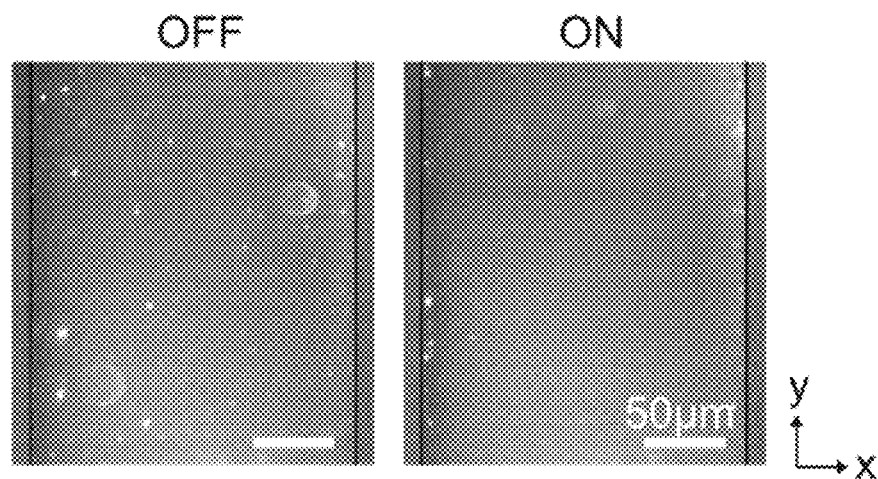
Figure 2D:
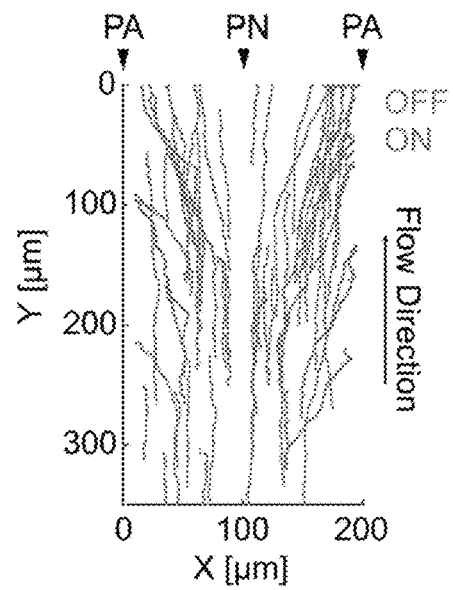
Figure 8A:
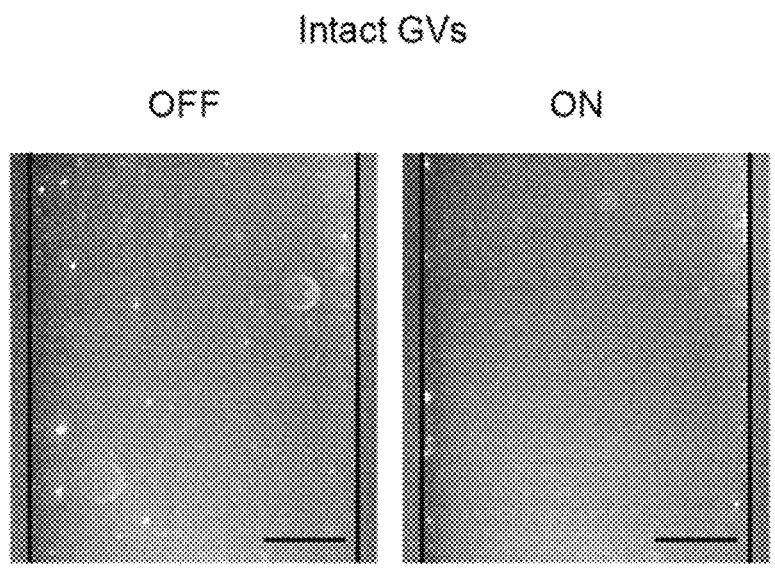
FIGS. 8A-8C depicts data related to control particles not experiencing substantial ARF. Fluorescence images of intact GVs (FIG. 8A), pressure-collapsed GVs (FIG. 8B), and polystyrene nanoparticles (FIG. 8C) inside the microfluidic channel before ultrasound (OFF) and 100 seconds after ultrasound has been turned on (ON). Device and acoustic conditions are as described in FIGS. 2A-2H.
Figure 8B:
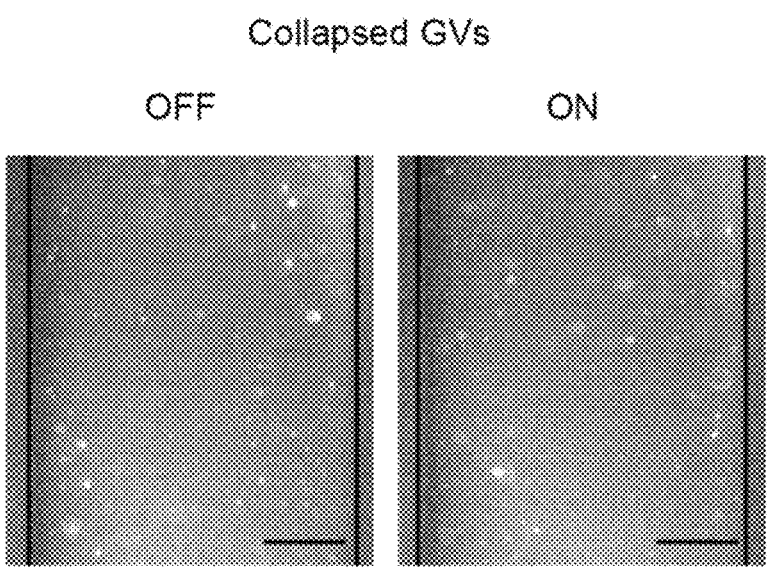
Figure 8C:
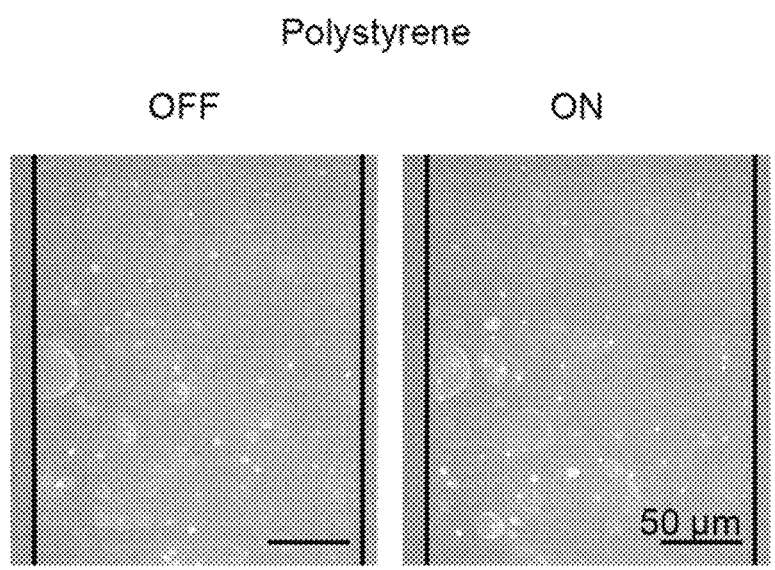

To test the ability of GV nanostructures to be manipulated with ARF, GVs were purified from the cyanobacterium *Anabaena flos-aquae* (Ana), chemically labeled them with a fluorescent dye, and imaged them in suspension inside a microfluidic channel coupled to a bulk piezoelectric resonator operating at 3.8 MHz (FIG. 2A). The channel width of 200 μm represents a half-wavelength at this frequency, resulting in a pressure node at its center and antinodes (areas of highest pressure) at each wall (FIG. 2B). As expected based on their negative acoustic contrast, GVs readily migrated to the pressure anti-nodes upon ultrasound application (FIGS. 2C-2D). As a control, GVs that were collapsed before the experiment with hydrostatic pressure were imaged (FIGS. 8A-8C). Neither collapsed GVs nor similarly-sized polystyrene tracer nanoparticles-included as an additional control and indicator of fluid motion-migrated in the acoustic field, confirming the absence of streaming.

Figure 2E:
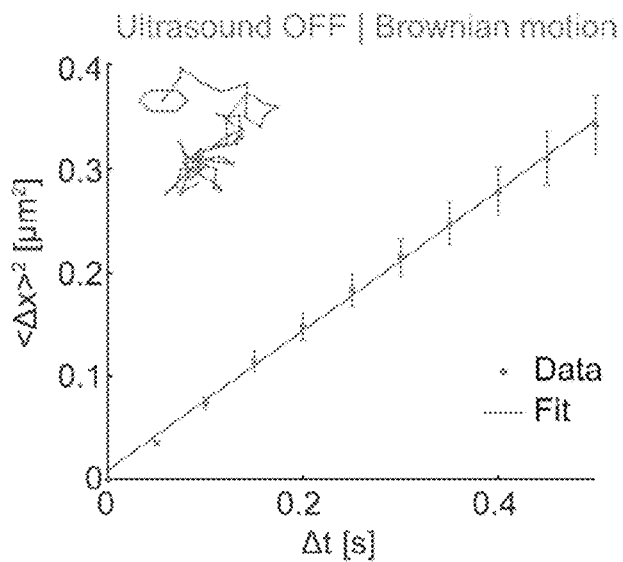
Figure 2F:
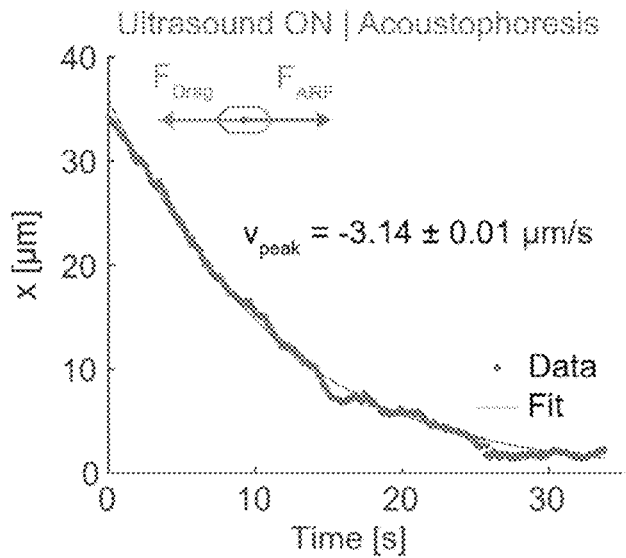
Figure 2G:
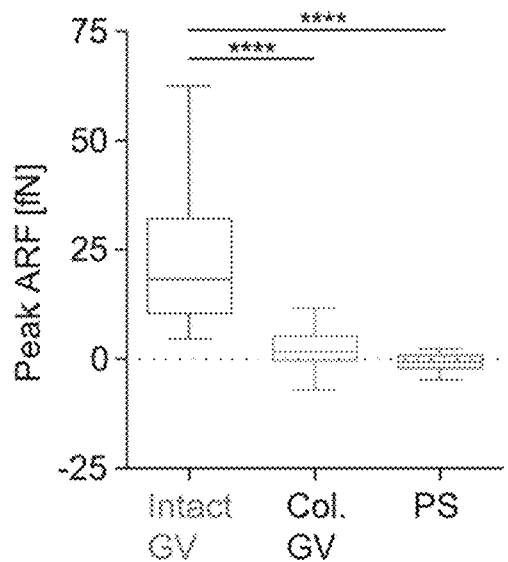

Next, the ARF acting on GV particles in solution was quantified using single-particle tracking (FIG. 2D). The Brownian motion of each particle before ultrasound application was used to determine its mobility and hydrodynamic size (FIG. 2E, Eq. 2 & 5 in Methods). For the same particle, its motion within the acoustic field during ultrasound application was fitted to an equation accounting for the spatial field profile (Eq. 4 in Methods), allowing the determination of peak particle velocity (FIG. 2F). The maximum ARF acting on GV particles was then determined by a balance with hydrodynamic drag, and measured to be 24.5±1.7 fN under the acoustic parameters used in this measurement (FIG. 2G). In contrast, control particles showed no substantial ARF.

Figure 2H:
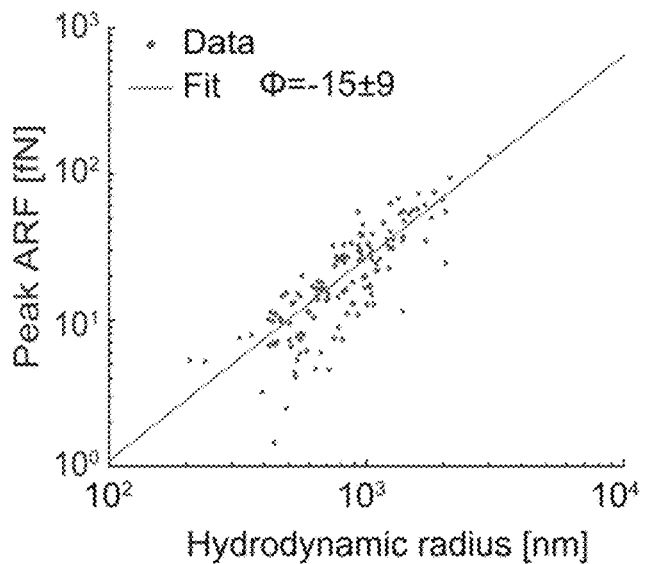

Colloidal association of individual GVs within the microfluidic channel resulted in tracked particles having a range of hydrodynamic radii larger than expected from a single GV. Therefore, to estimate the ARF acting on a single GV, the dependence of the ARF on the hydrodynamic radius of the clusters was plotted and it was fitted with a power law function accounting for fractal clustering (FIG. 2H, Eq. 6 in Methods, force-mobility exponent=1.39±0.06; R$^2$=0.744).

Figure 2I:
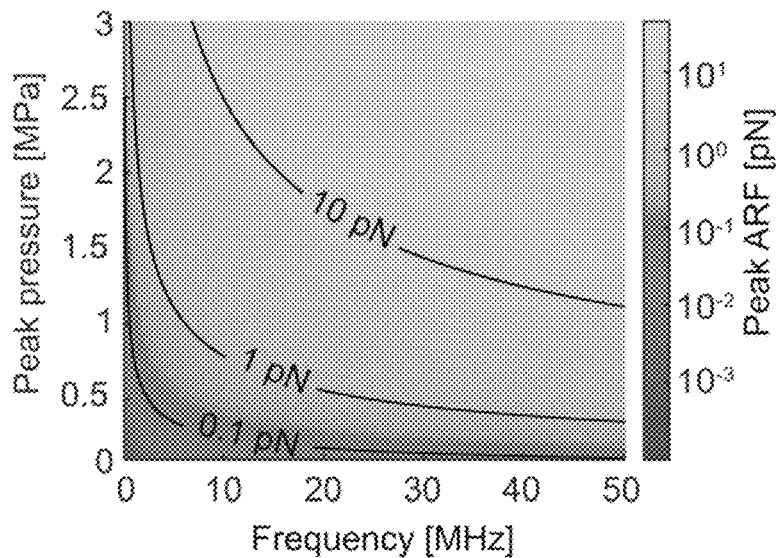

Given the acoustic energy applied in this experiment (0.25±0.02 J/m$^3$, FIGS. 9A-9C), this single-particle force corresponds to an acoustic contrast factor of −15±9, consistent with the theoretical estimate of −11.7 (FIG. 1E). Using this contrast factor, one can predict the ARF on a single GV across a range of typical acoustic parameters (FIG. 2I), with the expected force spanning from 0.01 to 10 pN. Forces of this magnitude are more than sufficient to overcome Brownian motion, as shown in the disclosed experiments, and are relevant to many biomolecular and cellular interactions. Overall, these results establish GVs as a genetically encodable biomolecular nanomaterial that can be manipulated with acoustic fields.

Heterologous Expression of GVs Enables Selective Manipulation of Engineered Bacteria Having established the ability of GVs to experience strong ARF, the ability of these genetically encodable nanostructures to act as a driver of ARF response in genetically engineered cells was tested. This possibility is based on the fact that GV expression significantly reduces the average density of the cell, resulting, for example, in the floatation of GV-expressing bacteria in water. In combination with an anticipated increase in average cellular compressibility, this is expected to change the acoustic contrast of the cells from +0.07 to −1.1, inverting the sign of their acoustic contrast from positive to negative and increasing its magnitude by more than 10-fold.

Figure 3A:
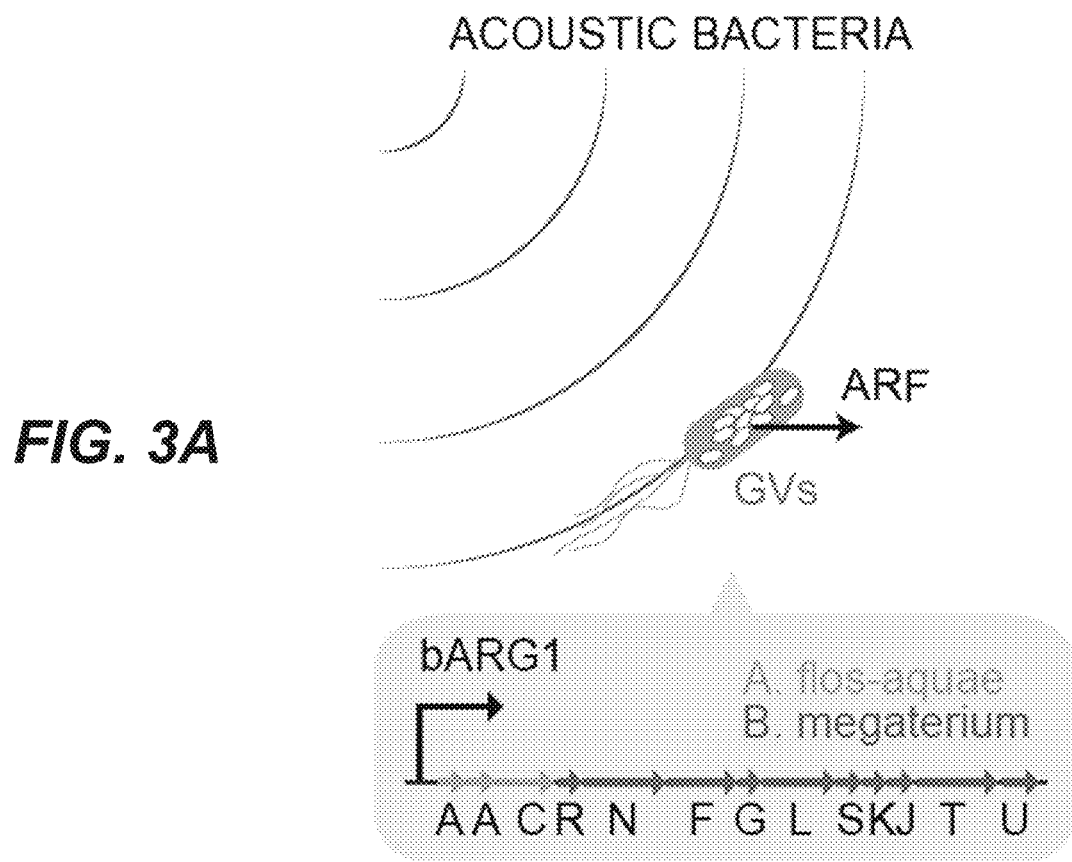
Figure 3B:
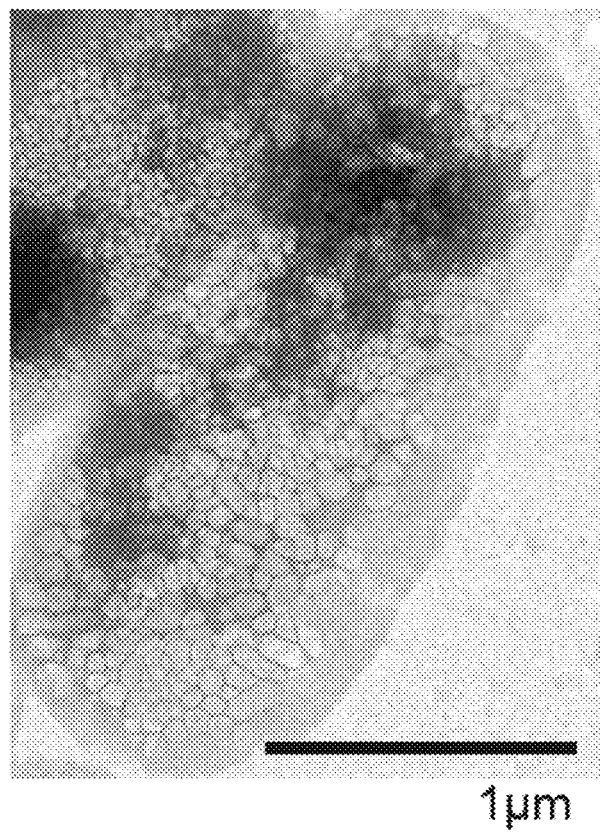
Figure 3D:
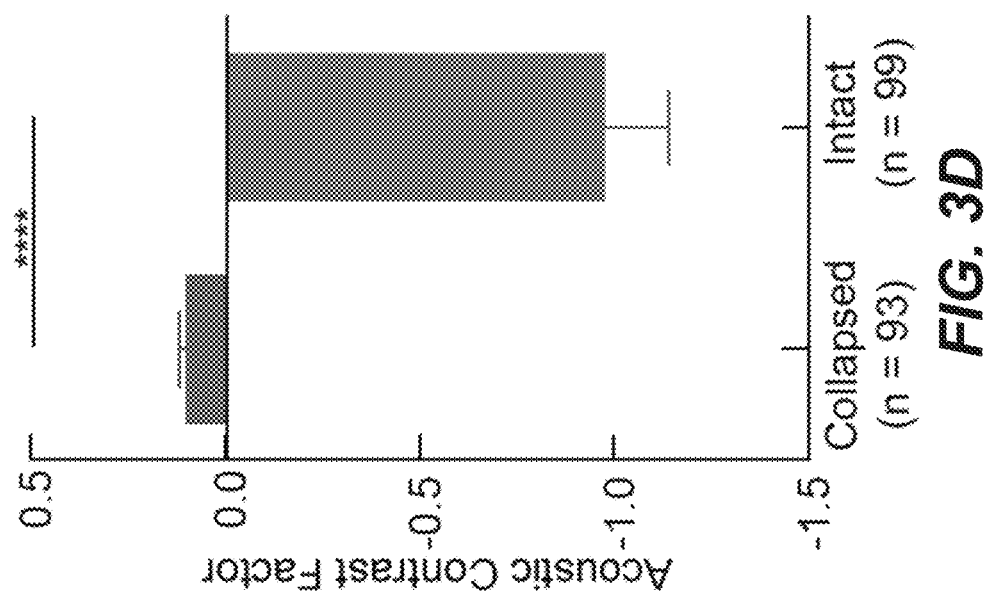
Figure 3C:
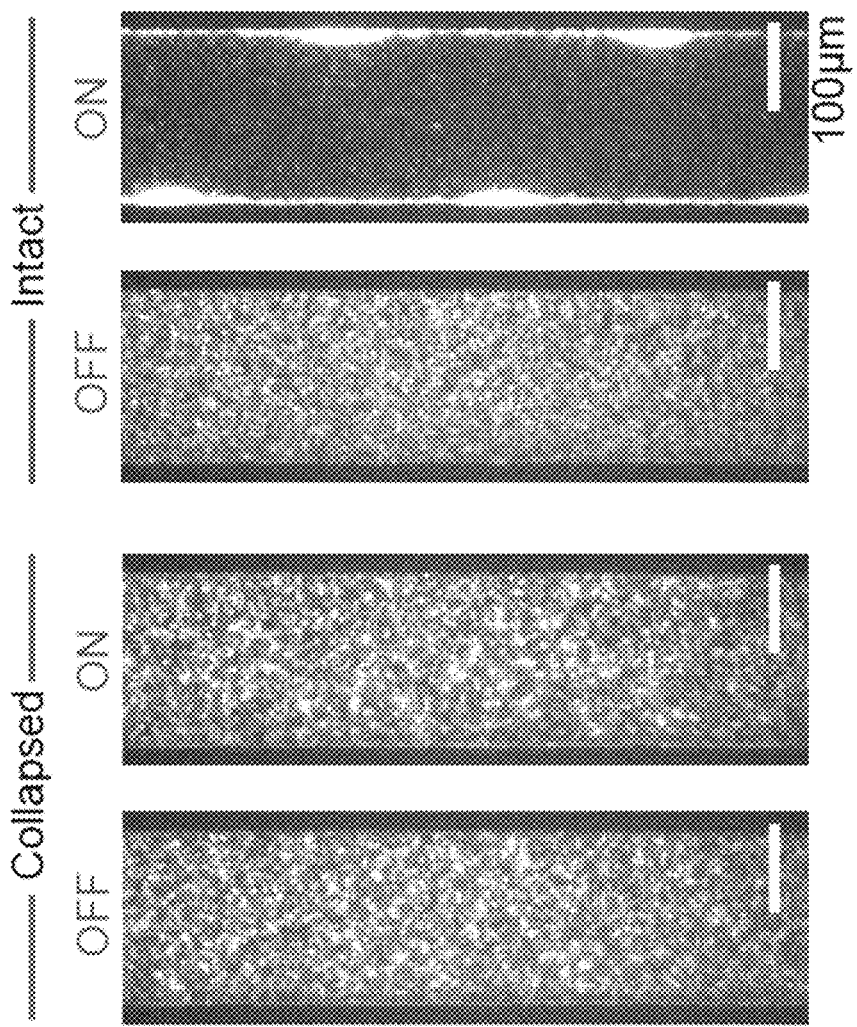

This hypothesis was first tested by heterologously expressing intracellular GVs in *E. coli* using a recently developed genetic construct, bacterial acoustic reporter genes (bARG1), comprising of a combination of 13 genes from *A. flos-aquae* and *B. megaterium* (FIGS. 3A-3B). After enriching for high expression using centrifugation, which uses buoyancy as an indicator of GV formation, the cells were labeled with a fluorescent dye to enable live cell tracking. bARG1-expressing cells or control cells with pressure-collapsed intracellular GVs were then subjected to acoustic standing waves under static flow conditions using the microfluidic device depicted in FIG. 2A. Remarkably, while control cells showed no response to the applied acoustic field, the genetically modified bARG1-expressing cells containing intact intracellular GVs quickly migrated to pressure antinodes at the channel wall (FIG. 3C and movie data not shown). This result confirms that GV expression results in cells having a negative contrast factor, which is opposite from normal cells (FIG. 1F), and shows that the magnitude of this contrast factor is substantially larger than for wildtype controls, since under the same acoustic conditions the control cells did not migrate to the pressure node. This is consistent with the fact that small cells such as bacteria are challenging to manipulate with ARF in their native form.

To quantify the ARF enhancement provided by GV expression, single-cell tracking was performed on bARG1-expressing cells containing intact or collapsed intracellular GVs in the presence or absence of applied ultrasound and analyzed the resulting cellular trajectories using the method described above for GVs. It was found that while control cells have an acoustic contrast factor of 0.10±0.02, similar to that of wildtype cells, GV expression provides the engineered cells with an acoustic contrast factor of −1.0±0.2, consistent with the theoretical estimate of −1.1, and representing a 10-fold enhancement in magnitude compared to controls (FIG. 3D).

Figure 3E:
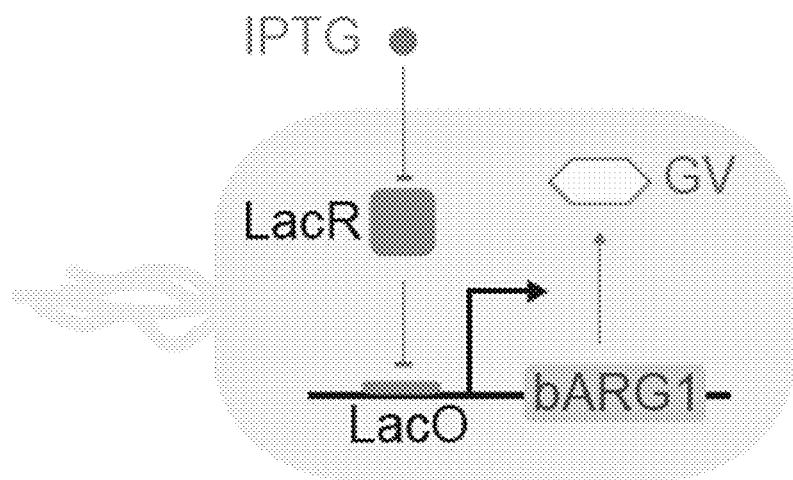
Figure 3F:
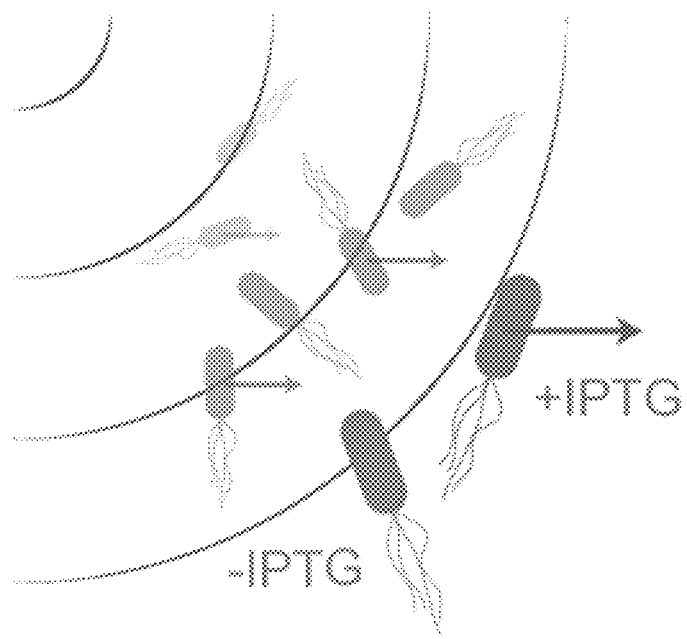
Figure 3G:
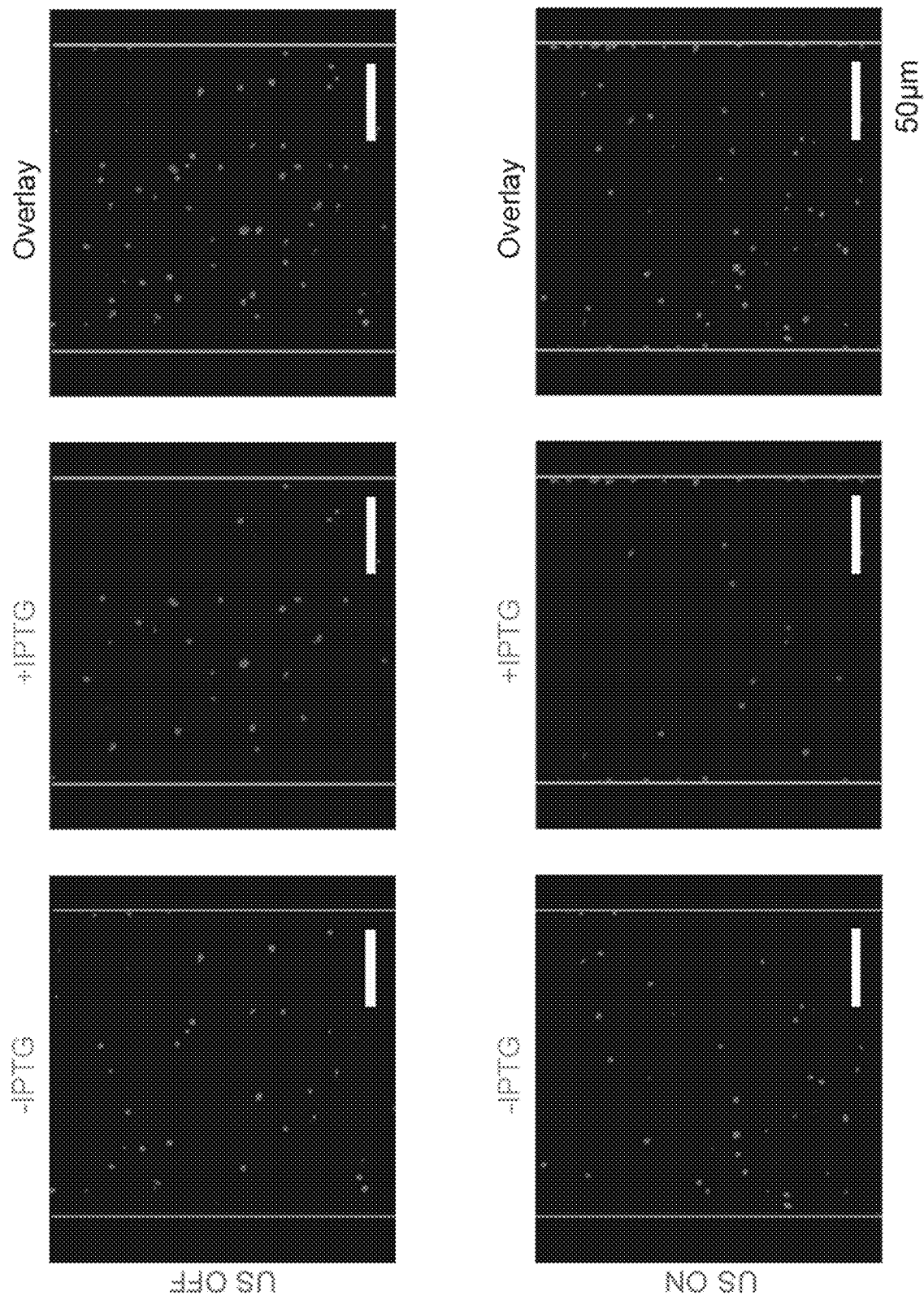

After establishing that GVs can strongly amplify cellular ARF, it was next hypothesized that cells expressing GVs can be selectively actuated within a heterogenous cell mixture (FIGS. 3E-3F). To test this hypothesis, a genetic circuit was implemented placing the expression of GVs under the control of chemical induction by isopropyl β-d-1-thiogalactopyranoside (IPTG), and created a cell mixture containing induced and non-induced cells where each population was separately labeled with a fluorescent dye. When ultrasound was applied to this cell mixture under static flow conditions, it was observed that only the cells that have been induced with IPTG were actuated, while the non-induced cells showed no response to the applied acoustic field (FIGS. 3G-3H). These results demonstrate the ability of GVs to connect an acoustophoretic phenotype to the output of a genetic program, providing the means to selectively manipulate cells based on a variety of cellular states.

Dynamic Patterning and Rapid Biofabrication with Engineered Bacteria

Having established that GV-expressing cells experience strong ARF towards areas of high acoustic pressure, it was asked whether this capability would enable the trapping and spatial patterning of living cells. Considerable interest exists in the use of engineered cells as patterned components of living materials for biomedical uses such as tissue engineering, and as self-healing and actively reconfigurable materials in non-biomedical applications. However, few methods exist to dynamically configure the location of cells in 3-D space. In contrast, ARF in the form of engineered standing and traveling waves has been used to create complex 2-D and 3-D arrangements.

Figure 4A:
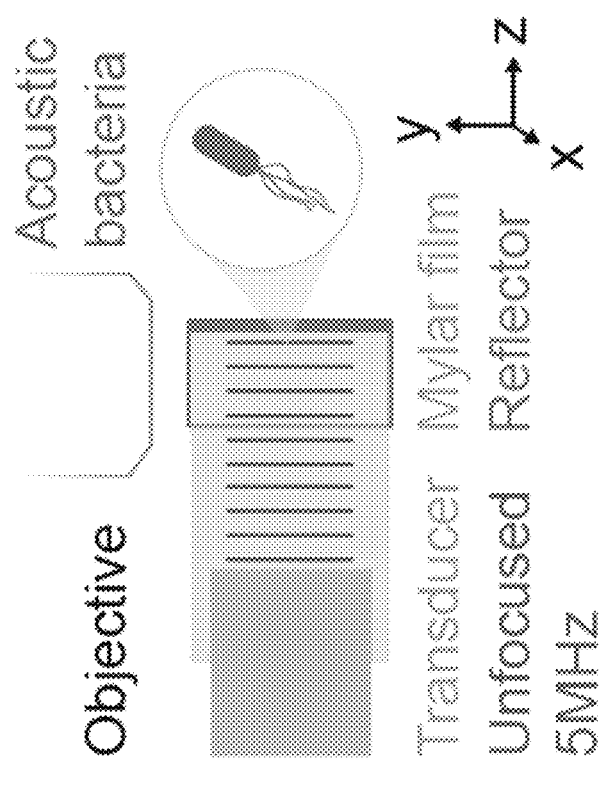
FIGS. 4A-4J depict non-limiting exemplary schematics and data related to dynamic patterning and one-step bioprinting with acoustic bacteria.
Figure 4B:
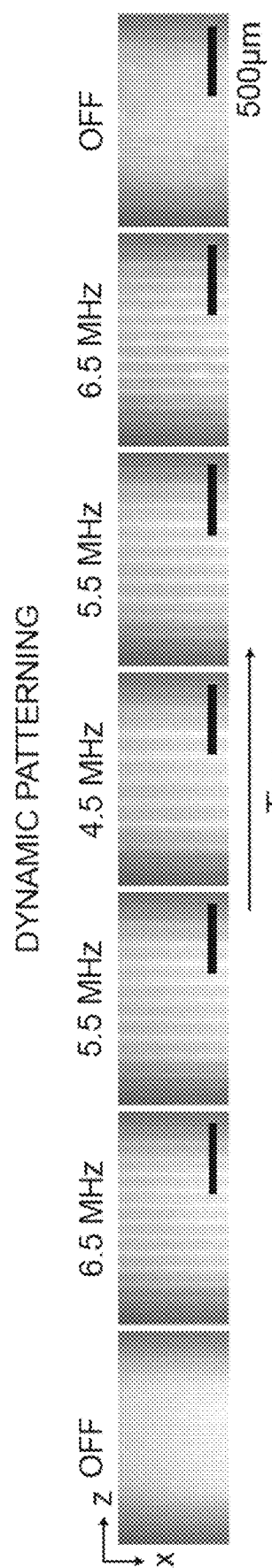
Figure 10:
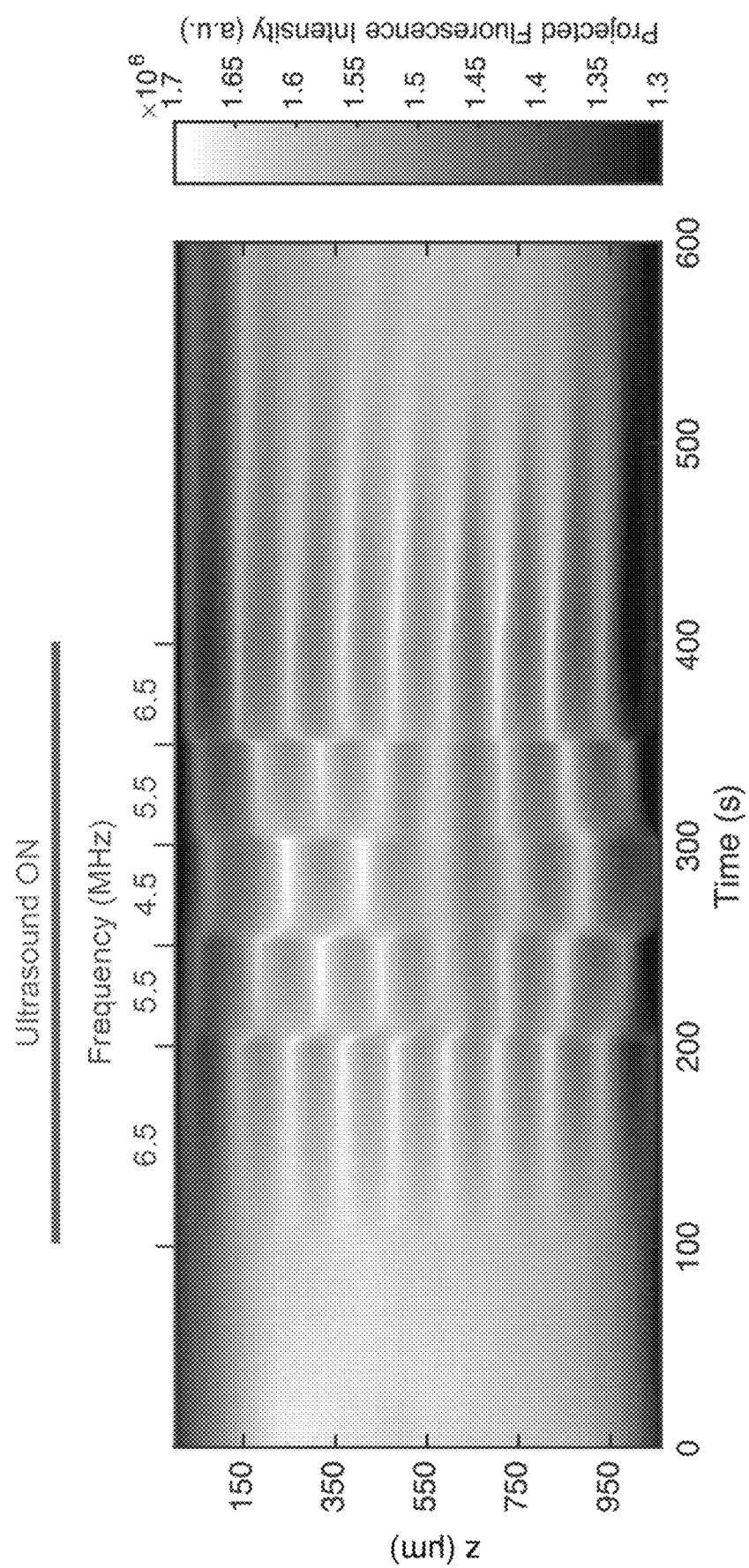
FIG. 10 depicts data related to how cell patterns can be reconfigured on the timescale of seconds. Kymograph of projected fluorescence signal from arg1-expressing E. coli during the application of ultrasound at different ultrasound frequencies. Conditions as described in FIGS. 5A-5B.

It was hypothesized that ARF combined with GV expression would allow engineered cells to be patterned in a precise and rapid manner. To test this basic concept, a standing wave pattern of repeating pressure antinodes was generated in a specially designed acoustic chamber by using an unfocused 5 MHz transducer reflected by glass (FIG. 4A). Imaging the cells using fluorescence microscopy, it was observed that engineered cells readily adopted the desired pattern in solution, and that changing the ultrasound frequency allows the spatial pattern of these cells to be dynamically reconfigured on the timescale of seconds (FIG. 4B, FIG. 10 and movie data not shown).

Figure 4C:
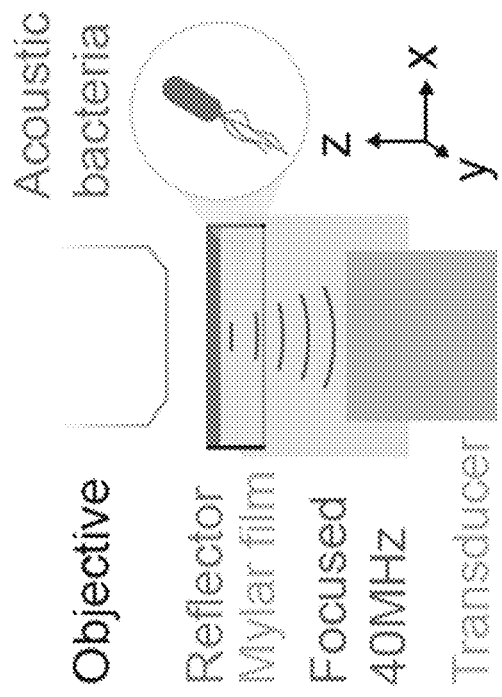
Figure 4D:
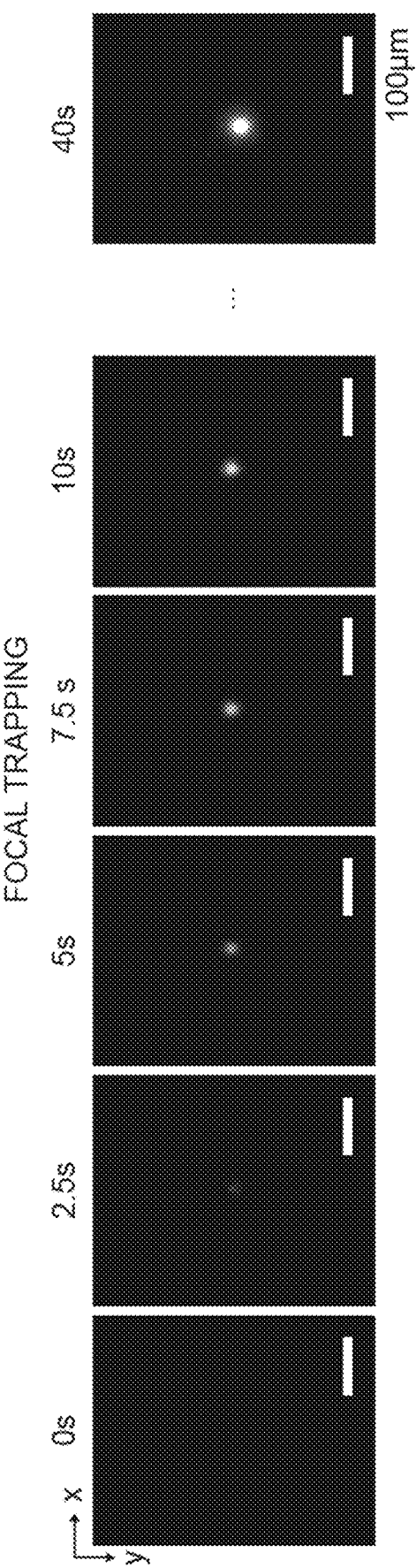
Figure 4E:
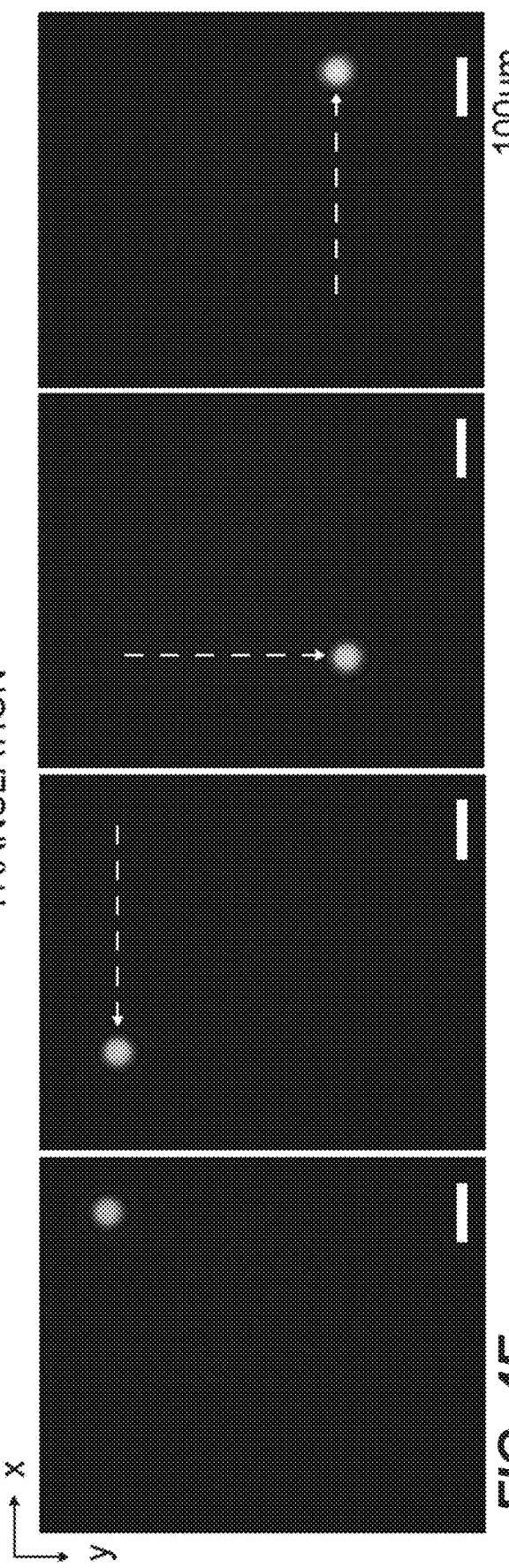
Figure 4F:
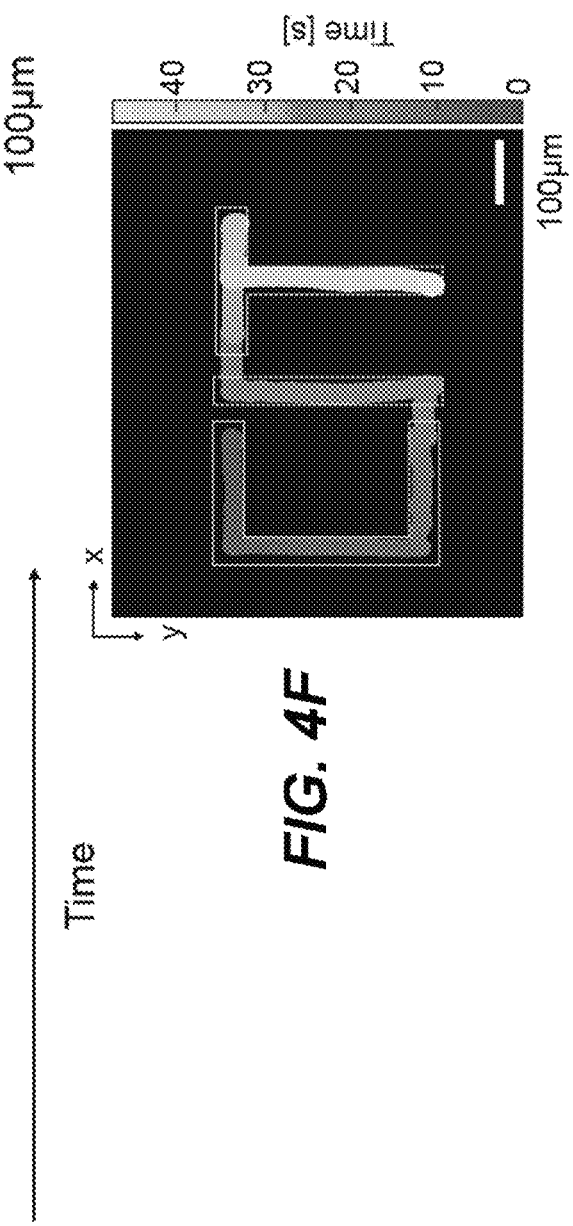

Another method of acoustic manipulation involves the confinement of acoustic particles at the focus of an ultrasound transducer, allowing the particles to be concentrated and transported between discrete locations in space, analogous to an optical trap. To determine whether focal trapping is possible with engineered acoustic cells, a trap was generated using a 40 MHz focused ultrasound transducer reflected on glass (FIG. 4C). This configuration is expected to exert radial ARF on the cells towards the center of the ultrasound focus. As expected, GV-expressing cells within this acoustic field coalesced into a cellular cluster upon ultrasound application (FIG. 4D and movie data not shown) and could then be moved around in space by laterally translating the ultrasound transducer, generating a desired spatiotemporal pattern (FIGS. 4E-4F and movie data not shown).

Figure 4H:
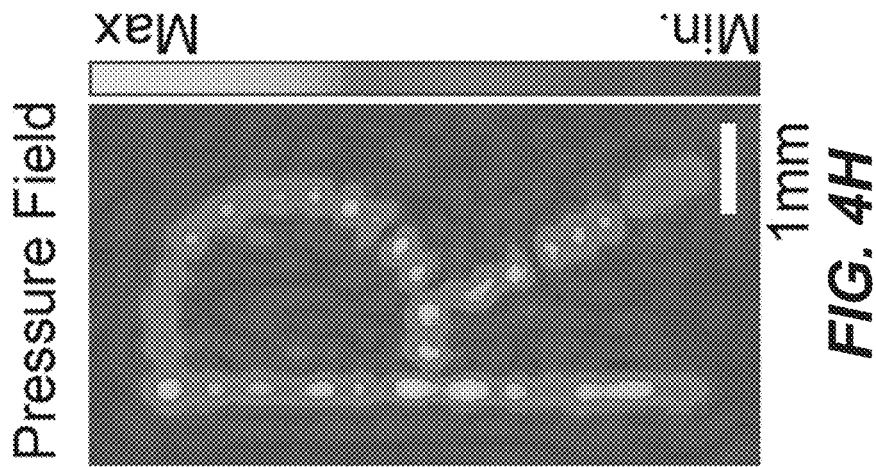
Figure 4G:
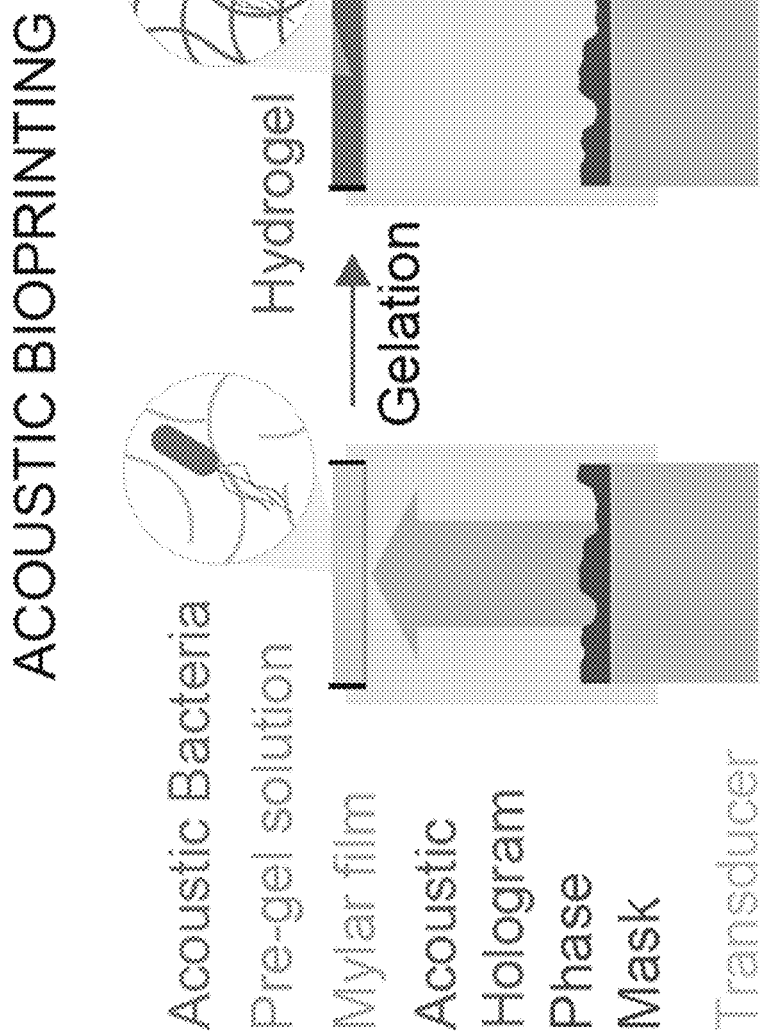
Figures 4I, 4J:
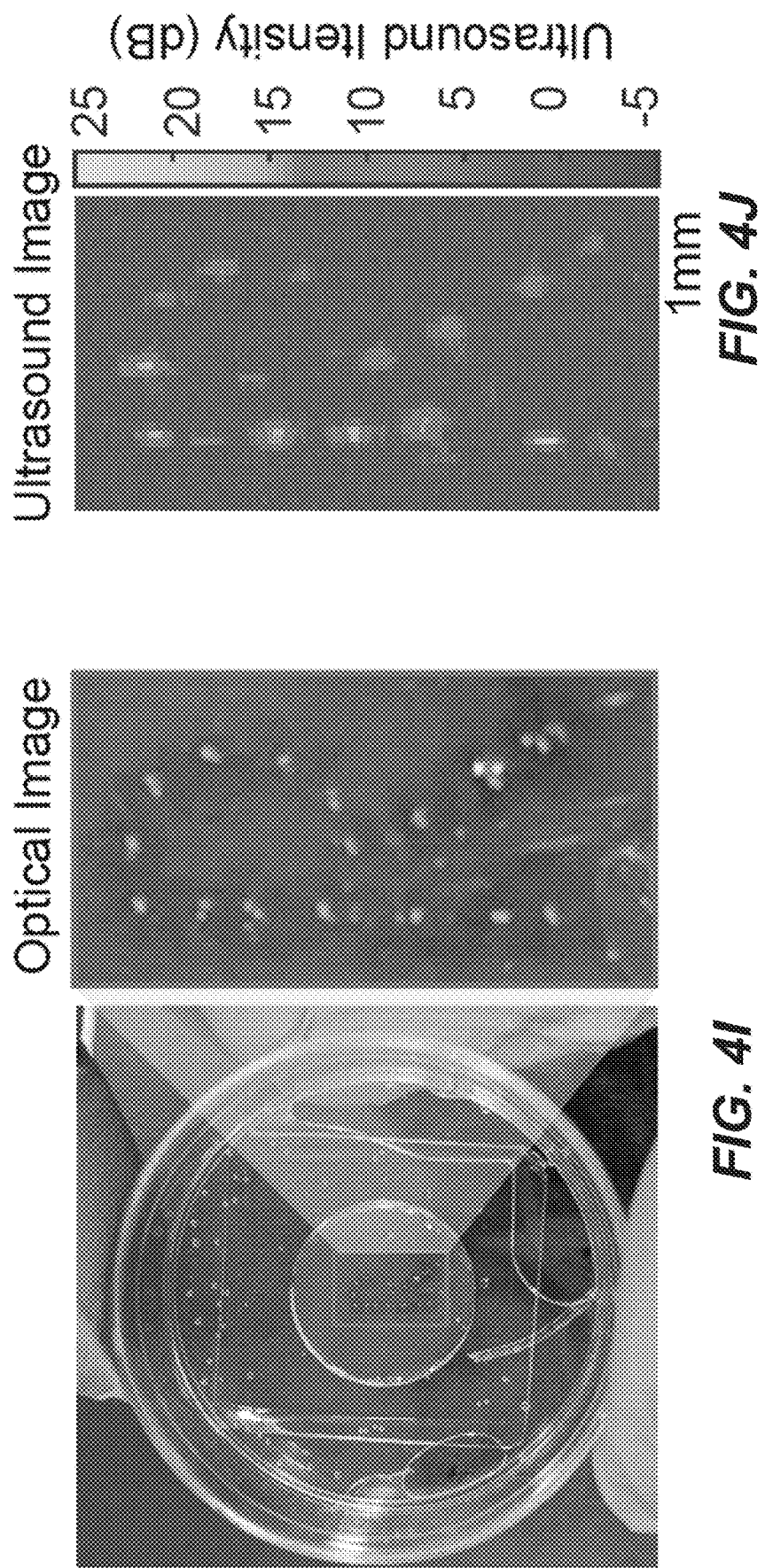
Figure 12:
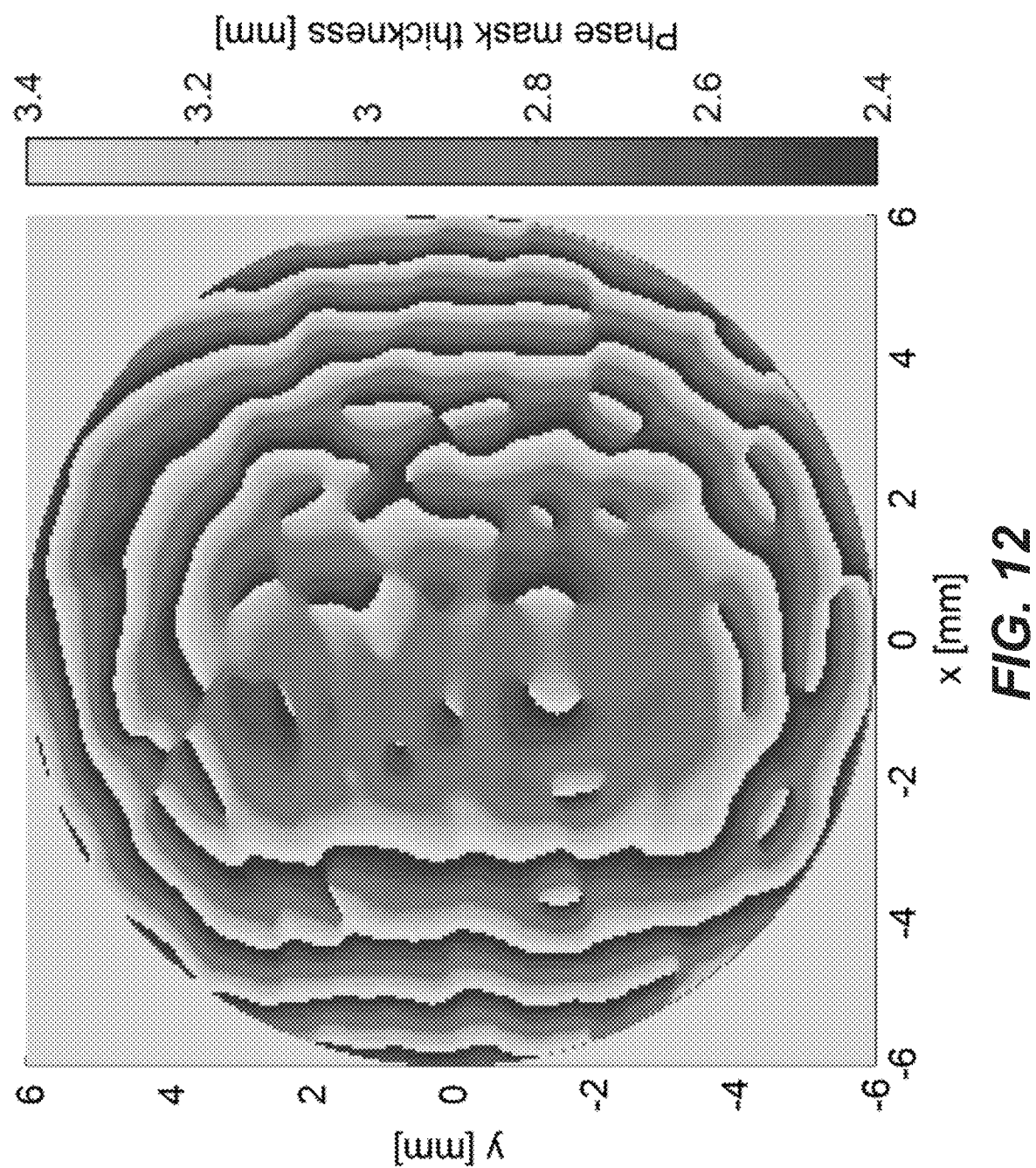
FIG. 12 depicts data related to a hologram phase mask. Thickness map of the 3D printed phase mask designed to produce an 'R'-shaped pressure profile.

Acoustic manipulation can also be used for rapid fabrication of heterogeneous materials by concentrating acoustic particles in spatial patterns defined by the acoustic field, and subsequently immobilizing the pattern with cross-linking chemistry. Negative contrast agents have an intrinsic advantage in this application due to their migration to acoustic pressure maxima, which are more easily patterned in complex spatial arrangements. It was hypothesized that living materials containing GV-expressing acoustic bacteria could be fabricated using this method (FIG. 4G). To test this possibility, an acoustic hologram was created using a single-element 3.5 MHz transducer and a 3D-printed phase mask designed to produce an 'R'-shaped pressure profile (FIG. 4H, FIG. 12). This hologram was applied to acoustic bacteria suspended in an agarose solution that can be solidified at cold temperatures to form a gel. As expected, the bacteria were immobilized inside the gel in the desired spatial pattern (FIG. 4I). As an added feature, the spatial distribution of GV-expressing cells could be imaged with ultrasound (FIG. 4J), providing a means to verify patterning in optically opaque media. These results demonstrate the ability of GVs to enable the acoustic trapping, patterning and dynamic rearrangement of engineered bacteria, and the rapid biofabrication of living materials.

GVs Enable Selective Manipulation of Mammalian Cells

Figure 5A:
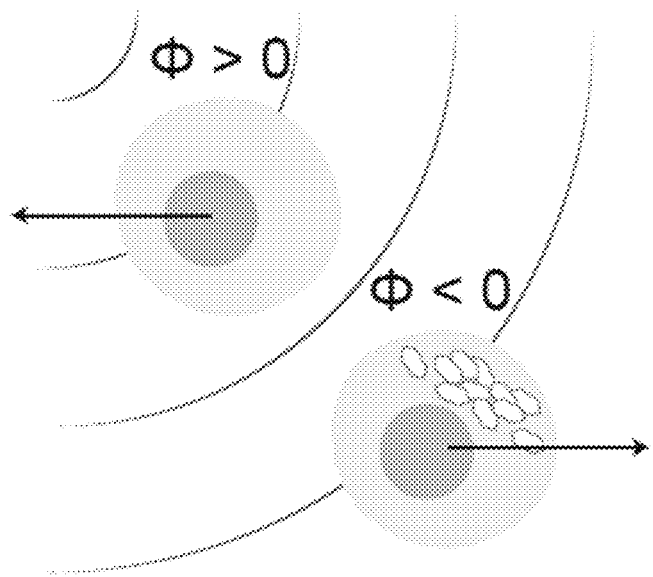
FIGS. 5A-5H depict non-limiting exemplary schematics and data related to gas vesicles inverting cellular response to ARF in mammalian cells.
Figure 5B:
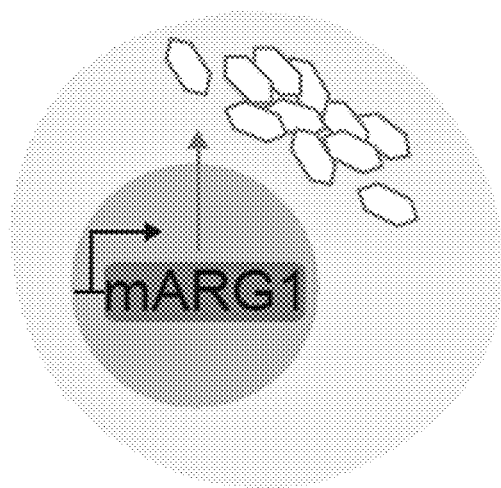
Figure 5C:
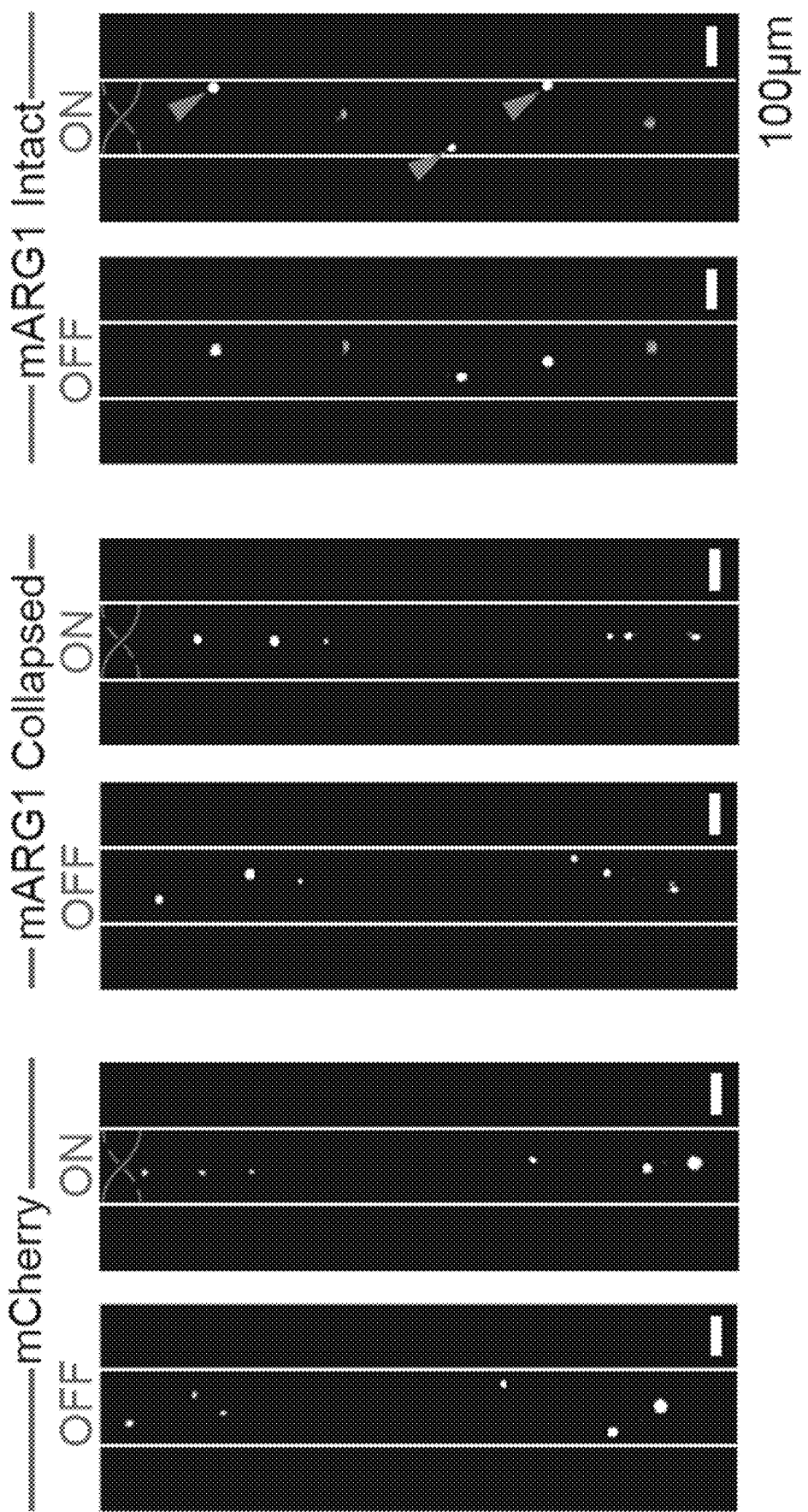
Figure 5D:
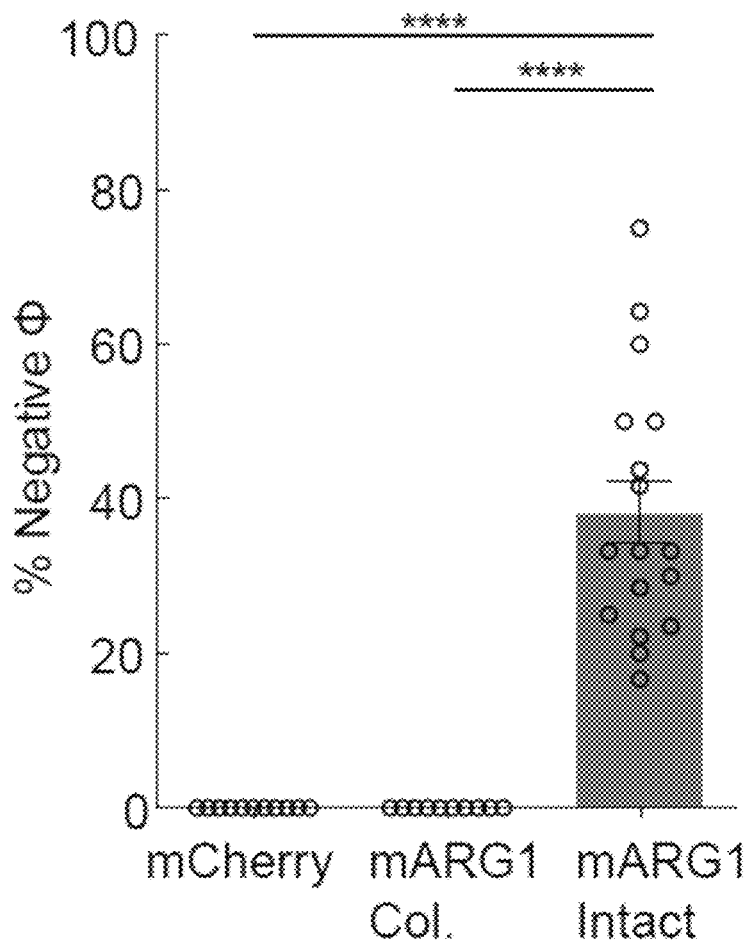

Having established GVs as a genetically encodable acoustic actuator in bacteria, the ability of GVs to similarly alter the acoustic properties of mammalian cells was examined (FIG. 5A). To test this concept, human HEK293T cancer cells were engineered to express GVs as part of a chemically inducible genetic program (mARG1) (FIG. 5B). When ultrasound was applied to these cells in the microfluidic channel under static flow conditions, it was observed that a large fraction of the engineered population displayed a negative contrast factor by moving to the pressure antinodes at the channel walls (FIGS. 5C-5D). In contrast, control cells expressing the fluorescent protein mCherry or GV-expressing cells in which GVs were pre-collapsed with hydrostatic pressure migrated to the pressure node in the middle of the channel (FIGS. 5C-5D), as expected from their positive contrast factor.

Figure 5E:
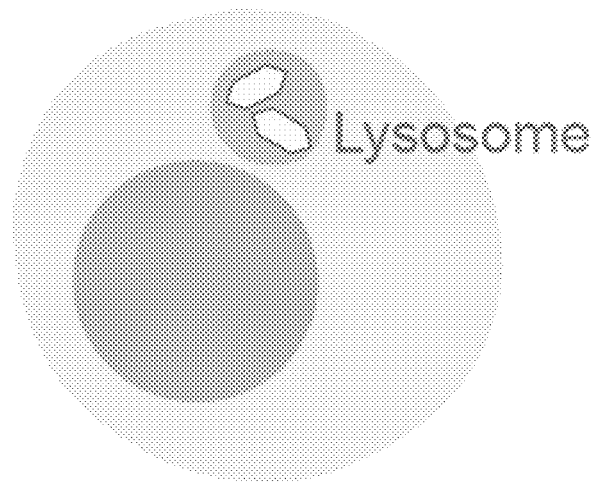
Figure 5G:
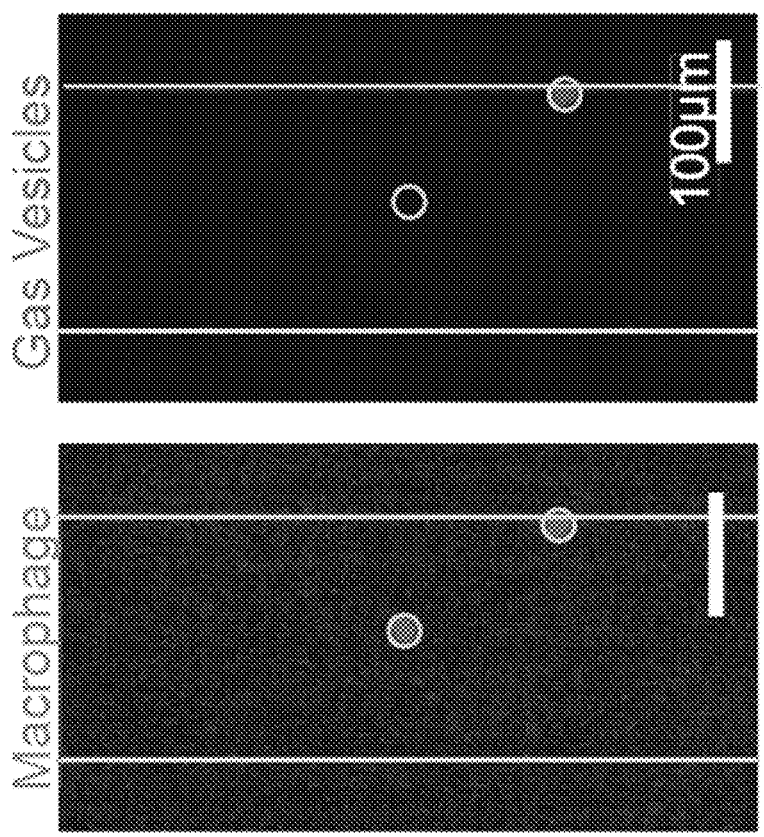
Figure 5F:
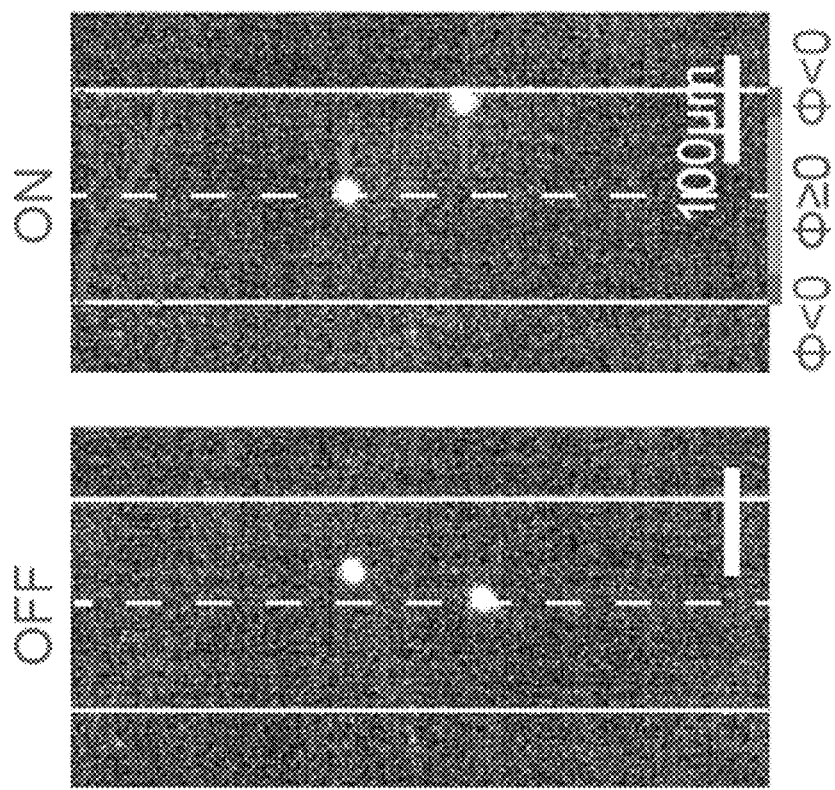
Figure 5H:
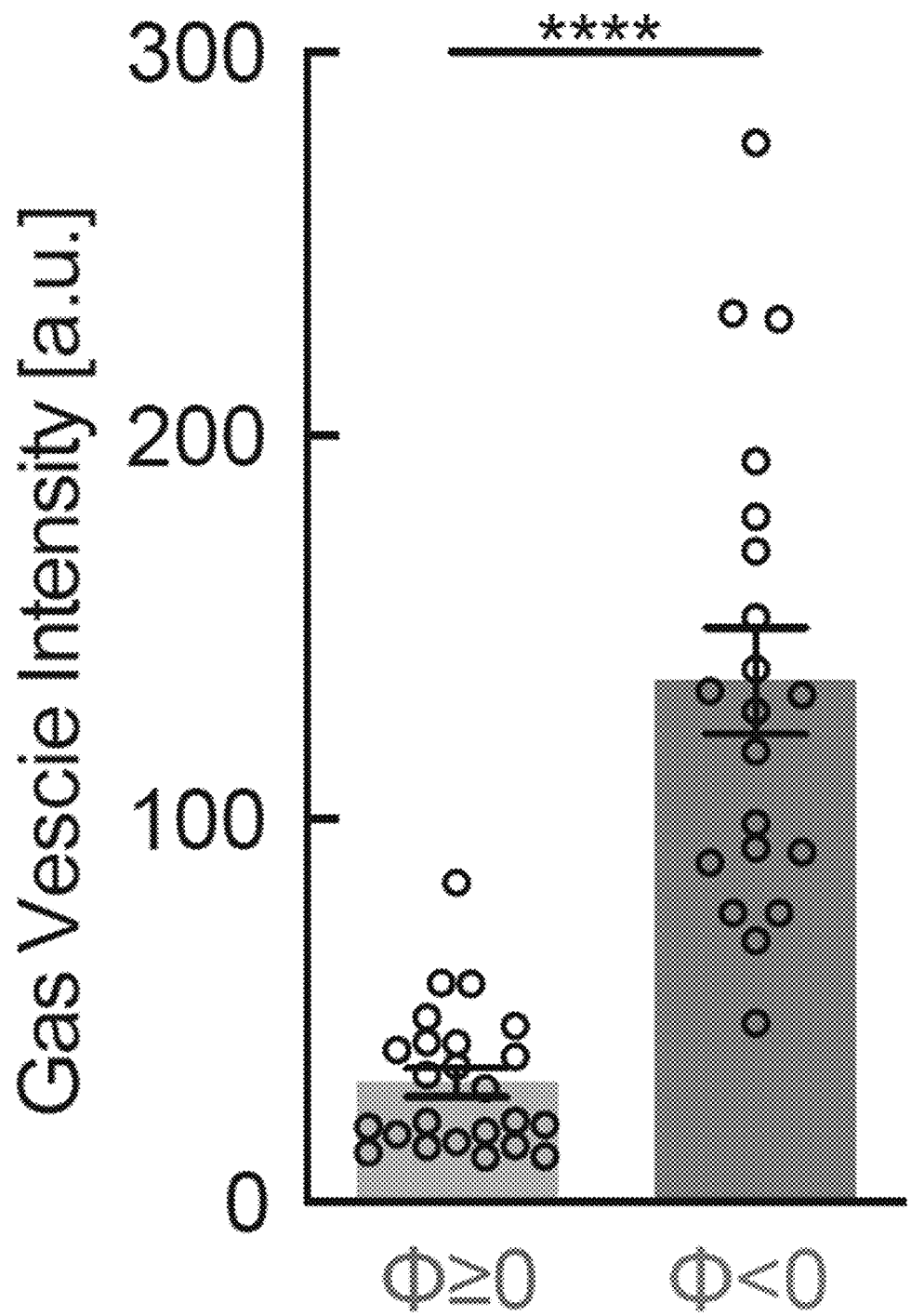

After demonstrating the ability of GVs to provide mammalian cells with genetically encoded acoustic actuation, the ability of these biomolecules to serve as externally applied acoustic labels was also tested. For this purpose, fluorescently-tagged GVs were incubated with murine macrophages, leading to the endosomal uptake of the GV particles (FIG. 5E). After applying ultrasound under static flow conditions, it was observed that a distinct sub-population of the macrophages moved towards the pressure antinodes, indicating an inversion of their acoustic contrast (FIG. 5F). Visualizing the separate fluorescence channels corresponding to the macrophages and the GVs revealed that the cells with a negative contrast factor had significantly higher GV content than the positive-contrast cells (FIGS. 5G-5H). In this setting, the GVs enabled mammalian cells to be separated acoustically based on a specific biological function-endocytosis. Taken together, these results demonstrate the ability of GVs to enable selective manipulation of mammalian cells on the basis of gene expression or biological activity.

Acoustofluidic Sorting of Cells Based on their Genotype

After establishing that GVs can be used to drive differential manipulation of mammalian cells by acoustic fields, it was sought to apply this capability towards acoustic sorting of cells based on their genotype in an acoustofluidic device. Currently, the most common method for genotype-based selection of cells uses fluorescent proteins in combination with fluorescence-activated cell sorting (FACS). However, FACS instruments are complex and expensive, often limiting their use to centralized facilities. To enable more widespread genetic engineering and preparation of therapeutic cells, there is a need for more efficient and lower cost methods for genotype-based cell selection. It was hypothesized that GVs in combination with acoustofluidic sorting devices could enable this capability.

Figure 6A:
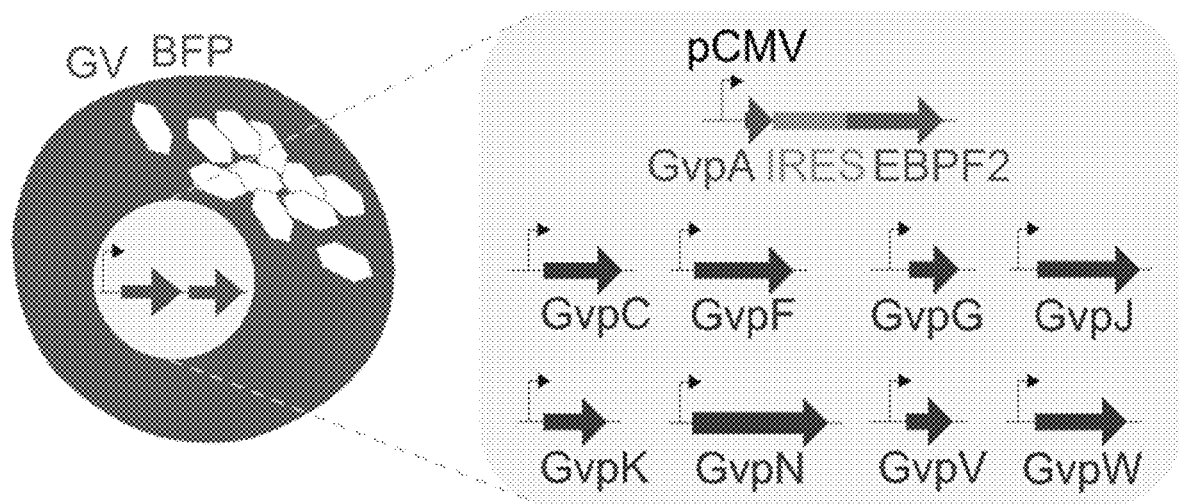
FIGS. 6A-6E depict non-limiting exemplary schematics and data related to acoustofluidic sorting of cells based on their genotype.
Figure 6B:
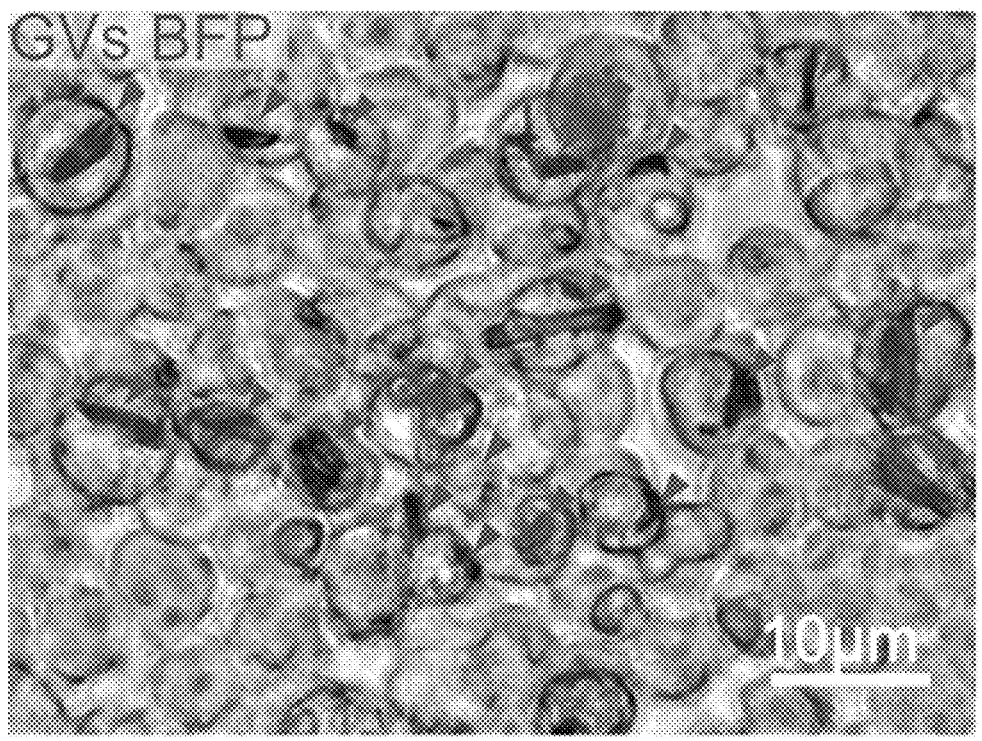

To examine this possibility, mammalian cells were engineered to express GVs via transient transfection, which produces a range of transgene expression levels due to the stochastic incorporation of the transfection complex by the cells. The genetic sequence was designed such that the expression of the GV structural protein, GvpA, is transcriptionally linked to a desired genotype, in this case the expression of a cargo protein via the internal ribosome entry site (IRES) sequence (FIG. 6A). A fluorescent protein, EBFP2, was chosen as the model cargo protein to enable the quantification of the cargo expression level optically. Fluorescence and phase-contrast imaging of the engineered cells revealed co-localized expression of EBFP2 and GVs to the same cells (FIG. 6B).

Figure 6C:
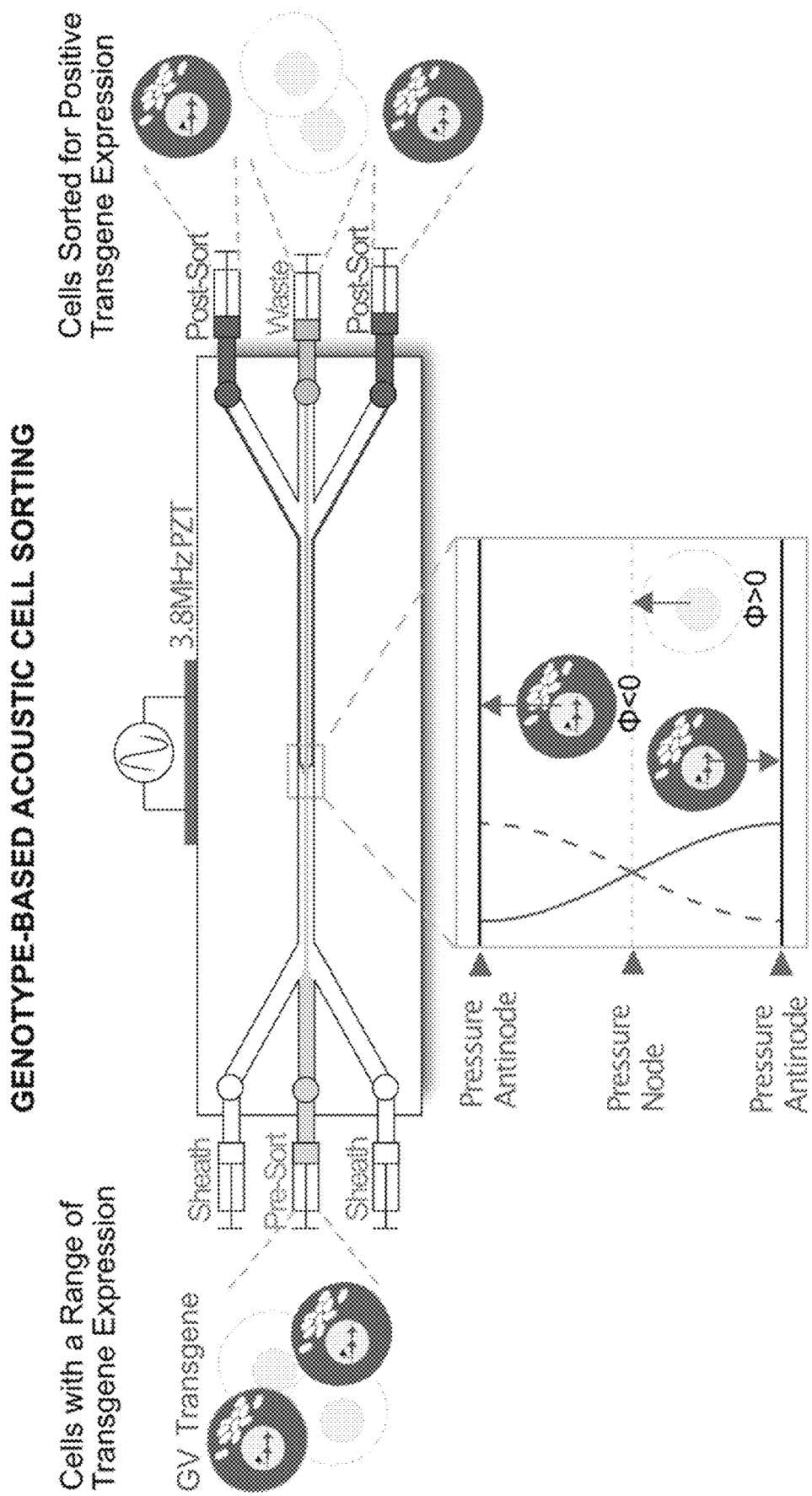

To enable sorting, an acoustofluidic device was constructed with three fluidic inlets and outlets to facilitate the enrichment process in a continuous flow manner (FIG. 6C). Cells with a range of transgene expression were introduced into the device via the center fluidic inlet and hydrodynamically focused to the center flow stream by the sheath flow introduced by the two side inlets. An acoustic field was applied to a section of the channel, resulting in antinodes at its walls. It was reasoned that cells with sufficient transgene expression, resulting in negative acoustic contrast, would be actuated towards the flow streams near the walls of the channel, while cells with lower transgene expression would remain in the central flow streams due to their neutral or positive acoustic contrast. A trifurcation at the outlet separated the central and peripheral streams, with cells collected from the side outlets expected to be enriched for high transgene expression (FIG. 6C).

Figure 6E:
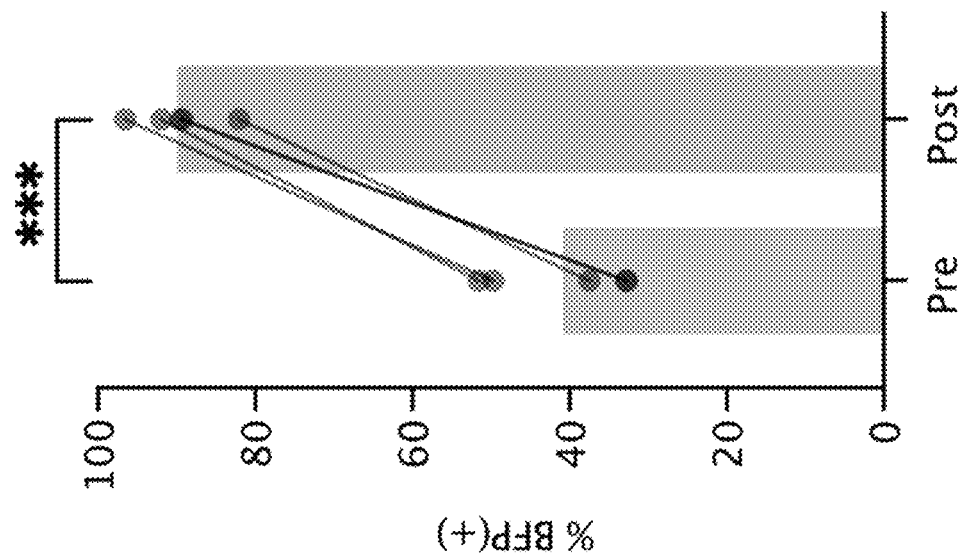
Figure 6D:
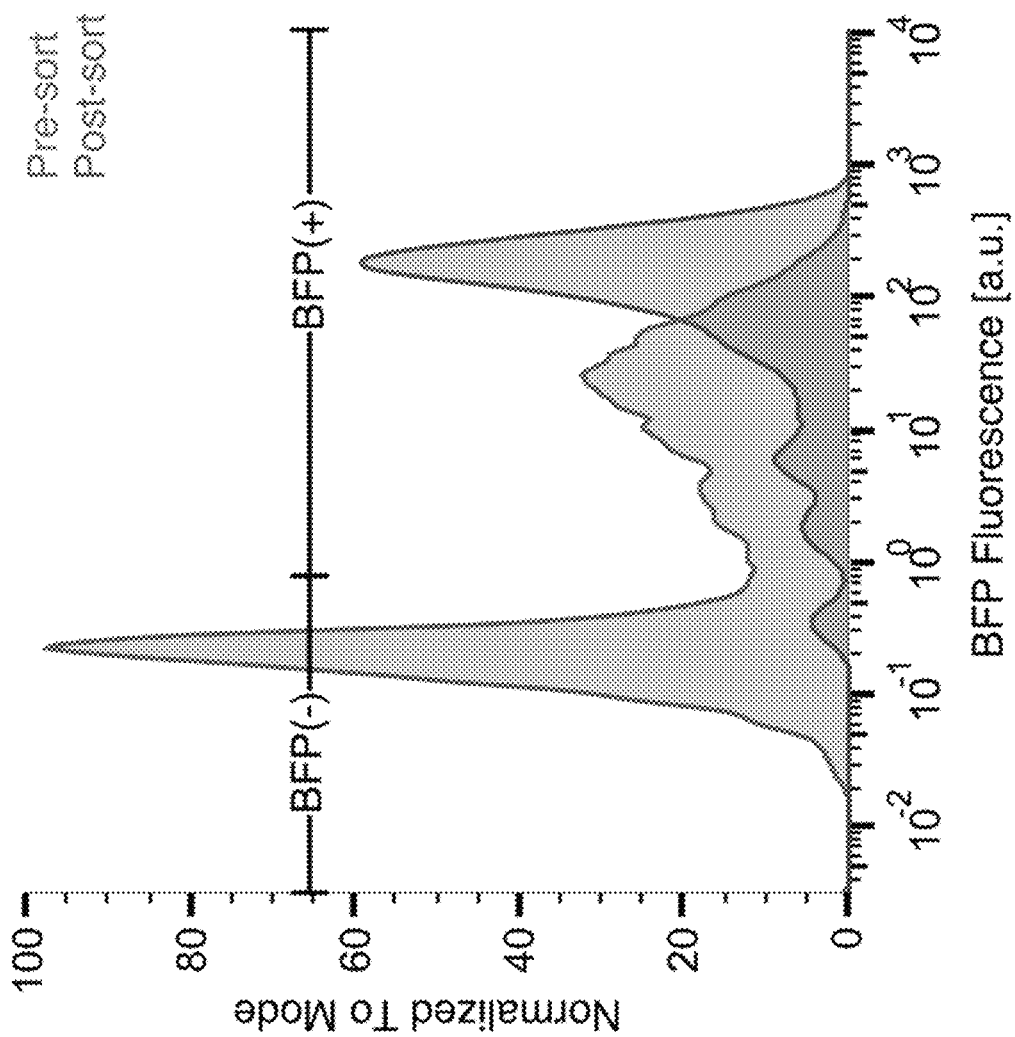

Quantifying the genotypes of the input and output cell populations by fluorescent flow cytometry (FIG. 6D) revealed, as expected, a significant enrichment of EBFP2-positive cells after acoustofluidic sorting (FIG. 6E). This result demonstrates proof of principle for acoustically sorting cells directly based on their genotype in a continuous-flow microfluidic device, with GV-encoding genes serving as a generalizable genetic label for cellular selection and enrichment.

Figure 7A:
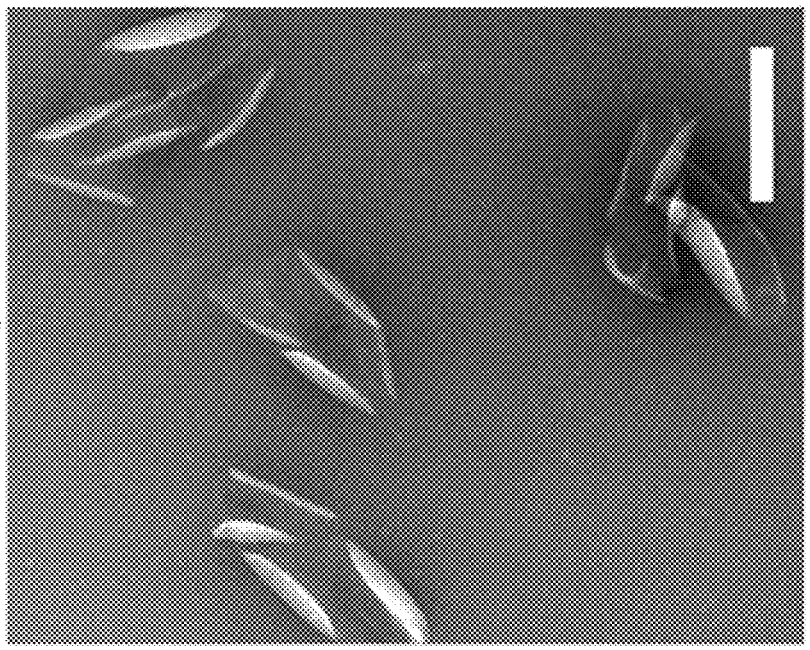
FIGS. 7A-7G depict non-limiting exemplary schematics and data related to ARF-silencing of GVs allowing in situ patterning, pressure sensing and multiplexed acoustic manipulation.
Figure 7A:
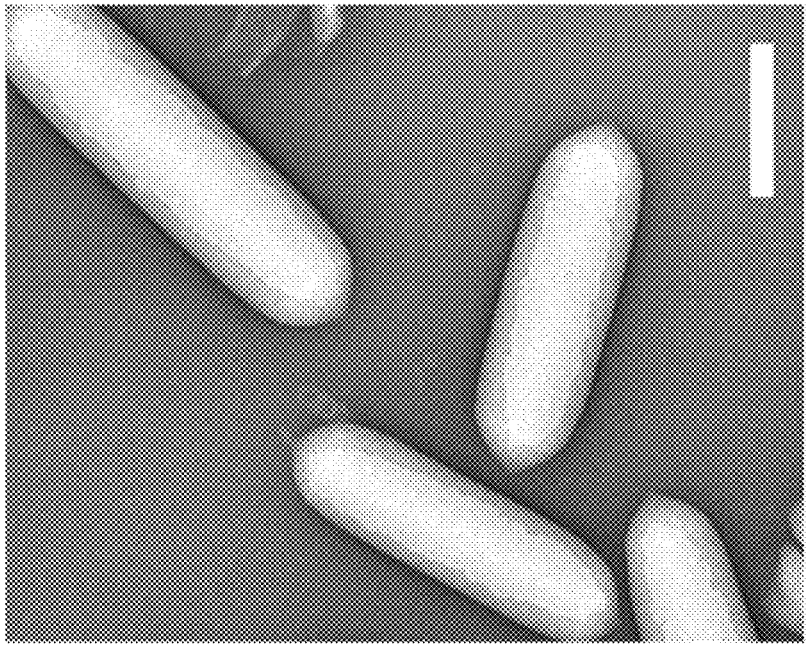
Figure 7B:
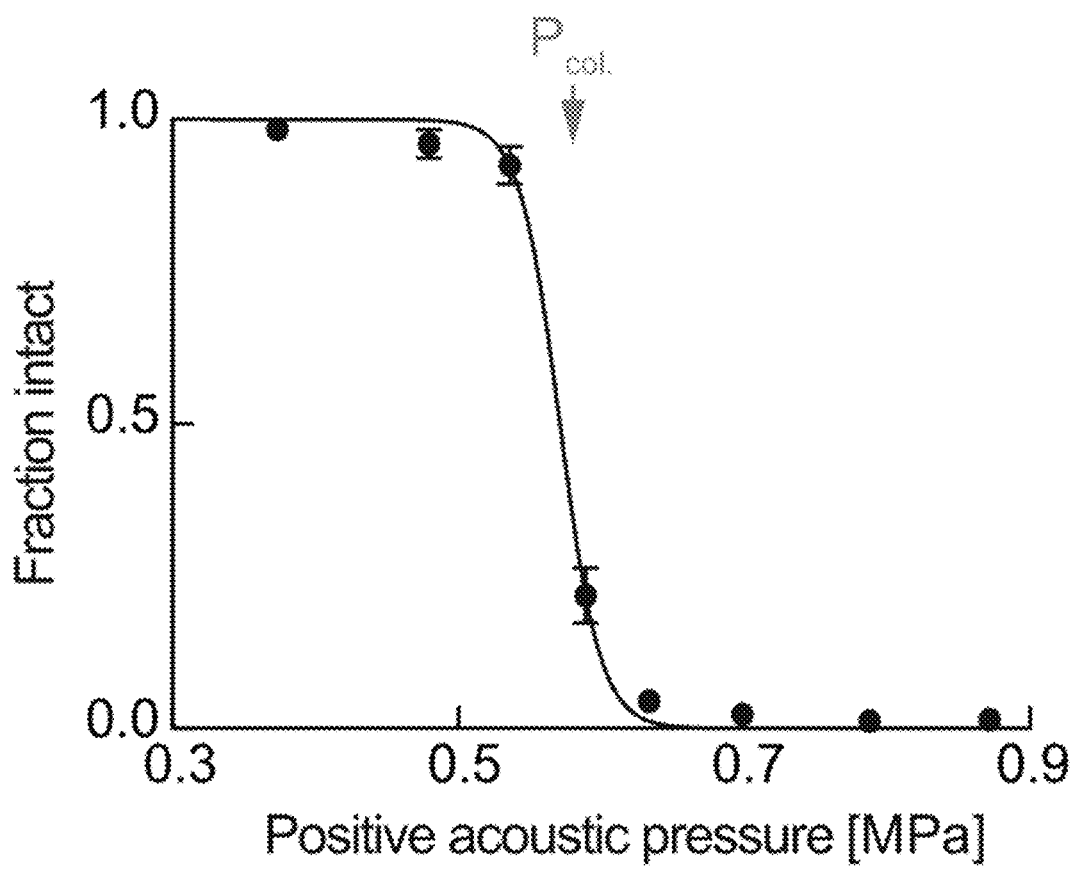

Gas Vesicle ARF-Silencing Allows Multiplexed Actuation and In Situ Pressure Measurement Finally, after establishing the basic ability of GVs to respond to ARF and serve as genetically encodable cellular actuators, one additional property of these nanostructures was examined: their ability to be collapsed at specific, tunable acoustic pressures (FIGS. 7A-7B). Since GV collapse causes the rapid dissolution of their gas contents, it was hypothesized that in situ collapse inside acoustofluidic devices would provide a means to instantaneously convert GVs experiencing ARF into an ARF-silent state. This would provide an additional means to spatially pattern GVs inside microfluidic channels, enable them to serve as probes for in situ pressure measurement and be differentially manipulated in space based on their genetically determined collapse pressure thresholds.

Figure 7C:
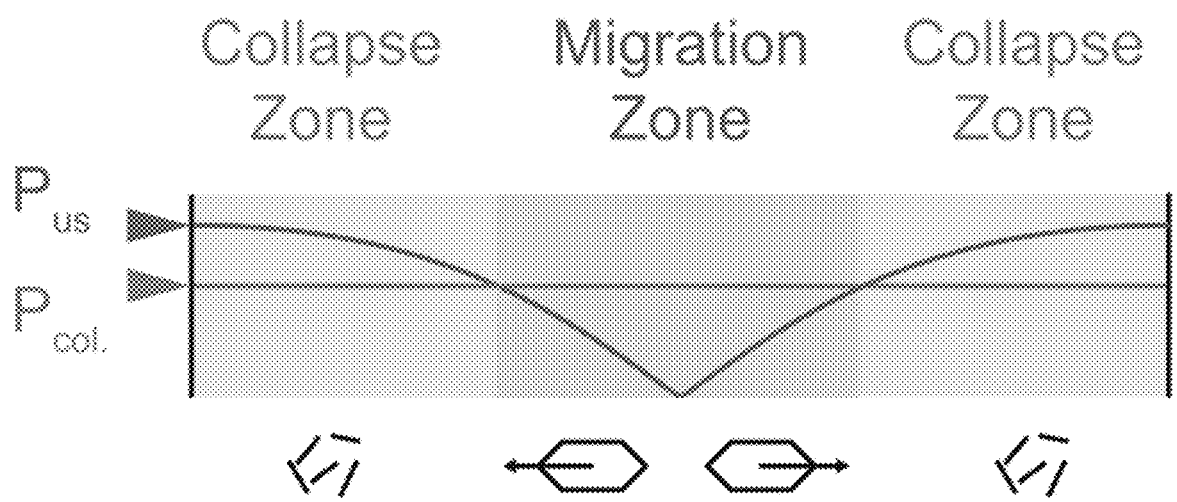
Figure 7D:
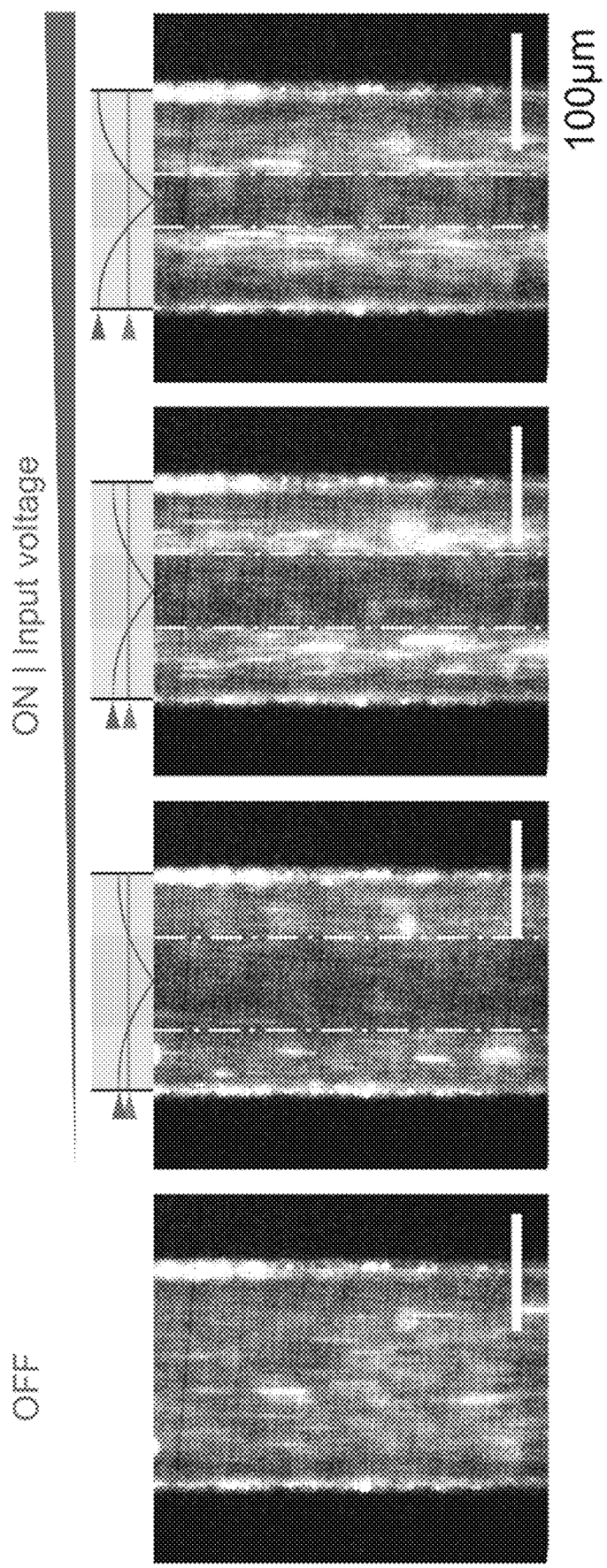

To test the ability of GVs to be patterned based on in situ collapse, an engineered variant of Ana GVs (AnaΔC), whose acoustic collapse pressure (FIG. 7B) has been tuned to be lower than wild-type Ana GVs by removing the outer scaffolding protein GvpC, was imaged. Three different driving voltages were applied to the piezoelectric element coupled to the microfluidic channel while the GV sample was infused into the channel at a steady flow rate, and the steady-state distribution of GVs inside the channel was imaged. It was predicted that GVs in regions with acoustic pressures lower than their critical collapse pressure would migrate towards regions of higher pressure due to ARF, while GVs in regions with pressure above their critical threshold would collapse and therefore remain stationary, resulting in the formation of distinct bands (FIG. 7C). Indeed, this pattern was observable starting with the lowest applied voltage (FIG. 7D). As the driving voltage was increased, the location of the material interface shifted toward the middle of the channel, consistent with the expected increase in acoustic pressure across the channel (FIG. 7D and movie data not shown).

Figure 7E:
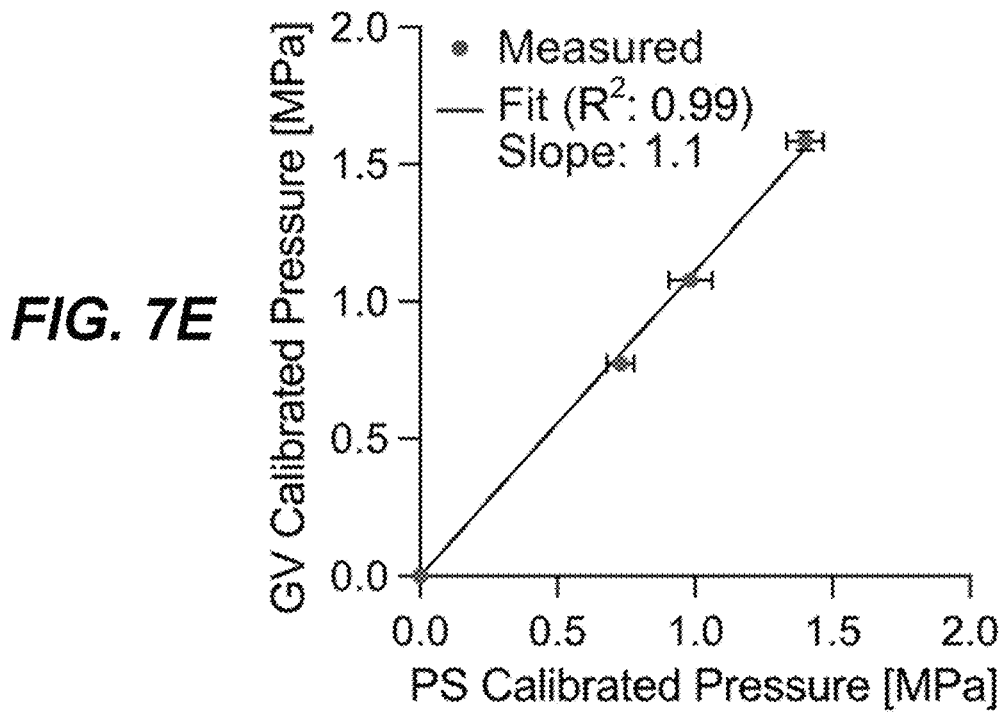

The ability of GVs to assume a pressure-dependent spatial arrangement provides a convenient approach to measuring acoustic pressure inside microfluidic channels. Whereas conventional methods to calibrate such devices by tracking the ARF-induced motion of single-particle standards are laborious, it is relatively straightforward to locate the boundary between migrating and stationary GVs (FIG. 7C). Since this boundary corresponds to the GVs' known crucial collapse pressure, and the pressure across the channel follows a known sinusoidal function, imaging the location of GV collapse reveals the standing wave pressure profile inside the channel. Comparing the pressure calibrated this way with an established method based on single particle tracking revealed a linear correspondence between the two measurement approaches. The slope is 1.1, indicating that particle tracking slightly underestimates the pressure relative to GVs (FIG. 7E).

Figure 7F:
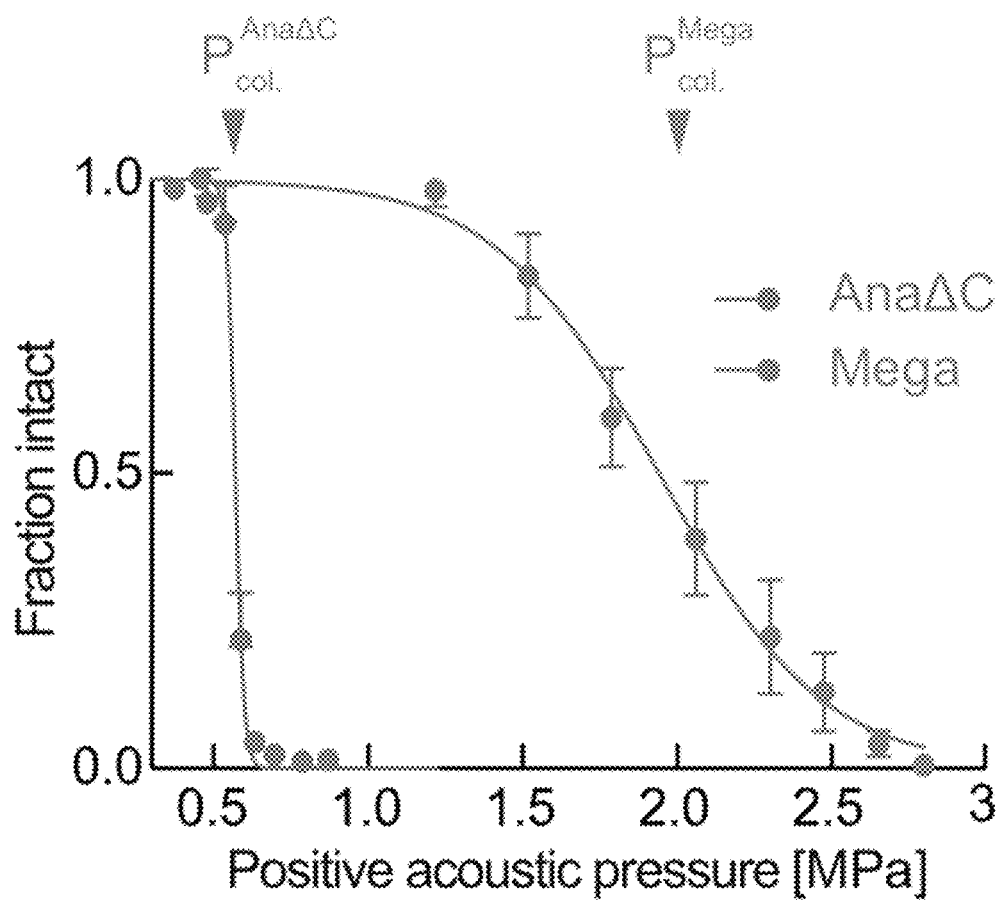
Figure 7G:
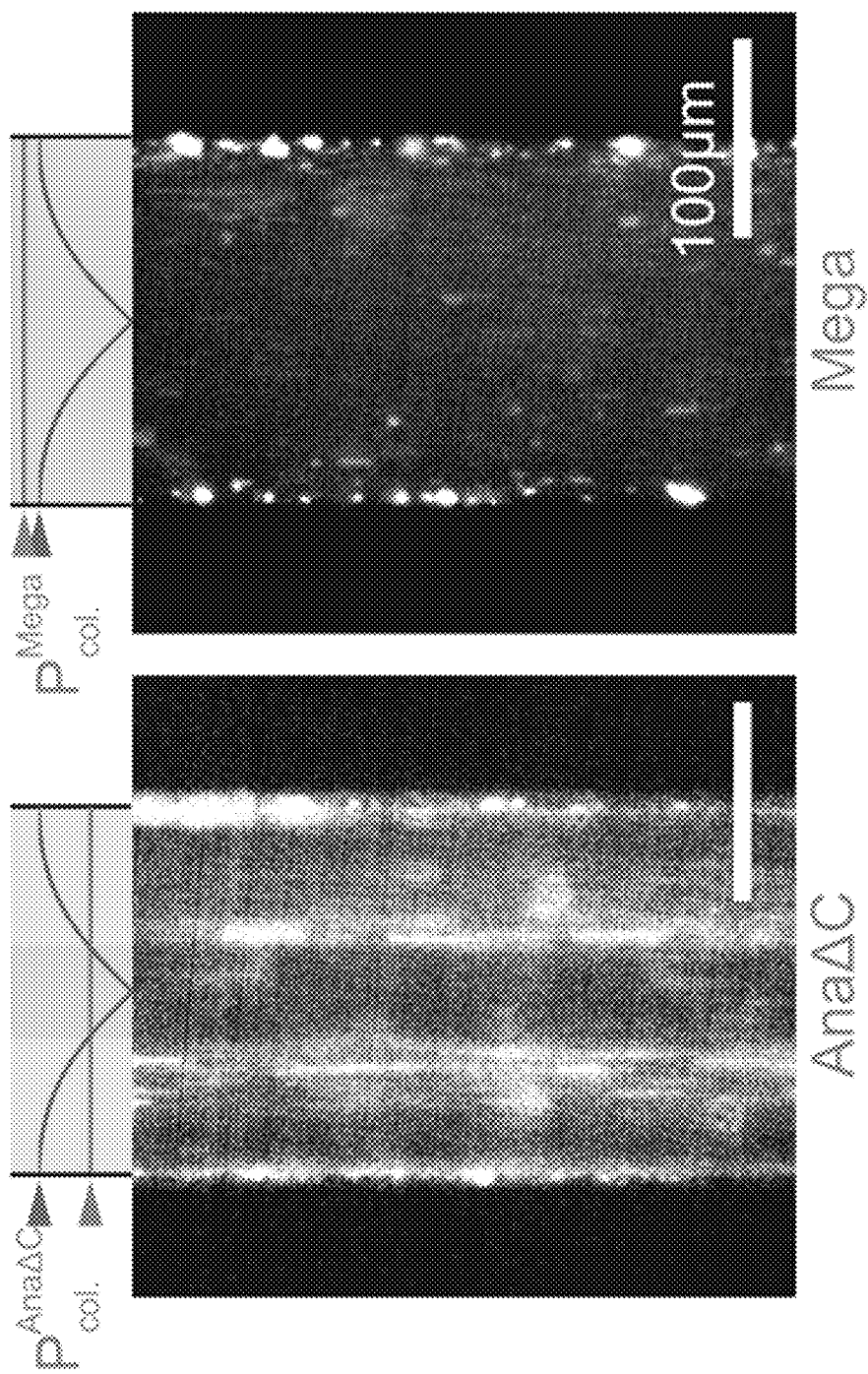

After demonstrating ARF-silencing of a single GV type, it was hypothesized that multiple GV types with different characteristic collapse pressures could be arranged in distinct patterns. Such differential manipulation would be desirable, for example, to enable separate visualization or multiplexed separation of analytes. To test this possibility, either AnaΔC GVs or heterologously expressed *B. megaterium* GVs (Mega GVs), which have critical collapse pressures of 0.6 MPa and 1.9 MPa, respectively, was imaged (FIG. 7F). These GVs in solution were infused into the channel at a steady flow rate and subjected to a standing wave with a maximum acoustic pressure of 1.6 MPa, which should collapse AnaΔC but not Mega GVs. As expected, it was observed that the two GV populations followed distinct migration patterns inside the acoustic field (FIG. 7G). These results demonstrate a unique mode of acoustic manipulation enabled by GVs' genetically engineerable collapse mechanics.

Discussion

Taken together, these results establish GVs as the first genetically encodable material to enable selective cellular manipulation and patterning with ultrasound. Due to their unique physical properties, GVs have an exceptionally large, negative acoustic contrast factor in aqueous environments, allowing these nanostructures to experience strong ARF despite their sub-micron size. The expression of GVs inside engineered cells greatly enhances and changes the sign of the force experienced by these cells due to ultrasound, enabling the selective acoustic manipulation and patterning of these cells based on their genotype.

The methods and compositions provided herein find applications in various areas of biomaterials and biotechnology. First, the ability of GVs and GV-expressing cells to be patterned and manipulated dynamically in 3-D space enables the development of protein- and cell-based materials for applications in tissue engineering, living materials, and stimuli-responsive "smart" materials. In these applications, ultrasound has intrinsic advantages compared to optical, magnetic or printing-based approaches due to its compatibility with opaque media, fine spatial resolution, non-invasive access, simultaneous assembly, and rapid reconfigurability. GV-expressing cells have a unique advantage in such applications due to their negative contrast, simplifying the acoustic field needed for complex patterning. Second, the development of acoustofluidic devices combining ultrasound with microfluidic channels enables the use of GVs to drive the separation of cells based on their gene expression or other biological activity. In these applications, GVs carry a major advantage over fluorescent proteins. Whereas fluorophores provide no intrinsic actuation capability—requiring a separate mechanical step after a fluorescent readout as done one cell at a time in fluorescence-activated cell sorting—the expression or uptake of GVs provides a direct handle for selective acoustic manipulation. This allows cellular patterning or separation to be done en masse.

The ability of GVs to connect an acoustophoretic phenotype to the output of genetic circuits in both bacterial and mammalian cells enables their expression to designate specific cells for separation, trapping and patterning using ultrasound. Both endogenous and engineered promoters can be connected to gene expression, allowing the formation of GVs to indicate a wide variety of cellular states, based on which the cells can now be selectively manipulated and sorted. Disclosed herein is proof of principle for high-performance cell sorting using GVs as a genetic label. In some embodiments, GVs can be used as exogenous cellular labels. To this end, GVs are readily functionalized with moieties providing the ability to bind specific biomolecular targets. In addition, compared to synthetic materials used to externally functionalize cells for acoustic manipulation, the ability of GVs to be internalized by mammalian cells to enable selective actuation, and subsequently be lysosomally degraded by the same cells, can provide a unique strategy for "traceless" labeling and cellular actuation.

These capabilities for selective actuation can extended from in vitro devices to inside living animals or patients using emerging approaches for in vivo ARF. In addition, in some embodiments, GVs can be used as a nanoscale actuator to locally apply specific forces to biological systems. The fN to low pN forces that can be achieved by GVs, while not sufficient to rupture cells, are comparable to forces in processes such as cell-matrix adhesion and the gating of ion channels, which can be useful for studies of mechanosensation or for engineered mechanisms of non-invasive cellular control.

In some embodiments of the methods and compositions provided herein, GVs are applied to specific biological problems, taking advantage of their potential for biomolecular and genetic engineering. In some embodiments, and without being bound by any particular theory, the basic gradient trapping of GVs and engineered cells generalizes to more complex acoustic fields. In some embodiments, acoustic manipulation of these objects is achieved using traveling acoustic waves to overcome the need for acoustic reflectors. Third, the theoretical model of GV acoustic contrast can vary in some embodiments. The calculations performed in this study approximated that GVs have spherical geometry and that their shell has a constant density and compressibility as a function of applied acoustic pressure. In reality, GVs are anisotropic cylindrical nanostructures that can undergo reversible buckling under applied acoustic pressure. In some embodiments, this buckling behavior enhances the effective compressibility of GVs and thereby the ARF they experience. In some embodiments, theoretical analysis of GV ARF with more realistic geometry and experiments using a broader range of pressures encompassing the buckling regime informs the engineering and use of these biomolecules in ARF applications. In some embodiments, and without being bound by any particular theory, inter-particle interactions arising between GVs and GV-expressing cells in an applied acoustic field influence their clustering, separation and motion. In some embodiments, and without being bound by any particular theory, there can be an interaction of GV ARF and acoustic streaming at higher acoustic frequencies and pressures than those examined herein. As disclosed herein, GV phenotypes can be genetically engineered with size, shape and mechanical properties enhancing their exceptional response to ARF.

Methods

Estimation of acoustic contrast factor. Acoustic contrast factors were calculated using the equation:

$$\phi = \frac{1}{3}\left[\frac{5\rho_p - 2\rho_0}{2\rho_p + \rho_0} - \frac{\beta_p}{\beta_0}\right] \quad [1]$$

where $\rho_p$ and $\rho_0$ are the density of the particle and the fluid, respectively, $\beta_p$ and $\beta_0$ the compressibility of the particle and the fluid, respectively. Values of $\rho_p$ and $\beta_p$ for GVs were obtained from literature. Values of $\rho_p$ and $\beta_p$ for the acoustic $E.\ coli$ were obtained by assuming that 10% of the intracellular space was occupied by GVs, and calculating the volume-averaged density and compressibility according to $\rho_{acoustic\ cell} = 0.9\ \rho_{wildtype\ cell} + 0.1\ \rho_{GV}$ and $\beta_{acoustic\ cell} = 0.9\ \beta_{wildtype\ cell} + 0.1\ \beta_{GV}$. The assumption of 10% was based on the GV occupancy needed for cells to have a density less than water, which provided a lower-bound on the GV expression for the cell population that were enriched using centrifugation.

Preparation of gas vesicles. GVs from $Anabaena\ flos\text{-}aquae$ (Ana), $Bacillus\ megaterium$ (Mega), and Ana GVs with GvpC removed (AnaΔC) were prepared as previously described. Dylight415-Col N-hydroxysuccinimide ester (Thermo Fisher Scientific) was reacted with GVs in PBS for 2 hours at 10,000:1 molar ratio, protected from light, on a rotating rack. 10 mM Tris buffer was then added to the solution to quench unreacted dye. Labeled GVs were subjected to dialysis and buoyancy purification. Pre-collapsed GVs controls were prepared by application of hydrostatic pressure in a capped syringe. The acoustic collapse profiles of GVs were characterized as previously described. Briefly, GVs embedded in an ultrasound phantom was imaged using ultrasound after subjecting the sample to increasing acoustic pressure. The fraction intact was calculated from the ultrasound image intensity of the sample at each pressure step normalized to the initial sample intensity.

Preparation of acoustic $E.\ coli$. GV-expressing cells were produced by transforming a pET28a plasmid containing the bARG1 gene cluster (Addgene #106473) into BL21 (A1) $E.\ coli$ (Thermo Fisher Scientific). The transformed cells were first grown overnight at 37° C. in LB media supplemented with 1% glucose, and subsequently diluted 1:100 into LB media supplemented with 0.2% glucose. When the optical density at 600 nm (OD600) of the culture reached between 0.4 and 0.6, 400 µM IPTG and 0.5% l-arabinose were added to induce the expression of GVs. The expression proceeded at 30° C. for 22 hours. High-expressing cells were enriched by centrifugation-assisted floatation at 300 g. Cell density was measured after collapsing any intracellular GVs to eliminate their contribution to optical scattering. $E.\ coli$ with pre-collapsed GVs were prepared by application of hydrostatic pressure to the cell culture in a capped syringe. Fluorescently labeled bacteria were prepared by incubating the cells with 10 µM of Baclight Green bacterial stain (Thermo Fisher Scientific) for 40 minutes at room temperature, protected from light, and followed by two rounds of buoyancy purification to remove excess dye. E. coli Nissle 1917 cells (Ardeypharm GmbH) were transformed by electroporation of the bARG1 gene under the T5 promoter. Transformed cells were cultured similar to above and were either induced with 3 µM IPTG or grown without induction. Induced and noninduced cells were labeled with 10 µM of Baclight Green and Baclight Red bacterial stain, respectively, and excess dye was removed using 2 rounds of dialysis with 6-8 kD dialysis tubing (Spectrum Labs).

Preparation of acoustic mammalian cells. HEK293T cells containing mARG1 or mCherry driven by the Tetracycline-inducible promoter were cultured in DMEM supplemented with 10% Tetracycline-free FBS and Penicillin/Streptomycin, and induced with 1 µg/mL Doxycycline and 5 mM Sodium Butyrate for 12 days. Special care was taken to prepare fresh induction media every day. Cells were harvested by trypsinization, resuspended in PBS supplemented with 2% FBS and 100 µL/mL DNase, filtered through a 40 µm cell strainer, and introduced into the microfluidic device.

RAW264.7 cells constitutively expressing GFP were seeded on Fibronectin-coated glass coverslips and cultured in DMEM with 10% FBS and Penicillin/Streptomycin. When the cells reached 70-80% confluency, the coverslip was washed with PBS, and placed upside down onto a 300 µL droplet of DMEM containing fluorescently labeled GVs, allowing the GVs to float towards the cells. The cells were incubated with the GV solution at 37° C. for 1 hour, washed with PBS, trypsinized, resuspended in PBS with 2% FBS and 100 µL/mL DNase, filtered through a 40 µm cell strainer, and introduced into the microfluidic device.

Acoustofluidic setup. The acoustofluidic channel was designed in SolidWorks, and fabricated in a clean room facility following a protocol modified from one previously described. Briefly, AZ1518 positive photoresist (Merck) was patterned onto a <100> silicon wafer (University Wafer) using a photomask, and developed in AZ340 solution. 50 cycles of deep-reactive ion etching (PlasmaTherm, SLR Series) were used to etch the channels into the wafer. The channel depth was measured using a profilometer (P15, KLA-Tencor). The photoresist was then removed, and the wafer was cleaned with piranha solution. A Borofloat 33 borosilicate glass wafer was anodically bonded to the silicon overnight at 500V, 400° C. using a custom setup. Inlet holes were drilled through the glass layer using a diamond drill bit (Drilax) and joined with microfluidic connectors (Idex Health & Science) using Epoxy (Gorilla). A custom PZT-5A piezoelectric element (American Piezo Company) was attached to the silicon beneath the channel using cyanoacrylate (Loctite). The input signal to the PZT was programmed in MATLAB and generated using an arbitrary waveform generator (Tabor Electronics). The output waveform was validated by an oscilloscope (Keysight Technologies) before being amplified by an RF power amplifier (Amplifier Research) and connected to the PZT. The samples inside the channel were imaged using a custom-built upright epifluorescence microscope with an LED source (Thorlabs) and a sCMOS camera (Zyla 5.5, Andor).

Single-particle tracking experiment and analysis. Fluorescently labeled GVs, suspended in buffer (DI water, 0.01% v/v Tween-20), were introduced into the acoustofluidic channel via a syringe. The background flow was naturally slowed until particles stayed within the field of view longer than the acquisition time of approximately 2 minutes. The particles were then imaged at 20 frames per second for approximately 20 seconds before ultrasound was turned on.

The ultrasound was then turned on (3.75±0.1 MHz sweep, 1 ms sweep repetition time, 3.8V peak-to-peak, continuous wave) for approximately 100 seconds. Pressure-collapsed GVs, and 200 nm diameter fluorescent polystyrene particles (Thermo Fisher Scientific) were subjected to the same procedure.

Particle detection was performed in ImageJ using the MOSAIC ParticleTracker plugin to obtain time-dependent particle coordinates in the direction towards the walls, x(t). Particle trajectories were exported and analyzed in MATLAB using custom scripts. The coordinates were split into before-ultrasound and during-ultrasound groups. Only particles with trajectories in both groups were included in the analysis.

Trajectories during the Brownian period were used to calculate the mean-squared-displacement, $<\Delta x>^2$, for different time durations, $\Delta t$. Linear regression was used to extract the diffusion coefficient, D, for each particle following the one-dimensional diffusion relationship $<\Delta x>^2 = 2D\Delta t$. The mobility, µ, of the particle was then obtained using the Einstein relation:

$$D = \mu k_B T \quad [2]$$

where $k_B$ is the Boltzmann constant, and T the temperature.

Trajectories recorded during the ultrasound period were fitted to an equation of motion accounting for the sinusoidal pressure profile to obtain the peak particle velocity in the acoustic field. Given the profile of the pressure in the channel $P(x,t) = P_{peak} \cos(kx) \sin(\omega t)$, where k is the wave number and w the angular frequency, the radiation force, $F_{ARF}$, acting on the particles is:

$$F_{ARF} = 4\pi a^3 \phi k E_{ac} \sin(2kx) = F_{peak} \sin(2kx) \quad [3]$$

here a is the particle radius, $\phi$ the acoustic contrast factor, $$E_{ac} = \frac{1}{4} P_{peak}^2 * \beta_0$$

the acoustic energy density, and $F_{peak}$ the peak ARF.

At low Reynolds number, $F_{ARF} = F_{drag} \propto v_p$, where Farag is the drag force and $v_p$ the particle velocity. Therefore, $v_p = v_{peak} \sin(2kx)$, where V peak is the peak particle velocity. The particle position, $x_p(t)$, over time within an acoustic field is thus related to the peak velocity by:

$$x_p(t) = \frac{1}{k}\cot^{-1}[\cot(x(0)k)\exp(2ktv_{peak})] \quad [4]$$

Fitting the particle trajectory to this equation allowed us to obtain $v_{peak}$. Combining the particle mobility µ and the peak velocity $v_{peak}$, the peak ARF was calculated using $$\mu = \frac{v_{peak}}{F_{peak}}.$$

Figure 9A:
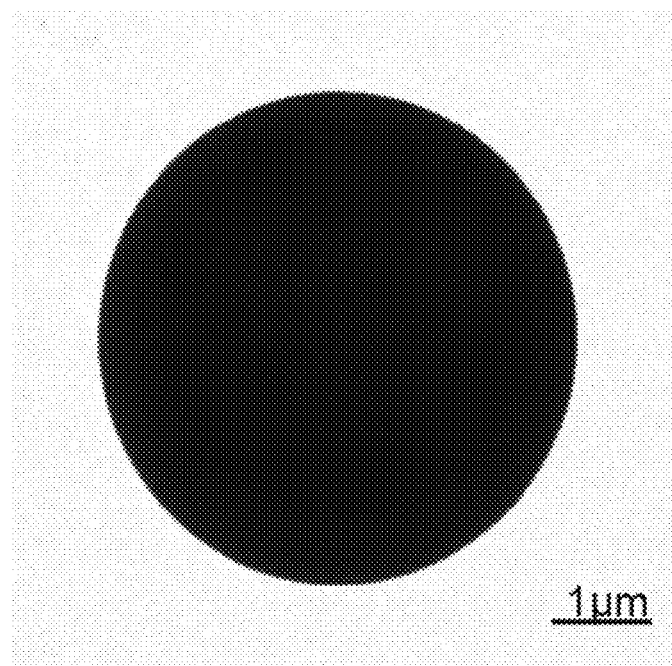
FIGS. 9A-9C depicts data related to calibration of the acoustic energy inside the acoustofluidic channel.
Figure 9A:
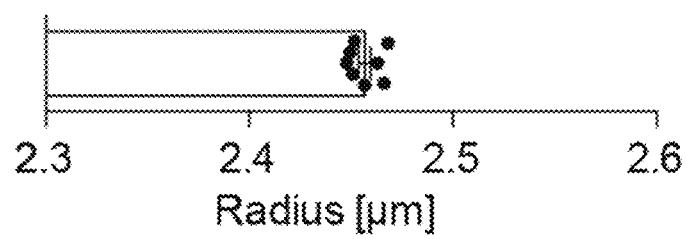
Figure 9B:
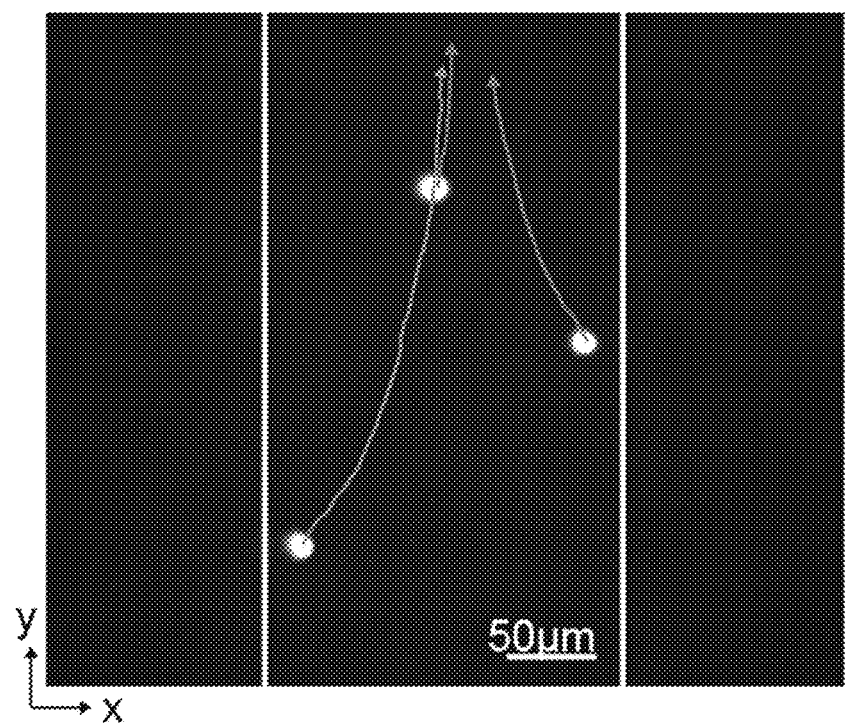
Figure 9C:
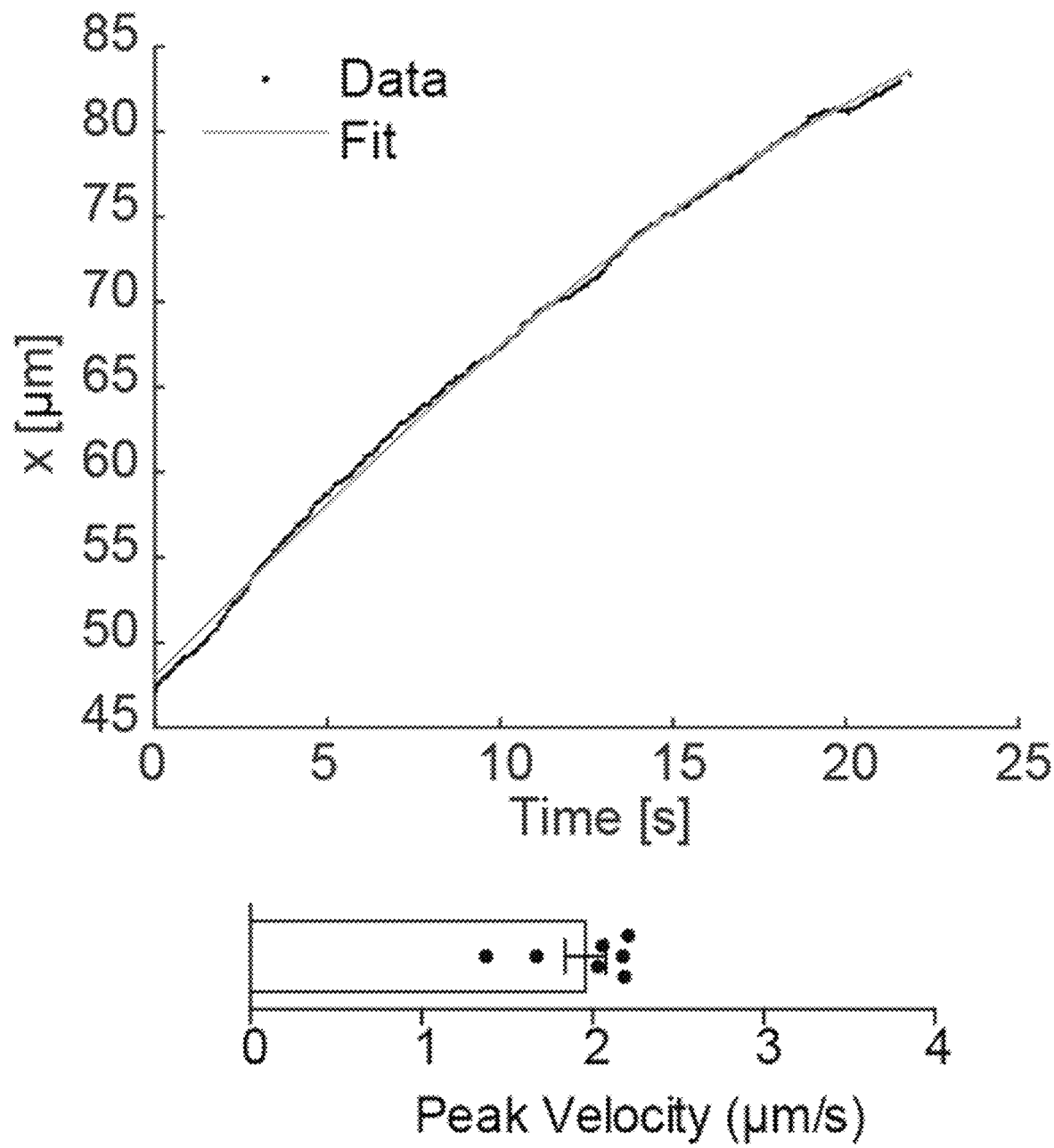

The hydrodynamic radius a of the particles was determined using the Stokes-Einstein equation:

$$D = \frac{k_B T}{6\pi \eta a_H} \quad [5]$$

where η is the solution viscosity. Fitting the force measurements to a fractal clustering model $$F_{peak} = m a_H^n \quad [6]$$

to obtain the scaling coefficient m, and the force-mobility exponent n, the peak ARF for a single GV, $F_{peak\_sGV}$, was calculated by substituting the average hydrodynamic radius of a GV, $a_{H\_SGV}$=125 nm. The acoustic contrast factor of a single GV, $\phi_{sGV}$, was then obtained using the equation:

$$F_{peak_{sGV}} = 4\pi \phi_{sGV} k a_{H_{sGV}}^3 E_{ac} \quad [7]$$

where $E_{ac}$ is the acoustic energy density of the applied ultrasound, as determined by a separate calibration (FIGS. 9A-9C, Methods-Calibration of the acoustofluidic channel). Finally, this equation was used to predict the peak ARF for a single GV at various acoustic parameters.

Fluorescently labeled acoustic *E. coli* cells were suspended in PBS and subjected to the same ultrasound procedure as the GV particles. The hydrodynamic radius of *E. coli* was determined using the Stokes-Einstein equation (Eq. 5), and the acoustic contrast factor was determined using the acoustophoretic motion of the *E. coli* in a similar manner as described for GVs.

Acoustic GV collapse in microfluidic channel. A syringe pump was used to introduce fluorescently labeled AnaΔC GVs into the acoustofluidic chip at a controlled flow rate of 0.5 μl/min. Fluorescence images were acquired while the PZT was driven at three different voltages. The acoustic energy density for the three trials was kept constant by choosing the appropriate duty cycle according to Duty Cycle*Voltage²=constant. A video of the steady-state pattern was acquired and projected onto the x-axis to determine the locations of the discontinuity in the fluorescence signal. The location was marked with the critical collapse pressure of AnaΔC of 0.6 MPa, and the acoustic pressure in the entire channel was calculated by assuming a sinusoidal pressure profile with antinodes at each wall.

Fluorescently labeled Mega GVs were introduced into the channel in a similar manner and subjected an acoustic field with a peak acoustic pressure of 1.2 MPa, as measured using the collapse profile of AnaΔC.

Acoustic manipulation of cells in microfluidic channel. Fluorescently labeled arg1-expressing *E. coli* and pre-collapsed controls, prepared as described above, were suspended in PBS and loaded into the acoustofluidic channel described above. Continuous wave ultrasound was applied at 3.75 MHZ, 7.6 V peak-to-peak. Images of the channel were acquired for 10 seconds during ultrasound application as described above.

Dynamic patterning of acoustic bacteria. An acoustic setup was built to generate a standing wave with reconfigurable wavelengths, by reflecting the sound generated by a single-element transducer (V310, Olympus) off a glass coverslip (VWR). A holder was designed in SolidWorks and 3D-printed (3D Systems) to facilitate the alignment of the transducer with the reflector and to create a sample chamber sandwiched between the reflector and an acoustically transparent mylar membrane (Chemplex, 2.5 μM thickness). The acoustic setup was placed into a water bath to provide acoustic coupling between the transducer and the sample chamber, and fluorescently labeled arg1-expressing *E. coli* prepared as above were suspended in PBS and loaded into the sample chamber. Ultrasound (continuous wave) was applied to the sample, and fluorescent images were acquired with the imaging plane parallel to the sound propagation axis. The ultrasound frequency was varied between 4.5 and 6.5 MHz in 1 MHz steps every 50 seconds.

Figure 11:
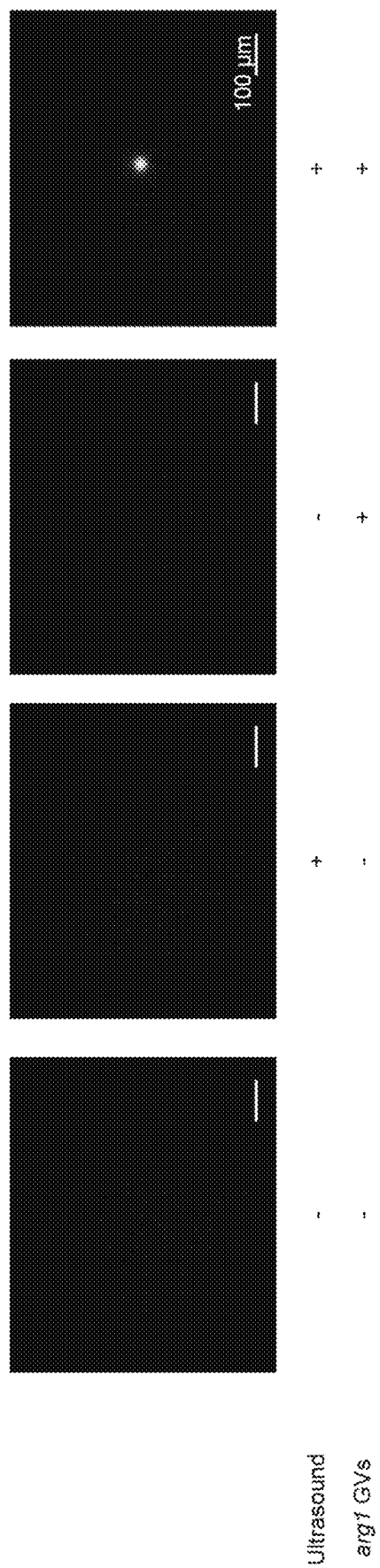
FIG. 11 depicts data related to bacteria cluster formation requiring intact intracellular GVs. Fluorescence images of arg1-expressing E. coli with intact (+) and collapsed (−) intracellular GVs before and 40 seconds after ultrasound application.

Image-guided positioning of acoustic bacteria. For radial acoustic trapping and movement, a sample dish was created allowing the placement of the image plane orthogonal to the sound propagation axis. The glass bottom of a 35-mm glass-bottom petri dish (Matsunami) was removed using a glass cutter and replaced with a Mylar film. arg1-expressing *E. coli* prepared as above and suspended in PBS were added to the center of the dish, and sealed using a glass coverslip. A 40 MHz focused single-element transducer (V390-SU/RM, Olympus) was mounted onto a micromanipulator and positioned beneath the dish. To align the transducer with the glass reflector, the transducer first emitted 5-cycle pulses and received the echo from the glass coverslip. The amplitude of this echo was maximized by adjusting the position of the transducer using the micromanipulator. To trap the acoustic bacteria, the transducer was then driven with a continuous wave 40 MHz input while fluorescent images were acquired. After a cell cluster was formed in the center of the acoustic focus (FIG. 11), the transducer was moved in the x-y plane using the micromanipulator, guided by the optical image, to form the desired positioning sequence.

Acoustic Biofabrication. Acoustic phase masks were designed in MATLAB using the iterative angular spectrum approach, 3D printed in VeroClear using a PolyJet printer (Stratasys), coupled to a 3.5 MHz unfocused transducer (Olympus) and positioned in a water bath below a Petri dish holder. Acoustic bacteria was suspended in 0.25% low-melt agarose solution (GoldBio) supplemented with 20 mg/mL LB medium, and maintained at 37° C. using a heat block to prevent gelation. The bacteria solution was added onto a mylar-bottom petri dish described above, which was then placed into the Petri dish holder above the phase mask. Ultrasound was applied while the agarose solution cooled to its gelation temperature of 26° C. The acoustically fabricated material was then imaged using a cell phone camera and ultrasound imaging.

Acoustofluidic Cell Enrichment. HEK293T cells expressing GVs and EBPF2 were prepared by transient transfection as described previously. Briefly, a transfection mixture containing 280 fmol of GvpA-IRES-EBFP2 plasmid and 70 fmol of each of the accessory plasmids (GvpC, GvpF, GvpG, GvpJ, GvpK, GvpN, GvpV, and GvpW) were mixed with polyethyleneimine (PEImax, Polyscienes) at a 1:2.6 ratio (w/w) by vortexing and added to a 70% confluent culture. Cells were cultured for 3 days at 37° C. in DMEM supplemented with 10% Tetracycline-free FBS and Penicillin/Streptomycin. Before enrichment, cells were washed with PBS, harvested using 1 mL Accutase (Stemcell Technologies), stained using 1 μM CellTrace Far Red Cell Stain (Thermo Fisher Scientific) at 37° C. for 30 minutes, resuspended in running buffer (PBS, 100 μg/mL DNAse I, 2% BSA, Penicillin/Streptomycin) at a density of $10^5$ cells/mL, and filtered through a 40 μm cell strainer. Cells were introduced to the center channel at a flow rate of 10 μL/min using a syringe pump, and sheath flow containing the running buffer were introduced at 15 μL/min. Continuous wave ultrasound (3.75±0.1 MHz sweep, 1 ms sweep repetition time, 38V peak-to-peak) was applied for the duration of the enrichment process. Cells pre- and post-enrichment were collected and their fluorescence was quantified using flow cytometry (MACSQuant Analyzer 10, Miltenyi Biotec).

Statistical analysis. Statistical methods are described in each applicable figure caption. Measured values are stated in the text as the mean=the standard error of the mean. Standard error propagation methods were used where appropriate.

Calibration of the acoustofluidic channel. The acoustofluidic channel was calibrated using a previously reported method based on single particle tracking. Briefly, the trajectory of polystyrene microbeads inside the acoustofluidic channel was recorded during ultrasound application. The acoustic energy density $E_{ac}$ was determined by fitting the particle position over time, $x_p(t)$, to the equation:

$$x_p(t) = \frac{1}{k}\tan^{-1}\left[\tan(x(0)k)\exp\left(\frac{4\phi(ka)^2 E_{ac} t}{3\eta}\right)\right] \quad (8)$$

where $\phi$ is the particle acoustic contrast factor, k the wave number, n the solution viscosity, and a the particle radius.

The peak applied acoustic pressure $p_{peak}$ was determined using the relationship:

$$p_{peak} = 2\sqrt{\rho_0 c_0 E_{ac}} \quad [9]$$

where $\rho_0$ is the solution density, and co the speed of sound.

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. As used in this specification and the appended claims, the singular forms "a," "an," and "the" include plural references unless the context clearly dictates otherwise. Any reference to "or" herein is intended to encompass "and/or" unless otherwise stated.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of sorting a population of cells, comprising: flowing a fluid sample through a microfluidic channel, wherein the microfluidic channel comprises one or more flow stream(s) introduced in the microfluidic channel via one or more inlet channel(s) and exiting the microfluidic channel via two or more outlet channels, wherein the fluid sample comprises a population of cells, wherein the population the cells have been configured to express gas vesicles (GVs) in a context-dependent manner, wherein the expression of GVs within a cell increases the compressibility (3) and reduces the density (ρ) of said cell, thereby modulating the acoustic contrast ((D) of said cell relative to the fluid in the microfluidic channel, wherein the cellular expression of GVs above a threshold level of expression imparts a threshold negative acoustic contrast on said cell, and wherein the population of cells comprises or is suspected of comprising: (i) a first subpopulation of cells having a nonnegative acoustic contrast or a negative acoustic contrast below the threshold negative acoustic contrast, or (ii) a second subpopulation of cells having a negative acoustic contrast at or above the threshold negative acoustic contrast; and applying ultrasound to the microfluidic channel, wherein applying ultrasound comprises generating acoustic standing wave(s) in the microfluidic channel, wherein the acoustic standing wave(s) position pressure antinode(s) in the microfluidic channel, wherein the second subpopulation of cells is actuated towards flow stream(s) comprising the pressure antinode(s), and wherein the method does not comprise buoyancy purification of the population of cells.

2. A method of sorting a population of cells, comprising: flowing a fluid sample through a microfluidic channel, wherein the microfluidic channel comprises one or more flow stream(s) introduced in the microfluidic channel via one or more inlet channel(s) and exiting the microfluidic channel via two or more outlet channels, wherein the fluid sample comprises a population of cells, wherein the population of cells has been incubated with gas vesicles (GVs), wherein cells of the population of cells have varying capacity to uptake said GVs, and wherein population the cells is capable of uptaking GVs in a context-dependent manner, wherein the levels of GVs within a cell increases the compressibility (3) and reduces the density (ρ) of said cell, thereby modulating the acoustic contrast ((D) of said cell relative to the fluid in the microfluidic channel, wherein the uptake of GVs above a threshold level of uptake imparts a threshold negative acoustic contrast on said cell, and wherein the population of cells comprises or is suspected of comprising: (i) a first subpopulation of cells having a nonnegative acoustic contrast or a negative acoustic contrast below the threshold negative acoustic contrast, or (ii) a second subpopulation of cells having a negative acoustic contrast at or above the threshold negative acoustic contrast; and applying ultrasound to the microfluidic channel, wherein applying ultrasound comprises generating acoustic standing wave(s) in the microfluidic channel, wherein the acoustic standing wave(s) position pressure antinode(s) in the microfluidic channel, wherein the second subpopulation of cells is actuated towards flow stream(s) comprising the pressure antinode(s), and wherein the method does not comprise buoyancy purification of the population of cells.

3. The method of claim 1, wherein:
the one or more inlet channel(s) comprise a center inlet channel and/or one or more side inlet channel(s);
the two or more outlet channels comprise a center outlet channel and/or one or more side outlet channel(s); and/or
the one or more flow stream(s) comprise a center flow stream and/or one or more peripheral flow stream(s).

4. The method of claim 1, wherein the one or more flow streams comprise:
a center flow stream introduced in the microfluidic channel via a center inlet channel and exiting the microfluidic channel via a center outlet channel; and
one or more peripheral flow stream(s) introduced in the microfluidic channel via one or more side inlet channel(s) and exiting the microfluidic channel via one or more side outlet channel(s).

5. The method of claim 1, wherein at least one of the two or more outlet channel(s) is configured to capture flow stream(s) wherein pressure antinode(s) and/or pressure node(s) are positioned.

6. The method of claim 2, wherein the method comprises:
incubating the population of cells with GVs, wherein uptake of the GVs comprises one or more of endocytosis, pinocytosis, nanopinocytosis, micropinocytosis, phagocytosis, membrane fusion, clathrin-medicated internalization, caveolin-mediated internalization, receptor-dependent internalization, and receptor-independent internalization.

7. The method of claim 1,
wherein the acoustic standing wave(s) position pressure node(s) in the microfluidic channel, and
wherein the first subpopulation of cells is actuated towards the flow stream(s) comprising the pressure node(s).

8. The method of claim 1,
wherein the acoustic standing wave(s) position pressure antinode(s) in the one or more peripheral flow stream(s), and
wherein the second subpopulation of cells is actuated towards the one or more peripheral flow stream(s).

9. The method of claim 3,
wherein the microfluidic channel comprises two peripheral flow streams, two side inlet channels, and two side outlet channels,
wherein the fluid sample is introduced in the microfluidic channel via the center inlet channel, and
wherein the fluid sample is hydrodynamically focused to the center flow stream via sheath flow introduced in the microfluidic channel via the two side inlet channels.

10. The method of claim 3,
wherein the acoustic standing wave(s) position pressure antinodes at or adjacent to the microfluidic channel walls,
wherein cells of the second subpopulation are actuated towards the peripheral flow streams, and
wherein cells of the first subpopulation remain in the center flow stream and/or are actuated towards the pressure node positioned at the center flow stream.

11. The method of claim 3, wherein the method comprises:
collecting a first sorted population of cells from the center outlet channel,
wherein the first subpopulation of cells is actuated towards the center flow stream; and/or
collecting a second sorted population of cells from the one or more side outlet channel(s),
wherein the second subpopulation of cells is actuated towards the one or more peripheral flow stream(s).

12. The method of claim 11, wherein the second sorted population of cells:
is at least about 1.2-fold enriched for cells of the second subpopulation of cells;
comprises at least about 70% of cells of the second subpopulation of cells present in the fluid sample; and/or comprises less about 30% of cells of the first subpopulation of cells present in the fluid sample.

13. The method of claim 1, wherein:
the acoustic properties of a cell of the population of cells are dependent on the context-dependent expression of GVs,
the expression of GVs is capable of inverting and magnifying the acoustic contrast of a cell; and/or
the cell type and/or cell state of a cell determines the context-dependent expression of GVs.

14. The method of claim 1, wherein the GVs are capable of amplifying the acoustic radiation force (ARF) experienced by the cells by at least about 2-fold and/or inverting their acoustic contrast upon expression.

15. The method of claim 1, wherein the threshold negative acoustic contrast is at least about −0.001, −0.003, −0.007, −0.01, −0.02, −0.04, −0.06, −0.08, −0.10, −0.12, −0.14, −0.16, −0.18, or −0.20.

16. The method of claim 1, wherein:
the cells have an acoustic contrast of about 0.0 to about 0.2 in the absence of GV expression; and/or
the cells have an acoustic contrast of about-0.01 to about-2.0 upon GV expression.

17. The method of claim 1, wherein each cell of the population of cells comprises:
one or more context-dependent promoters operably connected to one or more gas vesicle (GV) polynucleotides comprising:
one or more gas vesicle structural (GVS) gene(s) encoding one or more GVS protein(s); and/or
one or more first promoters operably connected to one or more gas vesicle (GV) polynucleotides comprising:
one or more gas vesicle assembly (GVA) gene(s) encoding one or more GVA protein(s), and
wherein the one or more GVA protein(s) and the one or more GVS protein(s) are capable of forming gas vesicles (GVs) upon expression in a cell, and
wherein the activity of the context-dependent promoter and/or the degree of expression of the GVs is associated with the presence and/or amount a unique cell type and/or a unique cell state.

18. The method of claim 1, wherein each cell of the population of cells comprises:
one or more first promoters operably connected to one or more gas vesicle (GV) polynucleotides comprising:
one or more gas vesicle assembly (GVA) gene(s) encoding one or more GVA protein(s), and
one or more gas vesicle structural (GVS) gene(s) encoding one or more GVS protein(s),
wherein the one or more GVA protein(s) and the one or more GVS protein(s) are capable of forming gas vesicles (GVs) upon expression in a cell.

19. The method of claim 18, wherein each cell of the population of cells comprises:
a context-dependent promoter operably linked to a transactivator polynucleotide comprising a transactivator gene,
wherein the context-dependent promoter is capable of inducing transcription of the transactivator gene to generate a transactivator transcript,
wherein the transactivator transcript is capable of being translated to generate a transactivator,
wherein the activity of the context-dependent promoter and/or the degree of expression of the transactivator is associated with the presence and/or amount a unique cell type and/or a unique cell state,
wherein, in the presence of the transactivator and a transactivator-binding compound, the first promoter is capable of inducing transcription of the one or more GV polynucleotides to generate GV transcript(s), and
wherein the GV transcript(s) are capable of being translated to generate GVA protein(s) and/or GVS protein(s).

20. The method of claim 1,
wherein the degree of expression of the GVs by a cell is associated with the presence and/or amount of a unique cell type and/or a unique cell state of said cell,
wherein the second subpopulation of cells comprises cells of a unique cell type and/or cells of a unique cell state, and
wherein the unique cell state comprises:
a physiological state selected from the group comprising a cell cycle state, a differentiation state, a development state, a metabolic state, or a combination thereof; and/or
a pathological state selected from the group comprising a disease state, a human disease state, a diabetic state, an immune disorder state, a neurodegenerative disorder state, an oncogenic state, or a combination thereof.

* * * * *